US010747651B1

(12) United States Patent
Vanderwall et al.

(10) Patent No.: US 10,747,651 B1
(45) Date of Patent: Aug. 18, 2020

(54) SYSTEM FOR OPTIMIZING SYSTEM RESOURCES AND RUNTIME DURING A TESTING PROCEDURE

(71) Applicant: The Ultimate Software Group, Inc., Weston, FL (US)

(72) Inventors: Robert L. Vanderwall, Weston, FL (US); John A. Maliani, Pembroke Pines, FL (US); Michael L. Mattera, Coral Springs, FL (US); Dionny Santiago, Weston, FL (US); Brian R. Muras, Weston, FL (US); Keith A. Briggs, Coral Springs, FL (US); David Adamo, Sunrise, FL (US); Tariq King, Pembroke Pines, FL (US)

(73) Assignee: The Ultimate Software Group, Inc., Weston, FL (US)

(*) Notice: Subject to any disclaimer, the term of this patent is extended or adjusted under 35 U.S.C. 154(b) by 251 days.

(21) Appl. No.: 15/994,984

(22) Filed: May 31, 2018

(51) Int. Cl.
*G06F 11/00* (2006.01)
*G06F 11/36* (2006.01)

(52) U.S. Cl.
CPC ...... *G06F 11/3684* (2013.01); *G06F 11/3688* (2013.01); *G06F 11/3692* (2013.01)

(58) Field of Classification Search
CPC .......... G06F 11/10706; G06F 11/0718; G06F 11/3612; G06F 11/3636; G06F 11/366;
(Continued)

(56) References Cited

U.S. PATENT DOCUMENTS

| 5,045,994 A | 9/1991 | Belfer et al. |
| 7,386,521 B2 | 6/2008 | Adir et al. |

(Continued)

FOREIGN PATENT DOCUMENTS

| CN | 101937438 | 6/2013 |
| CN | 102693183 | 4/2015 |

(Continued)

OTHER PUBLICATIONS

Kephart et al. "The vision of autonomic computing," Computer 36.1, 2003, pp. 41-50. http://130.18.208.80/~ramkumar/acvision.pdf.

(Continued)

*Primary Examiner* — Sarai E Butler
(74) *Attorney, Agent, or Firm* — Akerman LLP; Mammen (Roy) P. Zachariah, Jr.

(57) ABSTRACT

A system for optimizing system resources and runtime during a testing procedure is disclosed. During operation, the system may perform hypothesis testing on an application under evaluation, such as performing hypothesis testing on suggested constraints for the application under evaluation, which may result in the creation of new hypotheses yielding improved confidences. This testing may be optimized by simplifying and/or reducing the number of hypothesis tests used during the testing process. To do so, the hypothesis tests may be sorted into sets, and a subset of these sorted hypothesis tests may be executed. Based on the results of this testing, a remaining portion of the hypothesis tests may be skipped, allowing for an optimization of the testing process without reducing the quality of the testing procedure.

22 Claims, 11 Drawing Sheets

(58) Field of Classification Search
CPC ............ G06F 11/3668; G06F 11/3672; G06F 11/3688
USPC .......................................................... 714/19
See application file for complete search history.

(56) References Cited

U.S. PATENT DOCUMENTS

| | | | |
|---|---|---|---|
| 7,428,700 B2 | 9/2008 | Wen et al. | |
| 7,478,281 B2 | 1/2009 | Denniston | |
| 7,599,831 B2 | 10/2009 | Ford | |
| 7,694,181 B2 | 4/2010 | Noller et al. | |
| 7,712,000 B2 | 5/2010 | Khoche et al. | |
| 7,797,687 B2 | 9/2010 | Tillmann et al. | |
| 7,849,425 B1 | 12/2010 | Hamid et al. | |
| 7,895,148 B2 | 2/2011 | Ma et al. | |
| 7,937,622 B2 | 5/2011 | Mehrotra | |
| 7,958,495 B2 | 6/2011 | Kelso | |
| 8,301,998 B2 | 10/2012 | Ruvini | |
| 8,473,913 B2 | 6/2013 | Noller et al. | |
| 8,479,164 B2 | 7/2013 | Becker et al. | |
| 8,640,084 B2 | 1/2014 | Murthy | |
| 8,683,442 B2 | 3/2014 | Peranandam et al. | |
| 8,683,446 B2 | 3/2014 | Paradkar et al. | |
| 9,116,725 B1 | 8/2015 | Baird | |
| 9,223,669 B2 | 12/2015 | Lin | |
| 9,536,522 B1 | 1/2017 | Hall et al. | |
| 9,563,545 B2 | 2/2017 | Bennah et al. | |
| 10,586,200 B2* | 3/2020 | Ghavamzadeh ... | G06Q 30/0201 |
| 2004/0015846 A1 | 1/2004 | Haisraeli | |
| 2005/0015683 A1* | 1/2005 | Clark .................. | G06F 11/0751 |
| | | | 714/48 |
| 2005/0028077 A1 | 2/2005 | Wen et al. | |
| 2006/0106798 A1 | 5/2006 | Wen et al. | |
| 2006/0242288 A1* | 10/2006 | Masurkar ............ | G06F 11/0709 |
| | | | 709/223 |
| 2007/0156720 A1 | 7/2007 | Maren | |
| 2010/0064282 A1 | 3/2010 | Triou et al. | |
| 2012/0005560 A1* | 1/2012 | Steiner .................. | H03M 13/09 |
| | | | 714/780 |
| 2013/0046724 A1* | 2/2013 | Zhao ........................ | G06N 5/02 |
| | | | 706/52 |
| 2013/0074043 A1 | 3/2013 | Fu | |
| 2013/0268809 A1* | 10/2013 | Hoffmann ............. | G06F 11/004 |
| | | | 714/47.3 |
| 2014/0258187 A1* | 9/2014 | Suleiman ............... | G06N 20/00 |
| | | | 706/12 |
| 2015/0205782 A1 | 7/2015 | Subramanya et al. | |
| 2016/0055077 A1 | 2/2016 | Baloch et al. | |
| 2017/0010956 A1 | 1/2017 | Chen et al. | |
| 2017/0024311 A1 | 1/2017 | Andrejko et al. | |
| 2017/0102984 A1* | 4/2017 | Jiang .................... | G05B 23/024 |
| 2018/0218264 A1* | 8/2018 | Renders ................. | G06N 5/006 |
| 2019/0006206 A1* | 1/2019 | Higashi ............. | H01L 21/67028 |
| 2019/0073293 A1* | 3/2019 | Sharma ................. | G06N 20/00 |
| 2019/0102240 A1* | 4/2019 | Zarrini ............... | G06F 11/0709 |

FOREIGN PATENT DOCUMENTS

| | | |
|---|---|---|
| CN | 104516818 | 4/2015 |
| WO | 2005059744 | 6/2005 |
| WO | 2016004657 | 1/2016 |

OTHER PUBLICATIONS

Appavoo et al., "Enabling autonomic behavior in systems software with hot swapping." IBM systems journal 42.1, 2003, pp. 60-76. https://pdfs.semanticscholar.org/ee1b/c723187317a3bebd0af01d218e51b818b16b.pdf.

Petke et al., "Genetic Improvement of Software: a Comprehensive Survey," IEEE Transactions on Evolutionary Computation, vol. PP, Issue: 99, pp. 1-1, Apr. 25, 2017, Print ISSN: 1089-778X, Electronic ISSN: 1941-0026, DOI: 10.1109/TEVC.2017.2693219, http://ieeexplore.ieee.org/stamp/stamp.jsp?arnumber=7911210.

Kelong et al., "Implementation of automated testing system for android applications based on dynamic taint propagation," 2014 Communications Security Conference, pp. 1-5, DOI: 10.1049/cp.2014.0736, Referenced in: Cited by: Papers (1) IET Conference Publications. http://ieeexplore.ieee.org/stamp/stamp.jsp?tp=&arnumber=6992229.

Sterritt et al., "Autonomic Computing—a means of achieving dependability?." Engineering of Computer-Based Systems, 10th IEEE International Conference and Workshop on the IEEE, 2003.

Truszkowski et al., "The Challenge of Building Autonomous Software." IT Professional, vol. 6, Sep.-Oct. 2004, pp. 47-52, published Nov. 30, 2004, IISSN: 1520-9202, INSPEC Accession No. 8202596 DOI: 10.1109/MITP.2004.66.

\* cited by examiner

Price Range Constraint Fragment

402 {
((Minimum Price != null && Maximum Price != null && Minimum Price <= Maximum Price && Minimum Price >= $0.00 && Maximum Price <= $100.00) ||
(Minimum Price != null && Maximum Price == null && Minimum Price >= $0.00 && Minimum Price <= $100.00) ||
(Minimum Price == null && Maximum Price != null && Maximum Price >= $0.00 && Maximum Price <= $100.00) ||
(Minimum Price == null && Maximum Price == null))

Year Range Constraint Fragment

404 {
((Minimum Year != null && Maximum Year != null && Minimum Year <= Maximum Year && Minimum Year >= 1980 && Maximum Year <= 2017) ||
(Minimum Year != null && Maximum Year == null && Minimum Year >= 1980 && Minimum Year <= 2017) ||
(Minimum Year == null && Maximum Year != null && Maximum Year >= 1980 && Maximum Year <= 2017) ||
(Minimum Year == null && Maximum Year == null))

FIG. 4

Finalized Total Generalized Constraint

502
(((Minimum Price != null && Maximum Price != null && Minimum Price <= Maximum Price && Minimum Price >= $0.00 && Maximum Price <= $100.00) ||
(Minimum Price != null && Maximum Price == null && Minimum Price >= $0.00 && Minimum Price <= $100.00)
||
(Minimum Price == null && Maximum Price != null && Maximum Price >= $0.00 && Maximum Price <= $100.00)
||
(Minimum Price == null && Maximum Price == null))

&&

((Minimum Year != null && Maximum Year != null && Minimum Year <= Maximum Year && Minimum Year >= 1980 && Maximum Year <= 2017) ||
(Minimum Year != null && Maximum Year == null && Minimum Year >= 1980 && Minimum Year <= 2017) ||
(Minimum Year == null && Maximum Year != null && Maximum Year >= 1980 && Maximum Year <= 2017) ||
(Minimum Year == null && Maximum Year == null)))

FIG. 5

| Test # | Min Year | Max Year | expected result | optimized set |
|---|---|---|---|---|
| 1 | null | null | pass | 1 |
| 2 | below lower bound (fail) | null | fail | 1 |
| 3 | above lower bound (pass) | null | pass | 1 |
| 4 | above upper bound (fail) | null | fail | 1 |
| 5 | below upper bound (pass) | null | pass | 1 |
| 6 | mid range (pass) | null | pass | 1 |
| 7 | null | below lower bound (fail) | fail | 1 |
| 8 | null | above lower bound (pass) | pass | 1 |
| 9 | null | above upper bound (fail) | fail | 1 |
| 10 | null | below upper bound (pass) | pass | 1 |
| 11 | null | mid range (pass) | pass | 1 |
| 12 | below lower bound (fail) | below lower bound (fail) | fail | 2 |
| 13 | below lower bound (fail) | above upper bound (fail) | fail | 2 |
| 14 | below lower bound (fail) | above lower bound (pass) | fail | 3 |
| 15 | below lower bound (fail) | below upper bound (pass) | fail | 3 |
| 16 | below lower bound (fail) | mid range (pass) | fail | 3 |
| 17 | above lower bound (pass) | below lower bound (fail) | fail | 4 |
| 18 | above lower bound (pass) | above upper bound (fail) | fail | 4 |
| 19 | above lower bound (pass) | above lower bound (pass) | pass | 5 |
| 20 | mid range (pass) | mid range (pass) | pass | 5 |
| 21 | below upper bound (pass) | below upper bound (pass) | pass | 5 |
| 22 | above lower bound (pass) | below upper bound (pass) | pass | 6 |
| 23 | above lower bound (pass) | mid range (pass) | pass | 6 |
| 24 | mid range (pass) | below upper bound (pass) | pass | 6 |
| 25 | above upper bound (fail) | above lower bound (pass) | fail | 7 |
| 26 | above upper bound (fail) | below upper bound (pass) | fail | 7 |
| 27 | above upper bound (fail) | mid range (pass) | fail | 7 |
| 28 | above upper bound (fail) | below lower bound (fail) | fail | 2 |
| 29 | above upper bound (fail) | above upper bound (fail) | fail | 2 |
| 30 | below upper bound (pass) | below lower bound (fail) | fail | 4 |
| 31 | below upper bound (pass) | above upper bound (fail) | fail | 4 |
| 32 | below upper bound (pass) | above lower bound (pass) | fail | 8 |
| 33 | below upper bound (pass) | mid range (pass) | fail | 8 |
| 34 | mid range (pass) | above lower bound (pass) | fail | 8 |
| 35 | mid range (pass) | below lower bound (fail) | fail | 4 |
| 36 | mid range (pass) | above upper bound (fail) | fail | 4 |

FIG. 7

SYSTEM FOR OPTIMIZING SYSTEM RESOURCES AND RUNTIME DURING A TESTING PROCEDURE

CROSS-REFERENCE TO RELATED APPLICATIONS

The present application is related to U.S. patent application Ser. No. 15/905,362, filed on Feb. 26, 2018, which is hereby incorporated by reference in its entirety. The present application is also related to U.S. patent application Ser. No. 15/994,910, filed on May 31, 2018, "System for Understanding Navigational Semantics via Hypothesis Generation and Contextual Analysis"; U.S. patent application Ser. No. 15/994,869, filed on May 31, 2018, "System for Providing Intelligent Part of Speech Processing of Complex Natural Language"; U.S. patent application Ser. No. 15/994,851, filed on May 31, 2018, "System for Discovering Semantic Relationships in Computer programs; and U.S. Patent application Ser. No. 15/994,845, filed on May 31, 2018, "System for Providing Autonomous Discovery of Field or Navigation Constraints," all of which are hereby incorporated by reference in the present disclosure in their entireties.

FIELD OF THE INVENTION

The present application relates to computing technologies, natural language processing technologies, machine learning technologies, testing technologies, hypothesis testing technologies, constraint determination technologies, software evaluation technologies, software optimization technologies, and more particularly, to a system and method for optimizing system resources and runtime during a testing procedure.

BACKGROUND

In today's technologically-driven society, users and businesses are increasingly relying on software application and computing systems for facilitating and providing various types of services. As the reliance and dependence on software applications and computing systems has increased, so has the need to provide rapid and accurate updates to software applications and computing systems that are tailored to users' and businesses' ever evolving needs. In order to ensure that rapid and accurate updates to software applications and computing systems are provided, efficient and effective testing of such software applications and computing systems should be performed to ensure that users and businesses experience minimal errors, minimal inaccuracies, and/or optimized functionality when interacting with such software applications and computing systems. To that end, in order to test, exercise, and/or navigate through a software application, it is often desirable to understand existing or desired constraints on fields (e.g., input fields) of the software application, the order of operations to be conducted within the software application, and/or functional transitions between various states of the software application.

Constraints may be restrictions on the valid values which may be entered into a particular field. For example, constraints may be physical, such as an English keyboard, which does not easily allow for non-English characters, such as Chinese. That is, a constraint constrains the user to the English character set. In certain instances, the constraint may be within the software, such as a constraint that does not allow a first user to update a second user's personal information. More commonly, a constraint can be a restriction on the allowable values that may be entered into some field on a computer application page. For example, maybe a "Month" field on some web page only allows the values 1-12, and any other value results in an error. In certain scenarios, the constraint may be that certain fields, menus, or buttons (or any other type of widget) are accessible (or not accessible) for a given user navigating the page. In certain embodiments, a field may comprise, but is not limited to, an input field (i.e. an input field of an application under evaluation 230 that can take any input), an output field (i.e. an output field of an application under evaluation 230 that can have any output), parameters (e.g. parameters of application programming interfaces (APIs)(e.g. REST APIs, HTTP/HTTPS calls, or other APIs)), an allowable value in an input and/or output media device (e.g. audio, video, image, text, virtual reality content, augmented reality content, any media of the first and/or second user device 102, 111), any type of field, or a combination thereof.

Typically, all constraints in some group may need to be satisfied to allow for some behavior, such as navigating to a next screen in a software application. Constraints may be derived or specified manually, or may be input via a template requirements entry process, such as an entry process facilitated by a computing system. Constraints may be on parameters in an API such as a REST API, HTTP/HTTPS API, or any other API. A computing system, such as the existing Rational Rose system, may be capable of generating a model of the software application, including constraints, if given a highly detailed and complete set of computer system requirements developed using a rigid grammar. Unfortunately, such computing systems do not significantly eliminate the additional manual labor involved in generating the desired model. Instead, such systems shift the manual effort from that of model development to one of detailed requirements development. While such systems may automatically generate tests from the manually developed model, the models must continually be updated and changed to reflect a rapidly evolving software solution. Such continual maintenance efforts are not cost effective, and consequently, tests generated through such manually specified processes are considered brittle, i.e., the tests cannot accommodate minor changes to the software or system under evaluation and break easily. In certain scenarios, constraints may be generated naively by utilizing brute force algorithms that try many different values. For example, when performing boundary detection, an algorithm used by such naive systems might be a binary search algorithm, which inputs successive values by dividing the search space at each stage in half. While in general such searches are computationally efficient when compared to a more simplistic solution which tests possible values in a linear sequence, binary search algorithms are significantly less efficient than guided systems which preferentially test high probability, predicted boundaries first. In certain scenarios, constraints may involve one or more parameters from one or more web pages, and may be written in relational logic, temporal logic, mathematical formulas, or many other types of grammars or languages.

Other systems may discover computer program constraints through the analysis of execution traces. In the context of websites, for example, in order to move past website pages and forms, current approaches may either require human aid for website form data selection or such approaches generate randomized data as inputs. Execution traces are then collected, by exercising an application utilizing this human aid. Given a suitable quantity of execution traces, currently disclosed systems may generate a set of likely program constraints. The process is error prone and difficult to verify, and requires a large volume of execution traces, making the approach impractical for extracting website semantics. Some research activities have demonstrated a limited capability to automatically explore a computer program and discover a generalized model of the computer program's behavior. However, such systems cannot effectively relate the self-discovered model to the external stories, requirements, or other data sources defining the desired functionality of the computer program. As a consequence, testing of the self-discovered model generates tautological results of limited utility. Such systems cannot discover discrepancies between the self-discovered model and the desired functionality of the computer program. As a consequence, such systems cannot produce tests that verify the desired functionality exists within the computer program. Other semi-automated testing, exercise, and navigation systems are dependent on the manual development or human directed semi-automated development of computer program tests or exercise and/or navigation tools. Such systems can incorporate the significant knowledge of the human operator, including the human's knowledge of information internal and external to the computer program, and consequently, such systems often include directed and efficient tests of computer program constraints. However, such system's dependence on human input significantly limits their application.

While testing systems currently exist for semi-autonomously testing software applications and computing systems, such systems cannot effectively associate available textual information from sources, from which constraints may be determined or inferred, with the input field and/or navigation tasks that the constraints may restrict. Additionally, even when such associations are available, currently existing testing systems fail to intelligently process the textual information from various sources to extract constraints for input values, order of operations, and/or functional transitions for a software application being evaluated. As a result, currently existing testing systems attempt to discover constraints or appropriate values for such constraints through inefficient trial and error, through the parsing of models constructed using extensive manual input and labor, by examining the underlying software of the software application in detail, and/or through manual training of various aspects of the software application and/or computing systems supporting the software application. As an example, a software application may have an input field named "Price", which may have Minimum and Maximum subfields, currently existing testing systems are incapable of intuitively determining that the field is a dollar-denominated field. Such existing testing systems typically rely on trial and error to determine the correct data type and the constraints for the subfields. As another example, if an error message is outputted by a software application being tested, currently existing systems are unable to read and process the error message and to relate the error message to the constraints for the input fields of the software application. As a further example, a document may exist that describes the input field of the software application, however, currently existing systems are unable to associate the information in the document with the input field and/or determine constraints from the documentation. Notably, if the software application has many input fields and parameters, or even a few sufficiently complex parameters, it may be virtually impossible to satisfy all the constraints to allow for successful navigation through the software application using currently existing trial and error techniques because of combinatorial effects.

Based on the foregoing, for existing systems, substantial manual effort may be required to understand a software application and to build a model with states, transitions, and/or constraints. For large systems, such a manual effort is likely intractable, and, thus, businesses will continue with navigating, exercising, and testing of software applications by using solutions that are dependent on accessing software application source code, detailed software application models, and/or solutions requirement human written software scripts and/or tests. Further, as the model is constructed using manual techniques, which are themselves prone to error, significant additional manual validation and verification must be performed on the manually generated model before it can be used for effectively evaluating a target application. Additionally, for such systems, businesses may rely on human directed training (i.e. recording steps taken by a human operator), or the direct human exercise of the software application being evaluated.

As a result, current testing technologies and processes may be modified and improved so as to provide enhanced functionality and features. Such enhancements and improvements may effectively decrease the effort required to determine and test constraints, while simultaneously improving the accuracy of the testing system. Additionally, such enhancements and improvements may provide for optimized constraint determination, increased application navigation capabilities, increased testing capabilities, increased learning capabilities, increased autonomy, improved interactions with users or devices, improved user satisfaction, increased efficiencies, increased access to meaningful data, substantially-improved decision-making abilities, and increased ease-of-use. Furthermore, such enhancements and improvements may reduce processor, memory, and network bandwidth usage. Moreover, such enhancements and improvements may increase a testing system's ability to test software applications more efficiently and effectively.

SUMMARY

A system and accompanying methods for optimizing system resources and runtime during a testing procedure are disclosed. Notably, the system and accompanying methods may be utilized to utilize data and textual information obtained from outputs of a software application, internal documents, external documents, hierarchical and/or graphical models, other information sources, or a combination thereof, to determine or infer the proper constraints across complex parameters and/or across related parameter fields to allow for the successful navigation, exercise, and/or testing of the software application. Additionally, the system and methods provide for state, transition, and constraint exploration based upon continuous generation, execution, and analysis of semantic hypotheses based on likely semantic suggestions from integrated knowledge sources. In certain embodiments, the system and methods provide for the state and/or transition constraint exploration based upon the natural language context of associated labels and correlated internal and/or external document sources. In order to accomplish the foregoing, the system and methods may correlate labels, help text, menus, error messages, audio alerts, multimedia training materials, and other information, which may be displayed by the software application with the input field, order of operations, and/or transition constraints of interest associated with a software application. Additionally, the system and methods may correlate information from one or more internal and/or external document sources with the input field, the order of operations, and/or transition constraints of interest associated with the software application.

Based on the correlations, the system and methods may include performing natural language processing on textual information extracted from the correlated application data and associated internal and/or external document information to generate one or more suggested constraints for the input field (e.g., input field), the order of operations, and/or the transitions of the software application. In certain embodiments, the suggested constraints may include one or more confidence values, which may be based on a variety of factors. In certain embodiments, the confidence value(s) may be based on the strength of the correlation or association between the process information and the field, order of operations, and/or transitions of the software application, the quality of the natural language processing of the textual and contextual information, the source of the textual information (e.g. the system may trust one source (e.g. an internal API document) over another source (an online source or internet document) and thus having a higher confidence value for the API document source), the number of reinforcing and/or conflicting sources of constraint information, the complexity of the constraint, the history of the constraint (e.g., age, repeatedly suggested, number or range of values historically which used the constraint, etc.), any other factor, or a combination thereof. In certain embodiments, the suggested constraints may include, but are not limited to, types of values for input fields and/or parameters of the software application (e.g. the input field is a dollar-denominated field), appropriate default values for the fields and/or parameters (e.g. a zero dollar value may be assumed for an input field), appropriate formatting settings for the values for the fields and/or parameters (e.g. the values are real numbers to two decimal points of precision), appropriate constraints on the fields and/or values (e.g. values must be between 0.00 and 100.00), the order in which operations should be performed in the software application (e.g. which input fields of the software application are to be filled and in what precise order, whether the field is optional, whether the field is required, etc.), any other type of constraint-related information, or a combination thereof. In certain embodiments, the system 100 and methods may include merging or combining constraints if the information extracted from the various sources of information indicate that the constraints are compatible, related to each other, depend on one another, or a combination thereof, to improve the confidence value, to simplify and combine constraint, or to generate complex or relational constraints (e.g. a relational constraint having a requirement that a first input field have a value that is less than the value contained in a second input field). In certain embodiments, the system 100 and methods may include simplifying merged and/or combined constraints. In certain embodiments, the system 100 and methods may include detecting, based on analyzing the information provided by the various information sources, potential and/or actual defects in suggested constraints or conflicts between suggested constraints, desired constraints, or a combination thereof.

The system and methods may also include conducting hypothesis testing to increase the initial confidence value provided for the suggested constraint. In certain embodiments, the resulting increased confidence value may be utilized according to the system 100 and methods to keep or discard the hypothesized constraint, or prioritize the hypothesized constraint over other constraints—either existing or hypothesized. The system and methods may utilize a learning engine to assist in refining confidence values for suggested constraints over time as new information is obtained from information sources, as new information is obtained from the results of natural language processing of textual information received from the information sources, and/or new information is received from the software application being tested itself. In certain embodiments, the learning engine of the system may identify and flag a data source or a collection of data sources, for which the constraint hypotheses generated from the data source or collection of data sources have failed. The learning engine may keep a history of the results of hypothesis tests, and over time be able to learn which learning sources were the most accurate. Therefore, the learning engine may prefer the more accurate source if it ever needs to decide between two constraints, or if there are limited system resources, it may only use constraints from the accurate source, and not waste system resources with the less accurate source. In certain embodiments, the suggested constraints and/or related confidence values may be utilized to represent the software application being evaluated. In such embodiments, the constraint information may be utilized to successfully navigate or exercise the software application being evaluated. In another embodiment, the system and methods may include utilizing the constraints and/or related confidences to represent the desired or even intended functionality of the software application. In such an embodiment, the system and method may utilize the constraint information to support the autonomous testing of the software application being evaluated.

In certain embodiments, a softmatch method or function may be employed to correlate a potential constraint source with a target field of the application under evaluation, an order of operations of the application under evaluation, a transition of the application under evaluation, or a combination thereof. In certain embodiments, the softmatch method or function generates correlations, i.e. matches, where there may be some degree of uncertainty as to the correlation strength between the source and the target. In certain embodiments, the softmatch result may be computed from the application of one or more correlation similarity methods and may incorporate multiple pieces of data, text, concepts or constraints from the source or the target. In some embodiments, the softmatch may also utilize machine learning techniques to learn what constitutes high or low confidence matches over time, utilizing supervised learning results and/or the dynamically generated results of constraint hypothesis testing. In some embodiments, the confidences generated by the softmatch results, which constitute a match may return a normalized confidence value less than 1.0, where normalized match confidences values may range between 0.0 and 1.0). Where an explicit hard link between a constraint and a target field often requires manual generation, and where a hard link is often brittle, i.e. breaks under minor changes to the application under evaluation or its related documents, the softmatch may provide for the autonomous generation of correlations reflective of the present state of the application under evaluation 230 and related documents. Besides confidence, in some embodiments, the softmatch may be composed by having at least two similarity confidences computed. For example, a proximity check may determine that a source and target may be correlated based on their proximity to each other within the application under evaluation 230. Additionally, a comparison of parsed text extracted from the source data and target data may result in a natural language processing similarity score indicative of a correlation between the textual content of the source and target. In an embodiment of the system 100, the softmatch may merge two or more individually determined correlations into a combined score. In different embodiments, the combined score may be generated as an average, a weighted average, a min or max of the contributors, the score resulting from the most trusted source, a machine learned weighting, a normalized linear combination, a normalized non-linear combination, another method, or any combination thereof.

In one embodiment, the system may perform operations that include: identifying a source from an output of an application under evaluation by the system, extracting data from the source, parsing text from the source data, using at least one natural language processing process to extract a source concept from the parsed text, and determining a source constraint based at least in part on the source concept. Additionally, the system may identify a constraint target as a field of the application under evaluation, an order of operations of the application under evaluation, a transition of the application under evaluation, or a combination thereof. Furthermore, the system may extract data from the constraint target, which extracted data may also include data extracted from semantically related elements of the application under evaluation or existing correlation data. The system may also generate a potential correlation by performing a softmatch between source information and target information, where source information may include source data, source text, source concept(s), and source constraint(s), and where target data may include target data, target text parsed from target data, target concept(s), and existing constraint(s) extracted from target text using at least one natural language processing technique. The system may filter the potential correlation to remove correlations that do not meet other system criteria. The system may further associate the generated constraint with the target, wherein the generated constraint has a first confidence value, specified explicitly or implicitly.

In one embodiment, the system may perform operations that include: identifying a source from an output of an application under evaluation by the system, extracting data from the source, parsing text from the source data, using at least one natural language processing process to extract a source concept from the parsed text, and determining a source constraint based on the source concept. Additionally, the system may identify a constraint target as a field of the application under evaluation, an order of operations of the application under evaluation, a transition of the application under evaluation, or a combination thereof. Furthermore, the system may extract data from the constraint target. The extracted data may also include data extracted from semantically related elements of the application under evaluation or existing correlation data. The system may also generate a potential correlation by performing a softmatch between source information and target information, where source information may include source data, source text, source concept(s), and source constraint(s), and where target data may include target data, target text parsed from target data, target concept(s), and existing constraint(s) extracted from target text using at least one natural language processing technique. The system may filter the potential correlation to remove correlations that do not meet other system criteria. The system may further associate the generated constraint with the target, wherein the generated constraint has a first confidence value, specified explicitly or implicitly.

In another embodiment, the system may perform operations that include: identifying a source from an output of an application under evaluation by the system, extracting data from the source, parsing text from the source data, using at least one natural language processing process to extract a source concept from the parsed text, and determining a source constraint based on the source concept. Additionally, the system may identify a constraint target as a field of the application under evaluation, an order of operations of the application under evaluation, a transition of the application under evaluation, or a combination thereof. Furthermore, the system may extract data from the constraint target. The extracted data may also include data extracted from semantically related elements of the application under evaluation or existing correlation data. The system may also generate a potential correlation by performing a softmatch between source information and target information, where source information may include source data, source text, source concept(s), and source constraint(s), and where target data may include target data, target text parsed from target data, target concept(s), and existing constraint(s) extracted from target text using at least one natural language processing technique. The system may filter the potential correlation to remove correlations that do not meet other system criteria. The system may further associate the generated constraint with the target, wherein the generated constraint has a first confidence value, specified explicitly or implicitly. Moreover, the system may include conducting hypothesis testing on the suggested constraint to increase a confidence value of the suggested constraint to a greater confidence value.

In another embodiment, the system may identify a source from an output of an application under evaluation by the system, from documents internal to the system, documents external to the system, or a combination thereof. In a further embodiment, the system may iteratively or recursively, serially or in parallel, identify multiple sources from an output of an application under evaluation by the system, from documents internal to the system, documents external to the system, or a combination thereof. Similarly, in a further embodiment, the system may iteratively or recursively, serially or in parallel, identify multiple targets as a field of the application under evaluation, an order of operations of the application under evaluation, a transition of the application under evaluation, or a combination thereof. In such embodiments where multiple sources and/or targets are identified, an embodiment of the system may, serially or in parallel, iteratively or recursively, generate constraints, associate the constraints with targets, and assign confidence values to the constraints. In a further embodiment, a system may perform a screening filter using a subset of source data and/or a subset of target data, to generate a subset of high value source and constraint target pairings, using an operationally more efficient correlation screening method to reduce processing, network, memory or other performance loads. In such an embodiment, the system may calculate constraints and associated confidence values, and associate constraints to targets, only for those source and target pairs which pass the application of the screening filter.

In one embodiment, a system for optimizing system resources and runtime during a testing procedure is disclosed. The system may include a memory that stores instructions and a processor that executes the instructions to perform operations conducted by the system. The system may perform operations that include: enumerating a plurality of hypothesis tests; sorting the enumerated hypothesis tests into a plurality of sets; selecting a set of the plurality of sets for testing; determining a subset from the selected set for testing; selecting a test from the subset for testing; executing the test on an application under evaluation, wherein the test has an expected result; obtaining the test result; and determining if testing is ready to be completed.

In another embodiment, a method for optimizing system resources and runtime during a testing procedure is disclosed. The method may include: enumerating, by utilizing instructions from a memory that are executed by a processor, a plurality of hypothesis tests; sorting the enumerated hypothesis tests into a plurality of sets; selecting a set of the plurality of sets for testing; determining a subset from the selected set for testing; selecting a test from the subset for testing; executing the test on an application under evaluation, wherein the test has an expected result; obtaining the test result; repeating, based on test results, goals, conditions, or a combination thereof, the enumerating, the sorting, the selecting a set, the determining a subset, the selecting a test, the executing, the obtaining the test result, or a combination thereof, until testing is ready to be completed; and completing testing.

According to yet another embodiment, a computer-readable device, such as a non-transitory computer-readable device, having instructions stored thereon for optimizing system resources and runtime during a testing procedure is provided. The computer instructions, which when loaded and executed by a processor, may cause the processor to perform operations including: enumerating a plurality of hypothesis tests based on one or more goals; sorting the enumerated hypothesis tests into a plurality of sets; selecting a set of the plurality of sets for testing; determining a subset from the selected set for testing; selecting a test from the subset for testing; executing the test on an application under evaluation; obtaining the test result; determining if testing is ready to be completed; following a determination that the testing is not ready to be completed, repeating the enumerating, the sorting, the selecting a set, the determining a subset, the selecting a test, the executing, the obtaining the test result, the determining if testing is ready to be completed, or a combination thereof, until testing is ready to be completed; and completing testing.

These and other features of the systems and methods for optimizing system resources and runtime during a testing procedure are described in the following detailed description, drawings, and appended claims.

BRIEF DESCRIPTION OF THE DRAWINGS

FIG. 4 illustrates a pair of constraint fragments generated by the system of FIG. 1.

FIG. 5 illustrates the constraint fragments of FIG. 4 combined to form a finalized total constraint.

FIG. 7 illustrates one example of tests generated for testing a hypothesis in an application under evaluation according to an embodiment of the present disclosure.

DETAILED DESCRIPTION OF THE INVENTION

Figure 1:
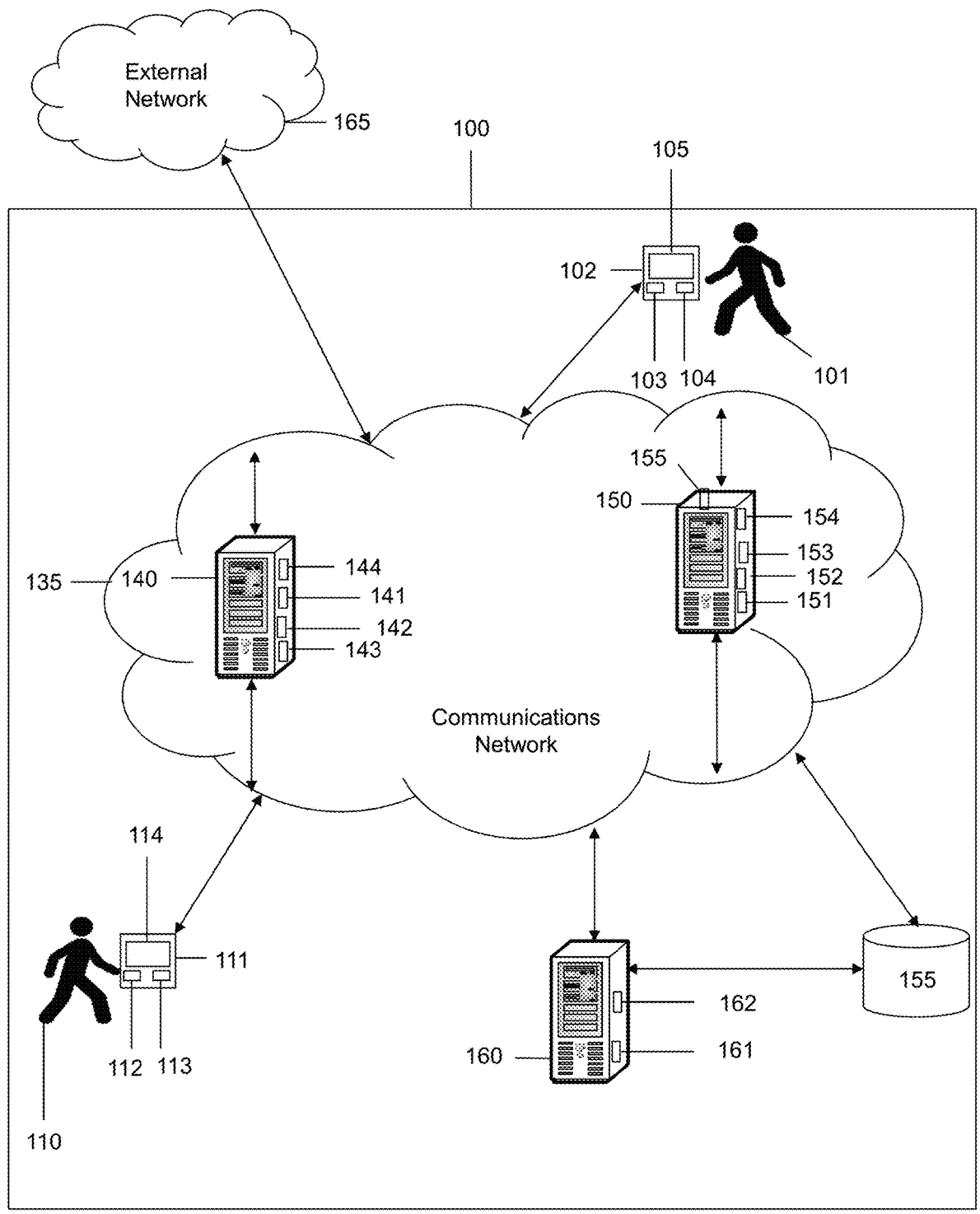
FIG. 1 is a schematic diagram of a system for understanding navigational semantics via hypothesis generation and contextual analysis according to an embodiment of the present disclosure.

A system 100 and accompanying methods for understanding navigational semantics via hypothesis generation and contextual analysis are disclosed. Notably, the system 100 and accompanying methods may be utilized to utilize data and textual information obtained from outputs of a software application, internal documents, external documents, hierarchical and/or graphical models, other information sources, or a combination thereof, to determine or infer the proper constraints across complex parameters and/or across related parameter fields to allow for the successful navigation, exercise, and/or testing of the software application (e.g. application under evaluation 230). In particular, the system 100 and methods provide for the state and/or transition constraint exploration based upon the natural language context of associated labels and correlated internal and/or external document sources. In order to accomplish the foregoing, the system 100 and methods may correlate labels, help text, menus, error messages, audio alerts, multimedia training materials, and other information, which may be displayed by the software application with the input field, order of operations, and/or transition constraints of interest associated with a software application. Additionally, the system 100 and methods may correlate information from one or more internal and/or external document sources with the input field, the order of operations, and/or transition constraints of interest associated with the software application.

Based on the correlations, the system 100 and methods may include performing natural language processing on textual information extracted from the correlated application data and associated internal and/or external document information to generate one or more suggested constraints for the input field, the order of operations, and/or the transitions of the software application. In certain embodiments, the suggested constraints may include a confidence value, which may be based on a variety of factors. In certain embodiments, the confidence value may be based on the strength of the correlation or association between the process information and the input field, order of operations, and/or transitions of the software application, the quality of the natural language processing of the textual and contextual information, the source of the textual information (e.g. the system may trust one source (e.g. an internal API document) over another source (an online source or internet document) and thus having a higher confidence value for the API document source), the number of reinforcing and/or conflicting sources of constraint information, the complexity of the constraint, the history of the constraint, any other factor, or a combination thereof. In certain embodiments, the suggested constraints may include, but are not limited to, types of values for input fields and/or parameters of the software application (e.g. the input field is a dollar-denominated field), appropriate default values for the fields and/or parameters (e.g. a zero dollar value may be assumed for an input field), appropriate formatting settings for the values for the fields and/or parameters (e.g. the values are real numbers to two decimal points of precision), appropriate constraints on the fields and/or values (e.g. values must be between 0.00 and 100.00), the order in which operations should be performed in the software application (e.g. which input fields of the software application are to be filled and in what precise order), a criteria (e.g., a required criteria, an optional criteria, any other criteria) any other type of constraint-related information, or a combination thereof. In certain embodiments, the system 100 and methods may include merging or combining constraints if the information extracted from the various sources of information indicate that the constraints are compatible, related to each other, depend on one another, or a combination thereof, to improve the confidence value, to simplify and combine constraint, or to generate complex or relational constraints (e.g. a relational constraint having a requirement that a first input field have a value that is less than the value contained in a second input field). In certain embodiments, the system 100 and methods may include simplifying merged and/or combined constraints. In certain embodiments, the system 100 and methods may include detecting, based on analyzing the information provided by the various information sources, potential and/or actual defects in suggested constraints or conflicts between suggested constraints, desired constraints, or a combination thereof.

The system 100 and methods may also include conducting hypothesis testing to increase the initial confidence value provided for the suggested constraint. In certain embodiments, the resulting increased confidence value may be utilized according to the system 100 and methods to keep or discard the hypothesized constraint, or prioritize the hypothesized constraint over other constraints—either existing or hypothesized. The system 100 and methods may utilize a learning engine 226 to assist in refining confidence values for suggested constraints over time as new information is obtained from information sources, as new information is obtained from the results of natural language processing of textual information received from the information sources, and/or new information is received from the software application being tested itself. In certain embodiments, the learning engine 226 of the system 100 may identify and flag a data source or a collection of data sources, for which the constraint hypotheses generated from the data source or collection of data sources have failed. The learning engine 226 may keep a history of the results of hypothesis tests, and over time be able to learn which learning sources were the most accurate. For example, a first source may be 99% accurate and a second source may only have 33% accuracy. Therefore, the learning engine 226 may prefer the more accurate source if it ever needs to "break a tie" between two constraints, or if there are limited system resources, it may only use constraints from the accurate source, and not waste system resources with the less accurate source. In certain embodiments, the suggested constraints and/or related confidence values may be utilized to represent the software application being evaluated. In such embodiments, the constraint information may be utilized to successfully navigate or exercise the software application being evaluated. In another embodiment, the system 100 and methods may include utilizing the constraints and/or related confidences to represent the desired or even intended functionality of the software application. In such an embodiment, the system 100 and method may utilize the constraint information to support the autonomous testing of the software application being evaluated.

In certain embodiments, a softmatch method or function may be employed to correlate a potential constraint source with a target field of the application under evaluation, an order of operations of the application under evaluation, a transition of the application under evaluation, or a combination thereof. In certain embodiments, the softmatch method or function generates correlations, i.e. matches, where there may be some degree of uncertainty as to the correlation strength between the source and the target. In certain embodiments, the softmatch result may be computed from the application of one or more correlation similarity methods and may incorporate multiple pieces of data, text, concepts or constraints from the source or the target. In some embodiments, the softmatch may also utilize machine learning techniques to learn what constitutes high or low confidence matches over time, utilizing supervised learning results and/or the dynamically generated results of constraint hypothesis testing. In some embodiments, the confidences generated by the softmatch results, which constitute a match may return a normalized confidence value less than 1.0, where normalized match confidences values may range between 0.0 and 1.0). Where an explicit hard link between a constraint and a target field often requires manual generation, and where a hard link is often brittle, i.e. breaks under minor changes to the application under evaluation or its related documents, the softmatch may provide for the autonomous generation of correlations reflective of the present state of the application under evaluation 230 and related documents. Besides confidence, in some embodiments, the softmatch may be composed by having at least two similarity confidences computed. For example, a proximity check may determine that a source and target may be correlated based on their proximity to each other within the application under evaluation 230. Additionally, a comparison of parsed text extracted from the source data and target data may result in a natural language processing similarity score indicative of a correlation between the textual content of the source and target. In an embodiment of the system 100, the softmatch may merge two or more individually determined correlations into a combined score. In different embodiments, the combined score may be generated as an average, a weighted average, a min or max of the contributors, the score resulting from the most trusted source, a machine learned weighting, a normalized linear combination, a normalized non-linear combination, another method, or any combination thereof. Notably, such enhancements and features reduce processor, memory, and network resource usage. Moreover, such enhancements and improvements more efficiently and effectively determine the proper constraints across various parameters and the proper hypotheses and tests to allow for the successful navigation, exercise, and/or testing of the software application when compared to existing testing systems.

As shown in FIGS. 1-6 and 11, a system 100 and method 600 for providing autonomous discovery of field and/or navigation constraints are disclosed. Notably, the system 100 may also be utilized to autonomously test a computing system as is described in further detail in U.S. Patent Application Ser. No. 15,905,362, filed on Feb. 26, 2018, which is incorporated by reference in its entirety. The system 100 may be configured to support, but is not limited to supporting, natural language processing services, machine learning services, data and content services, artificial intelligence services, computing applications and services, cloud computing services, internet services, satellite services, telephone services, software as a service (SaaS) applications and services, computing testing services, software testing services, hardware testing services, mobile applications and services, platform as a service (PaaS) applications and services, web services, client servers, and any other computing applications and services. The system 100 may include a first user 101, who may utilize a first user device 102 to access data, content, and applications, or to perform a variety of other tasks and functions. As an example, the first user 101 may utilize first user device 102 to access an application (e.g. a browser or a mobile application) executing on the first user device 102 that may be utilized to access web pages, data, and content associated with the system 100. In certain embodiments, the first user 101 may be any type of user that may desire to have content, such as text or other content, to be parsed by a natural language processing system, such as natural language processing engine 143, and to determine constraints for input fields of an application, constraints relating to an order of operations to be conducted by the application, and/or constraints for transitions occurring in the application (e.g. from one state of the application to another state). Additionally, the first user 101 may desire to have hypotheses associated with the constraints generated by the system 100 and/or tests for testing the hypotheses generated by the system 100 so that the constraints and/or hypotheses may be validated. In certain other embodiments, the first user 101 may be any type of user that may potentially desire to test one or more software applications created by the first user 101, created for the first user 101, under the control of the first user 101, being modified by the first user 101, associated with the first user 101, or any combination thereof. For example, the first user 101 may have created a software application that has functional features that manage, modify, and store human resource information for employees of a business. Of course, the system 100 may include any number of users and any amount of text may be parsed and any number of software applications may be tested.

The first user device 102 utilized by the first user 101 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102, to interact with various applications executing within the system 100, and to interact with the system 100 itself. In certain embodiments, the first user device 102 may include components that provide non-visual outputs. For example, the first user device 102 may include speakers, haptic components, tactile components, or other components, which may be utilized to generate non-visual outputs that may be perceived and/or experienced by the first user 101. In certain embodiments, the first user device 102 may be configured to not include interface 105. In certain embodiments, the first user device 102 may be a computer, a laptop, a tablet device, a phablet, a server, a mobile device, a smartphone, a smart watch, and/or any other type of computing device. Illustratively, the first user device 102 is shown as a mobile device in FIG. 1. The first user device 102 may also include a global positioning system (GPS), which may include a GPS receiver and any other necessary components for enabling GPS functionality, accelerometers, gyroscopes, sensors, and any other componentry suitable for a mobile device.

In addition to the first user 101, the system 100 may include a second user 110, who may utilize a second user device 111 to access data, content, and applications, or to perform a variety of other tasks and functions. As with the first user 101, in certain embodiments, the second user 110 may be any type of user that may desire to have content, such as text or other content, to be parsed by a natural language processing system, such as natural language processing engine 143, and to determine constraints for input fields of an application, constraints relating to an order of operations to be conducted by the application, and/or constraints for transitions occurring in the application (e.g. from one state of the application to another state). Additionally, the second user 110 may desire to have hypotheses associated with the constraints generated and/or tests for testing the hypotheses generated so that the constraints and/or hypotheses may be validated. Similarly, the second user 110 may be any type of user that may potentially desire to test one or more software applications created by the second user 110, created for the second user 110, under the control of the second user 110, being modified by the second user 110, associated with the second user 110, or any combination thereof. In certain embodiments, the second user 110 may be a user that may desire to test an application created, controlled, and/or modified by the second user 110, the first user 101, any number of other users, or any combination thereof. For example, the application may include one or more workflow items that have been modified and/or supplemented by the first user 101, the second user 110, and/or other users. Much like the first user 101, the second user 110 may utilize second user device 111 to access an application (e.g. a browser or a mobile application) executing on the second user device 111 that may be utilized to access web pages, data, and content associated with the system 100. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. a screen, a monitor, a graphical user interface, etc.) that may enable the second user 110 to interact with various applications executing on the second user device 111, to interact with various applications executing in the system 100, and to interact with the system 100. In certain embodiments, the second user device 111 may be a computer, a laptop, a tablet device, a phablet, a server, a mobile device, a smartphone, a smart watch, and/or any other type of computing device. Illustratively, the second user device 111 may be a computing device in FIG. 1. The second user device 111 may also include any of the componentry described for first user device 102.

In certain embodiments, the first user device 102 and the second user device 111 may have any number of software applications and/or application services stored and/or accessible thereon. For example, the first and second user devices 102, 111 may include human resource applications, artificial intelligence-based applications, machine learning-based applications, applications for facilitating the completion of tasks, cloud-based applications, search engine applications, natural language processing applications, database applications, algorithmic applications, phone-based applications, product-ordering applications, business applications, e-commerce applications, media streaming applications, content-based applications, gaming applications, internet-based applications, browser applications, mobile applications, service-based applications, productivity applications, video applications, music applications, social media applications, presentation applications, testing applications as described in U.S. Patent Application Ser. No. 15,905,362, filed on Feb. 26, 2018, software testing applications, hardware testing applications, computer testing applications, any other type of applications, any types of application services, or a combination thereof. In certain embodiments, the software applications may be applications under evaluation 230, which are described in further detail below. In certain embodiments, the software applications and services may include one or more graphical user interfaces so as to enable the first and second users 101, 110 to readily interact with the software applications. The software applications and services may also be utilized by the first and second users 101, 110 to interact with any device in the system 100, any network in the system 100, or any combination thereof. For example, the software applications executing on the first and second user devices 102, 111 may be applications for receiving data, applications for storing data, applications for receiving demographic and preference information, applications for transforming data, applications for executing mathematical algorithms, applications for generating and transmitting electronic messages, applications for generating and transmitting various types of content, applications for interacting with testing software (e.g. as described in U.S. Patent Application Ser. No. 15,905,362, filed on Feb. 26, 2018), any other type of applications, or a combination thereof. In certain embodiments, the first and second user devices 102, 111 may include associated telephone numbers, internet protocol addresses, device identities, or any other identifiers to uniquely identify the first and second user devices 102, 111 and/or the first and second users 101, 110. In certain embodiments, location information corresponding to the first and second user devices 102, 111 may be obtained based on the internet protocol addresses, by receiving a signal from the first and second user devices 102, 111, or based on profile information corresponding to the first and second user devices 102, 111. In certain embodiments, the location information may be obtained by utilizing global positioning systems of the first and/or second user devices 102, 111.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry, and may be controlled by a service provider. The communications network 135 may also include and be connected to a cloud-computing network, a phone network, a wireless network, an Ethernet network, a satellite network, a broadband network, a cellular network, a private network, a cable network, the Internet, an internet protocol network, a content distribution network, a virtual private network, any network, or any combination thereof. Illustratively, server 140 and server 150 are shown as being included within communications network 135.

Notably, the functionality of the system 100 may be supported and executed by using any combination of the servers 140, 150, and 160. The servers 140, and 150 may reside in communications network 135, however, in certain embodiments, the servers 140, 150 may reside outside communications network 135. The servers 140 and 150 may be utilized to perform the various operations and functions provided by the system 100, such as those requested by applications executing on the first and second user devices 102, 111. Additionally, the servers 140, 150 may be configured to perform various operations of the static model discovery module 200, the model change management module 204, the dynamic model discovery module 206, the evaluators 220, the data transformers 232, the controller 224, the learning engine 226, the application under evaluation 230, any other component and/or program of the system 100, or a combination thereof. In certain embodiments, the server 140 may include a memory 141 that includes instructions, and a processor 142 that executes the instructions from the memory 141 to perform various operations that are performed by the server 140. The processor 142 may be hardware, software, or a combination thereof.

In certain embodiments, the server 140 may include a natural language processing engine 143, which may be comprised of hardware, software, or a combination thereof. The natural language processing engine 143 may include one or more modules and/or components including, but not limited to, a controller, one or more semantic libraries and/or databases, and/or one or more graph databases. In certain embodiments, the natural language processing engine 143 may reside and/or execute in the communications network 135 (such as in servers 140 and/or 150), the server 160, the first and/or second users devices 102, 111, any other component or device of the system 100, or any combination thereof. Illustratively, natural language processing engine 143 is shown as residing in server 140. In certain embodiments, the natural language processing engine 143 may reside in the external network 165, in other components of the system 100, and/or in any other desired system. In certain embodiments, the natural language processing engine 143 may be an off-the-shelf natural language system that has been enhanced by the functionality and features as described herein for the system 100, the method 600, and/or otherwise. In certain embodiments, the functionality and features provided by the system 100 and/or method 600 may be utilized to enhance componentry within an off-the-shelf natural language processing system and/or componentry external to the off-the-shelf componentry of the natural language processing system that facilitates the operation of the natural language processing system. In certain embodiments, the natural language processing engine 143 may be software-as-a-service accessed by the system 100, such as a service provided by the external network 165.

Notably, the natural language processing engine 143 may utilize, include, and/or incorporate the functionality of any existing natural language processing system. In certain embodiments, content, such as but not limited to text content, media content (e.g. image content, video content, etc.), text derived from audio content, any type of content, or any combination thereof, may be preprocessed by the system 100 to extract text from the content. The extracted text may then be fed to the natural language processing engine 143 for further processing. For example, the natural language processing engine 143 may utilize one or more natural language processing techniques to analyze the extracted text to determine a context associated with the text, relationship between words and/or groups of words in the text, meaning in the text, an intent of the text, or any combination thereof. In certain embodiments, system 100 and/or the natural language processing engine 143 may be configured to include functionality to comprehend human language and/or speech, text in digital documents, text extracted from media content in digital files, text extracted from any type of audio content, text extracted from virtual reality content, text extracted from augmented reality content, any other comprehendible and/or parseable text, or any combination thereof. For example, the natural language processing engine 143 may be configured to comprehend human language and/or speech text that is spoken, written, symbolized, or a combination thereof, and may be configured to determine contextual information associated therewith. In certain embodiments, the system 100 and/or the natural language processing engine 143 may be configured to directly extract text from content without having the content being preprocessed first.

In certain embodiments, the natural language processing engine 143 may be configured to analyze and/or parse text (or other content and information) extracted from content included in inputs provided by any of the devices and components in the system 100, text extracted from content existing and/or accessible on the first and/or second user devices 102, 111, text extracted from content on any of the devices of the system 100, text extracted from content from any source external to the system 100 (e.g. external network 165), text extracted from content that has been scanned or otherwise uploaded into the system 100, text extracted from documents, text extracted from pictures, text extracted from video, text extracted from audio, or any combination thereof. The natural language processing engine 143 may apply and utilize natural language processing analysis techniques and/or rules to the text and/or content parsed by the natural language processing engine 143. For example, in certain embodiments, the natural language processing engine 143 may be configured to utilize its analysis techniques and/or rules to consider the context and meaning of words, phrases, sentences, paragraphs, or other groupings of words extracted from inputs or sources of information. Additionally, the natural language processing engine 143 may be configured to determine the context and relationship of each word and/or group of words in an input to other words and/or groups of words in the same input and/or other different inputs or sources of information. In certain embodiments, the natural language processing engine 143 may be utilized to determine if text and/or content parsed from a particular input corresponds, relates, and/or matches with text and/or content existing in the system 100, such as in software code or documents associated with an application under evaluation 230 by the system 100, application pages and/or web pages, documents and files in the database 155, and documents, programs, and files utilized, provided, received and/or stored by the internal data sources 201, the external data sources 202, the static model discovery module 200, the model change management module 204, the dynamic model discovery module 206, the agglomerated models 208, the evaluators 220, the data transformers 232, the outputs 240, the controller 224, the learning engine 226, or any combination thereof.

In certain embodiments, the natural language processing engine 143 may process and/or store media content, such as photographs, video content, audio content (e.g. audio recording corresponding to the text, for example), augmented reality content, virtual reality content, and/or any other information in association with terms, concepts, keywords, and/or identifiers (e.g. such as in semantic libraries) so that when such terms, concepts, keywords, and/or identifiers are encountered on a subsequent occasion, the natural language processing engine 143 may rapidly detect the terms, concepts, keywords, and/or identifiers. In certain embodiments, the natural language processing engine 143 may determine associations and similarities between the parsed text and content obtained from a document source with terms, concepts, keywords and/or identifiers stored in the system 100, such as by recognizing patterns in the attributes that correspond to the text and content, by determining synonyms, similarities, antonyms and/or dissimilarities for the text and/or content, by recognizing images and/or video (or other content) having similarities to the media content stored in the system 100, by performing any other natural language processing capabilities, or any combination thereof.

The controller of the natural language processing engine 143 may serve as the component of the natural language processing engine 143 that controls the functions and operations of the natural language processing engine 143. In particular, the controller may be configured to direct the natural language processing engine 143 to parse text and/or content from an input provided by a source (e.g. document file), analyze the parsed text and/or content for concepts and keywords, determine whether the parsed text and/or content match and/or correlate with concepts, keywords, content, terms, and/or identifiers from various document sources, and/or perform any of the other operations of the natural language processing engine 143. In certain embodiments, the controller may be configured to pass the parsed text and/or content through a series of semantic libraries so as to determine an initial set of potential concepts, words, keywords, content, and terms related to the parsed text and/or content in the input. Additionally, the controller may utilize any number and/or any type of natural language processing algorithms to facilitate in this process. In certain embodiments, the concepts, keywords, content, and terms of the semantic libraries may be related to the parsed text and/or content based on the concepts, keywords, content and terms of the semantic libraries having words, letters, or sounds in common with the parsed text and/or content, based on the keywords, content, and terms being in a same subject matter area of the parsed text and/or content, based on the concepts, keywords, content and terms being typically used in conjunction with the terms used in the parsed text and/or content, based on the keywords, content, and terms having any relation to the parsed text and/or content, based on the concepts, keywords, content and terms matching the parsed text and/or content (e.g. matching nouns and verbs in the parsed text with terms in the libraries), or any combination thereof. The semantic libraries may incorporate any functionality and features of existing and/or traditional semantic query libraries. Additionally, the semantic libraries may be configured to include repositories of information and data, along with relationships and associations between concepts, keywords, words, content, and their meanings, to enable the controller to determine content and terms relevant and/or related to the parsed text and/or content obtained from the input. The semantic libraries may enable the controller to determine the relevant content and terms based on the intent and contextual meaning of the terms contained within the parsed text and/or content obtained from the input. In certain embodiments, the data and information contained in the semantic libraries may be structured and formatted so as to enable the controller to consider the context of the parsed text and/or content including, but not limited to, a location associated with the parsed text and/or content, an intent associated with the parsed text and/or content, variations in the parsed text and/or content, concepts associated with the parsed text and/or content, a country of origin associated with the parsed text and/or content, a language associated with the parsed text and/or content, a domain associated with the parsed content (e.g. human resources, banking, taxes, etc.), a type of grammar associated with the parsed text and/or content, any other contexts, or any combination thereof.

In certain embodiments, once the initial set of potential concepts, keywords, terms, and/or content are determined by the controller based on the passing of the parsed text and/or content through the semantic libraries, the controller may then compare the initial set of concepts, keywords, terms and/or content to a database, such as a graph database (e.g. database 155) to determine if additional terms and/or content are available and/or if more optimal terms and/or content related to the parsed text and/or content exist. The graph database utilized by the natural language processing engine 143 may incorporate any of the features and functionality of a traditional graph database, and may include additional concepts, keywords, terms, and/or content and machine instructions, media content, and/or information associated with the additional concepts, keywords, terms, and/or content. In certain embodiments, the graph database may utilize graph structures to represent and store data. Notably, the graph database may store relationships between the data and content stored within the graph database, and may store any type of data, content, and/or terms that may be utilized to assist in determining the content related to the parsed text and/or content obtained from the input. Data and content that is related to one another within the graph database may be readily retrieved by the graph database and/or system 100 based on their associations and/or correlations. In certain embodiments, the graph database may include additional concepts, keywords, content, and terms related to or associated with the parsed text and/or content that may not be contained in the semantic libraries. As a result, the graph database may serve as an additional resource for the controller to determine additional concepts, keywords, content, and terms associated with the parsed text and/or content that may be utilized by the natural language processing engine 143 for various purposes. If, based on the comparison to the graph database, additional concepts, keywords, terms, and/or content related to the parsed text and/or content obtained from the input are determined by the controller, these additional terms and/or content, along with the initial terms and/or content determined based on the semantic library comparison, may be utilized to obtain additional relevant information and/or content related to the text in the input.

In certain embodiments, the natural language processing engine 143 may be configured to parse text extracted from outputs of the application under evaluation 230. For example, the natural language processing engine 143 may be configured to parse text extracted from web pages of the application under evaluation 230, text extracted from content displayed on graphical user interfaces of the application under evaluation 230, text extracted from command line interfaces of the application under evaluation 230, such as, but not limited to, terminals or shells or API calls, including REST API calls, labels displayed and/or outputted by the application under evaluation 230 in connection with one or more input fields, help text, menus, errors messages, and other information which may be outputted or inputted into the application under evaluation 230. In certain embodiments, the natural language processing engine 143 may group labels, help text, text from menus, text from errors, and other possible groups by utilizing a visual grouping algorithm, which may be employed to detect which groups of text on an output screen of the application under evaluation 230, for example, should be considered together. In certain embodiments, the grouping may be an input to more complex logic of the system 100. In certain embodiments, the natural language processing engine 143 may be configured to parse text extracted from internal and/or external document sources (e.g. internal and external data sources 201, 202), such as, but not limited to, software and/or hardware documentation and manuals, requirements (e.g. user stories), defects, tutorials, code comments, help text, release notes, and/or other sources. When parsing the text, the natural language processing engine 143 may extract meaning from the text, determine relationships between the words in the text, contextual information from the text, an intent in the text, a sentiment in the text, any other information, or a combination thereof.

The system 100, such as via the natural language processing engine 143 or other desired component of the system 100, may correlate the parsed text with one or more input fields of the application under evaluation 230, an order of operations of the application under evaluation 230, and/or transitions of the application under evaluation 230 (e.g. transitioning from one state of the application under evaluation 230 to another state). Based on the correlations performed by the natural language processing engine 143, the system 100, such as via the natural language processing engine 143, may generate one or more constraint suggestions for the input fields, the order of the operations, and/or the transitions of the application under evaluation 230. In certain embodiments, the system 100, such as via the natural language processing engine 143, may generate an initial confidence value for each suggested constraint. The confidence value may indicate a percentage (e.g. from 0-100 or other desired scale) or likelihood that the suggested constraint is accurate for the given input field, order of operation, and/or transition of the application under evaluation 230. The confidence value generated for each suggested constraint may be generated based on a strength of the correlation performed by the natural language processing engine 143, a quality of the natural language processing of the textual and contextual information, a quantity of information sources that include information that reinforces and/or conflicts with the suggested constraint, any other factor, or a combination thereof.

In certain embodiments, the constraints suggested by the system 100 may include the suggested type of value for a given input field and/or parameter (e.g. strings, numerical values, Boolean values, phone numbers, zip codes, any types of characters, any types of information, etc.), default values for the input field and/or parameter (e.g. zero or another default value), a formatting setting for values for the input field and/or parameter (e.g. precision of numbers and/or how values should appear visually), and a range of acceptable values for the input field and/or parameter. Additionally, the suggested constraints may indicate the precise order of operations to be performed with regard to the application under evaluation 230. For example, the suggested constraint may indicate which fields need to be completed before other fields, such as to ensure effective use of the application under evaluation 230 that does not result in errors, misuse of the application under evaluation 230, or a combination thereof. Furthermore, if certain documents sources include information indicating that a particular constraint has features in common with another constraint, is related to another constraint, depends on another constraint, or has some association with another constraint, the system 100, such as via the natural language processing engine 143, may merge or combine the constraints into a complex constraint or relational constraint. For example, if the value of one input field is reliant on the value of another input field or parameters, the system 100 may merge the constraints accordingly. In certain embodiments, the merged constraints may be simplified by the system 100.

In further embodiments, the system 100, such as via the natural language processing engine 143 may determine and/or detect potential defects and/or conflicts associated with the suggested constraints. For example, if text parsed from certain document sources indicates that a constraint for the application under evaluation 230 should be that the range of values for a particular input field should be between 0-100 and text parsed from other document sources indicates that the constraint for the application under evaluation 230 should be 0-1000, and that the confidence value of the constraint having the range of values of 0-100 is higher than the constraint having the range of values between 0-1000, the system 100 may discard the constraint of the range of values between 0-1000 and may select the constraint having the range of values between 0-100. In certain embodiments, the system 100 may conduct hypothesis testing to increase the initial confidence value of a suggested constraint. For example, the hypothesis test may validate that a value outside of the 0-100 range (e.g. a value of 107) is rejected even though it is within the 0-1000 range, which thereby strengthens the confidence in the 0-100 range, while simultaneously lower the system's 100 confidence in the 0-1000 range for the suggested constraint. A hypothesis (or hypotheses) for testing a constraint may indicate how the system 100 expects the application under evaluation 230 to operate using the suggested constraint, along with expected outputs when input values are utilized with input fields, parameters, operations, and/or transitions of the application under evaluation 230. For example, the system 100 may generate a hypothesis for a constraint and may test various input values during testing of the application under evaluation 230. If the application under evaluation 230 fails based on the input values provided according to the hypothesized constraint, then the constraint confidence value may be lowered or the constraint may be discarded. However, if the application under evaluation 230 does not fail, and, instead, the input values are accepted and allow for expected functioning of the application under evaluation 230, the initial confidence value of the suggested constraint may be increased and/or the constraint may be kept by the system 100 as a candidate constraint.

Figure 2:
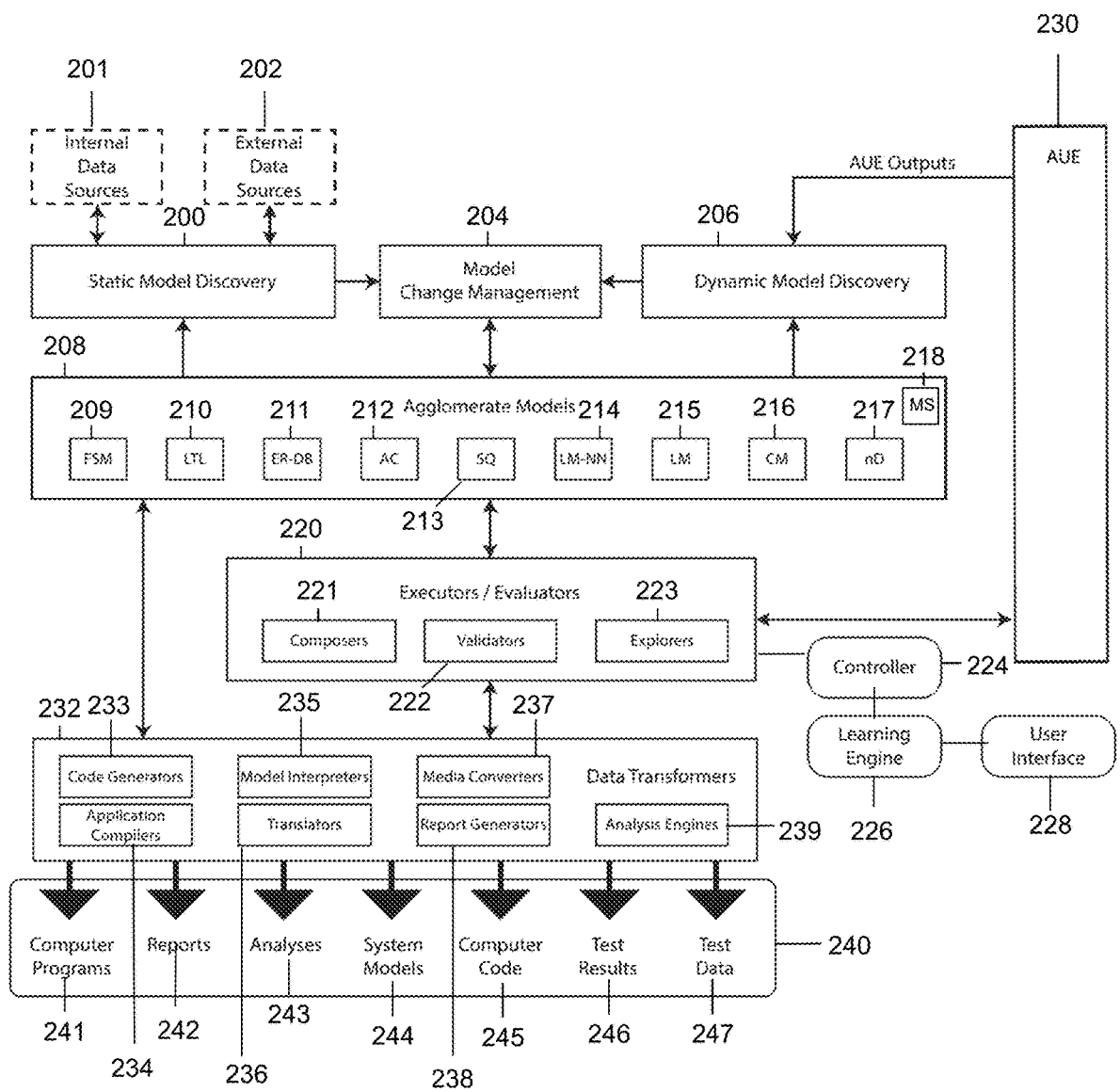
FIG. 2 is a schematic diagram illustrating various components of the system of FIG. 1, which facilitate the functional operation of the system of FIG. 1.

As the suggested constraints generated by the system 100 are tested, the results of the tests may be fed to the learning engine 226 for further processing. In certain embodiments, the learning engine 226 may adjust the confidence levels for the suggested constraint based on the results, may adjust confidence levels of constraints related to the tested constraints that the learning engine 226 is already familiar with or has access to, and may modify related constraints based on the results of the tests on the suggested constraint. Additionally, in certain embodiments, the learning engine 226 may update one or more constraints utilized with the agglomerated models 208, constraints utilized with the application under evaluation 230, constraints utilized with any other components, program, and/or function of the system 100 and/or as shown in FIGS. 1 and 2. The learning engine 226 may also provide instructions to the components of the system 100, such as the natural language processing engine 143, to adjust a manner in which the constraints are determined going forward for the application under evaluation 230, applications other than the application under evaluation 230, or a combination thereof.

Additionally, as the suggested constraints generated by the system 100 are tested, the results may also be fed to the executors/evaluators 220 of the system 100. For example, the results may be fed to the validators 222, which may be configured to evaluate the hypotheses generated by the system 100 and/or validate the tested constraints. In certain embodiments, the validation may be conducted by verifying that values inputted into the application under evaluation 230 that are outside of the constraint (or contrary to the constraint) are not allowed by the application under evaluation 230. In certain embodiments, validation may be conducted by verifying the suggested constraints relating to formatting of input values for input fields. For example, if the system 100 attempts to input a value in an input field of the application under evaluation 230 that has a precision outside the formatting of the suggested constraint and the application under evaluation 230 returns an error, the suggested constraint may be validated.

In certain embodiments, the server 140 may include a part-of-speech tagger 144, which may be software, hardware, or a combination thereof. In certain embodiments, the part-of-speech tagger 144 may reside within the natural language processing engine 143, be a companion program of the natural language processing engine 143, or be a separate program from the natural language processing engine 143. The part of speech tagger 144 may be a software program and/or function that may be configured to tag parts of speech for each word in a particular input. In certain embodiments, the part-of-speech tagger 144 may analyze text in an input, such as a sentence, and may attempt to assign, tag, and/or mark a part of speech for each word in the input. For example, the part-of-speech tagger 144 may label words in the input as nouns, verbs, adjectives, adverbs, prepositions, articles, direct objects, indirect objects, subjects of sentences, actions of sentences, and/or any other desired part of speech. The natural language processing engine 143 and/or the part-of-speech tagger 144 may be configured to perform substantive operations conducted by the system 100.

Much like server 140, the server 150 may include a memory 151 that includes instructions, and a processor 152 that executes the instructions from the memory 151 to perform the various operations that are performed by the server 150. In certain embodiments, the servers 140, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 150 may be communicatively linked to the communications network 135, any network, any device in the system 100, or any combination thereof. The server 150 may also include a knowledge engine 153, which may be software, hardware, or a combination thereof. In certain embodiments, the knowledge engine 153 may reside within the natural language processing engine 143, be a companion program of the natural language processing engine 143, or be a separate program from the natural language processing engine 143. In certain embodiments, the knowledge engine 153 may reside in server 140 or another component of FIG. 1 or 2, and/or may be integrated into any other program and/or component of the system 100, such as, but not limited to, any component of FIG. 2, the hypothesis tester 154, the part-of-speech tagger 144, the constraint solver 155, etc. In certain embodiments, the knowledge engine 153 may access and/or store source data, concepts, models (e.g. agglomerated models 208 and/or hierarchical and/or graphical representations of functionality of an application under evaluation 230), and information obtained from the internal data sources 201, external data sources 202, the application under evaluation 230, any component of FIGS. 1 and 2, or combination thereof. Additionally, the knowledge engine 153 may interact and integrate with the natural language processing engine 143 and may receive the outputs of the analyses and interpretations conducted by the natural language processing engine 143. Based on the information accessed and/or stored therein, the knowledge engine 153 and/or the natural language processing engine 143 may generate constraint suggestions for fields of an application under evaluation 230, an order of operations for the application under evaluation, and/or transitions for an application under evaluation 230. Additionally, the knowledge engine 153 may determine types of values of fields and/or parameters, and/or any other information for a constraint and/or values for a constraint.

The server 150 may also include a hypothesis tester/constraint resolution engine 154. The hypothesis tester 154 may be software, hardware, or a combination thereof. In certain embodiments, the hypothesis tester 154 may reside within the natural language processing engine 143, be a companion program of the natural language processing engine 143, or be a separate program from the natural language processing engine 143. In certain embodiments, the hypothesis tester 154 may reside in server 140 or another component of FIG. 1 or 2, and/or may be integrated into any other program and/or component of the system 100, such as, but not limited to, any component of FIG. 2, the knowledge engine 153, the part-of-speech tagger 144, the constraint solver 155, etc. The hypothesis tester 154 may generate hypotheses from suggested constraints generated by the system 100, and one or more tests for testing the hypotheses, such as with the application under evaluation 230. In certain embodiments, the hypothesis tester 154 may store hypotheses, and/or generate new hypotheses as new information is being processed by the system 100. In certain embodiments, the new hypotheses may be generated based on the results of previous hypotheses tested by the system 100. The hypothesis tester 154 may also resolve conflicts between suggested constraints and determine compatibilities between suggested constraints, such as for merging the constraints to form a generalized and/or complex and/or relational constraint. When testing hypotheses, the hypothesis tester 154 may determine input values for testing the hypotheses associated with the constraints and test the input values in the suggested constraints to either validate or reject the hypotheses. In certain embodiments, the hypothesis tester 154 may modify hypotheses and/or hypotheses tests based on the feedback generated in the system 100 based on the tests results of the hypotheses tests.

In certain embodiments, the server 150 may also include a constraint solver 155. The constraint solver 155 may be software, hardware, or a combination thereof. In certain embodiments, the constraint solver 155 may reside within the natural language processing engine 143, be a companion program of the natural language processing engine 143, or be a separate program from the natural language processing engine 143. In certain embodiments, the constraint solver 155 may reside in server 140 or another component of FIG. 1 or 2, and/or may be integrated into any other program and/or component of the system 100, such as, but not limited to, any component of FIG. 2, the hypothesis tester 154, the part-of-speech tagger 144, the knowledge engine 153, etc. In certain embodiments, the constraint solver 155 may independently or jointly with the hypothesis tester 154 generate a set of test cases to validate the hypotheses generated by the system 100. In certain embodiments, the constraint solver 155 may create a set of solutions for both the suggested constraint and also the negation of the suggested constraint.

The database 155 of the system 100 may be utilized to store and relay information that traverses the system 100, cache information and/or content that traverses the system 100, store data about each of the devices in the system 100, and perform any other typical functions of a database. In certain embodiments, the database 155 may store the output from any operation performed by the system 100, operations performed and output generated by the first and second user devices 102, 111, the servers 140, 150, 160, or any combination thereof. In certain embodiments, the database 155 may store a record of any and all information obtained from any data sources utilized by the system 100 to facilitate the operative functions of the system 100 and its components, store any information and data obtained from the internal and external data sources 201, 202, store the agglomerated models 208, store outputs generated by an application under evaluation 230, store feedback received from the first and second users 101, 110, the first and second user devices 102, 111 and/or other components of the system 100, store inputs entered into or utilized to interact with the application under evaluation 230, store software code 245 generated by the system 100, store reports 242 generated by the system 100, store analyses 243 generated by the system 100, store test results 246 generated by the system 100, store test data 247, store media content, store any information generated and/or received by the system 100, any other data traversing the system 100, or any combination thereof. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operations associated with the database 155. In certain embodiments, the database 155 may be connected to the servers 140, 150, 160, the first user device 102, the second user device 111, any devices in the system 100, any other device, any network, or any combination thereof.

The database 155 may also store information obtained from the system 100, store information associated with the first and second users 101, 110, store location information for the first and second user devices 102, 111 and/or first and second users 101, 110, store user profiles associated with the first and second users 101, 110, store device profiles associated with any device in the system 100, store communications traversing the system 100, store user preferences, store demographic information for the first and second users 101, 110, store information associated with any device or signal in the system 100, store information relating to usage of applications accessed by the first and second user devices 102, 111, store any information obtained from any of the networks in the system 100, store historical data associated with the first and second users 101, 110, store device characteristics, store information relating to any devices associated with the first and second users 101, 110, or any combination thereof. The user profiles may include any type of information associated with an individual (e.g. first user 101 and/or second user 110), such as, but not limited to, a username, a password, contact information, demographic information, psychographic information, an identification of applications used or associated with the individual, any attributes of the individual, any other information, or a combination thereof. Device profiles may include any type of information associated with a device, such as, but not limited to, operating system information, hardware specifications, information about each component of the device (e.g. sensors, processors, memories, batteries, versions, etc.), attributes of the device, any other information, or a combination thereof.

In certain embodiments, the database 155 may store algorithms and software facilitating the operation of the natural language processing engine 143, the part-of-speech tagger 144, the knowledge engine 153, the hypothesis tester 154, the constraint solver 155, the learning engine 226, the controller 224, the user interface 228, the agglomerated models 208, the evaluators 220, the data transformers 232, the static model discovery module 200, the model change management module 204, the dynamic model discovery module 206, the application under evaluation 230, the system 100 itself, any software application utilized by the system 100, or any combination thereof. In certain embodiments, the database 155 may be configured to store any information generated and/or processed by the system 100, store any of the information disclosed for any of the operations and functions disclosed for the system 100 herewith, store any information traversing the system 100, or any combination thereof. In certain embodiments, the database 155 may be configured to store dictionaries, semantic libraries for use by the natural language processing engine 143, information, text, and content obtained from outputs of the application under evaluation 230, information, text, and content obtained from documents sources internal and/or external to the system 100, correlations between parsed text and input fields, an order of operations associated with the application under evaluation 230, and transitions of the application under evaluation 230, suggested constraints generated by the system 100, merged constraints, validated constraints, hypothesis testing results, tests for testing hypotheses, constraints, and/or the application under evaluation 230, confidence values and/or levels of constraints, hypotheses, and/or techniques for determining the constraints (e.g. natural language processing techniques and/or machine learning techniques), confirmations and/or rejections of constraints, hierarchical and/or graphical models of the application under evaluation 230, functions of the application under evaluation 230, any type of function, any type of program, or a combination thereof, source concepts extracted from text parsed by the system 100, any information generated by the system, or a combination thereof. Furthermore, the database 155 may be configured to process queries sent to it by any device in the system 100.

In certain embodiments, the system 100 may communicate and/or interact with an external network 165. In certain embodiments, the external network 165 may include any number of servers, databases, or other componentry, and, in certain embodiments, may be controlled by a service provider. The external network 165 may also include and be connected to a cloud-computing network, a phone network, a wireless network, an Ethernet network, a satellite network, a broadband network, a cellular network, a private network, a cable network, the Internet, an internet protocol network, a content distribution network, a virtual private network, any network, or any combination thereof. In certain embodiments, the external network 165 may be accessed by the components of the system 100, such as the natural language processing engine 143 so that various sources of information may be consulted. For example, the natural language processing engine 143 may access resources of the external network 165 to compare information obtained from parsing text to information contained in the resources of the external network 165 to confirm analyses and interpretations made by the natural language processing engine 143 regarding the information and concepts. In certain embodiments, the external network 165 may be accessed by the components of the system 100 to obtain data and information that may potentially be utilized to discover models that may be included in the agglomerated models 208 (discussed later in this disclosure). For example, the system 100 may receive (or access) user stories, requirements, documentation, domain knowledge, existing test cases, computer software code, other data and information, or a combination thereof, provided by the external network 165 to assist in the creation and/or modification of one or more models of the agglomerated models 208. In certain embodiments, one or more components within the external network 165 may request the system 100 to test one or more of applications associated with the external network 165. In response, the system 100 may test the one or more applications and provide outputs 240 generated based on the testing to the external network 165. In certain embodiments, one or more of the models of the agglomerated models 208 may be transmitted to the external network 165.

The system 100 may also include a software application or program, which may be configured to perform and support the operative functions of the system 100. In certain embodiments, the application may be a software program, a website, a mobile application, a software application, a software process, or a combination thereof, which may be made accessible to users utilizing one or more computing devices, such as first user device 102 and second user device 111. In certain embodiments, the software application or program may include the natural language processing engine 143 and/or the part-of-speech tagger 144. The application of the system 100 may be accessible via an internet connection established with a browser program executing on the first or second user devices 102, 111, a mobile application executing on the first or second user devices 102, 111, or through other suitable means. Additionally, the application may allow users and computing devices to create accounts with the application and sign-in to the created accounts with authenticating username and password log-in combinations. The application may include a custom user interface 228 that the first user 101 or second user 110 may interact with, such as by utilizing a web browser or other program executing on the first user device 102 or second user device 111. In certain embodiments, the software application may execute directly as an installed program on the first and/or second user devices 102, 111, such as a mobile application or a desktop application. In certain embodiments, the software application may execute directly on any combination of the servers 140, 150, 160.

The software application may include multiple programs and/or functions that execute within the software application and/or are accessible by the software application. For example, the software application may include an application that generates web content and pages that may be accessible to the first and/or second user devices 102, 111, any type of program, or any combination thereof. The application that generates web content and pages may be configured to generate a user interface 228 for the software application that is accessible and viewable by the first and second users 101, 110 when the software application is loaded and executed on the first and/or second computing devices 102, 111. The user interface 228 for the software application may display content for viewing by the first and/or second users 101, 110 via the first and/or second user devices 102, 111. Additionally, the user interface 228 may display functionality provided by the software application that enables the first and second users 101, 110 and/or the first and second computing devices 102, 111 to interact with the software application and any modules supporting the software application's functionality. In certain embodiments, the software application may be configured to include the static model discovery module 200, the model change management module 204, the dynamic model discovery module 206, the agglomerated models 208, the evaluators 220, the data transformers 232, the learning engine 226, the controller 224, the user interface 228, the natural language processing engine 143, the part-of-speech tagger 144, the knowledge engine 153, the hypothesis tester 154, the constraint solver 155, any program or process in the system 100, or any combination thereof.

Referring now also to FIG. 2, various components of the system 100 are illustratively shown. The components of FIG. 2 may be utilized to facilitate the operation of the system 100 and facilitate the functionality of the natural language processing engine 143 and/or the part-of-speech tagger 144. In certain embodiments, the components illustrated in FIG. 2 may reside partially within communications network 135, entirely within communications network 135, entirely within the servers 140, 150, 160, partially within the servers 140, 150, 160, partially within the external network 165 (e.g. if the system 100 utilizes and/or accesses a remote natural language processing service provided by the external network 165), or any combination thereof. The system 100 may include one or more internal data sources 201. The internal data sources 201 may be data sources that contain data and information internal to the devices, processes, programs, and/or components of the system 100. The data and information included in the internal data sources 201 may include, but are not limited to, user stories, requirements, documentation, domain knowledge, existing test cases, computer software code, other data and information, or a combination thereof, which may be sources of text and content to be analyzed by the natural language processing engine 144 and/or the part-of-speech tagger 144, and may be utilized to facilitate the creation of models and/or update models utilized by the system 100, such as, but not limited to, the agglomerated models 208. User stories, for example, may comprise, but are not limited to, natural language descriptions of one or more features of a particular computing system, software application, hardware device, software feature, and/or hardware feature. Requirements may include, but are not limited to, descriptions of requirements for one or more features of a particular computing system or software application. In certain embodiments, user stories and requirements may include images, pictures, videos, sounds, and/or any type of media content that may be analyzed by one or more components of the system 100. For example, if a particular user story includes pictures, the pictures may be web screens (i.e. actual or proposed), the pictures may be of steps to take in a particular process, pictures associated with a configuration of the system 100 or another system, etc. In certain embodiments, optical character recognition (OCR) or other image recognition techniques may be utilized to obtain text from pictures or media content, and may be utilized to facilitate the system's 100 understanding of the pictures or media content. Documentation may include, but is not limited to, digital documents containing information and data, which may be parsed by the natural language processing engine 143 and/or part-of-speech tagger 144 to obtain data and information which may be of use by the system 100, such as to construct one or more of the agglomerated models 208 and to compute and/or confirm confidence in interpretations and analyses derived from analyzed text. Domain knowledge may include, but is not limited to, knowledge pertaining to a computing environment in which a particular computing system or application operates, the rules governing the domain, knowledge obtained from devices and users in the domain, user workflows, configurations and constraints utilized in the development of a software application, data pipelines, domain specific acronyms, domain specific rules, domain specific formulas, any other domain information, or a combination thereof. Test cases may be tests that the system 100 may utilize to validate and/or verify a software program, computing system, hardware, and/or anything that may be tested by the system 100. In certain embodiments, tests may comprise natural language descriptions of steps for the system 100 to take and items to verify in order to conduct a particular test. Computer software code may comprise, but is not limited to, a set of instructions that may form a computer program that may be executed by the system 100. The software code may also be analyzed and/or tagged by the natural language processing engine 143 and/or the part-of-speech tagger 144.

In certain embodiments, the system 100 may also include one or more external data sources 202. The external data sources 202 may be data sources that contain data and information external to the devices, processes, programs, and/or components of the system 100, which may be sources of text and content to be analyzed by the natural language processing engine 144 and/or the part-of-speech tagger 144. For example, the external data sources 202 may reside in networks outside of communications network 135 and may be not directly under the control of the system 100. The data and information included in the external data sources 202 may include, but are not limited to, user stories, requirements, documentation, domain knowledge, existing test cases, computer software code, web content, media content, data from external applications, outputs from devices external to the system 100, other data and information external to the system 100, or a combination thereof, which may be utilized to facilitate the creation of models and/or update models, such as the agglomerated models 208, which are discussed in further detail below. Additionally, the data and information in the external data sources 202 may be utilized by the natural language processing engine 143 and/or part-of-speech tagger 143 to confirm analyses, interpretations, and/or learning performed by the system 100. In certain embodiments, the data and information from the internal and external data sources 201, 202 (e.g. user stories, requirements, documentation, etc.) may be written and/or provided in natural language, in various natural language translations, and in various encodings. In certain embodiments, the data and information from the internal and data sources may be in provided in visual form (e.g. pictorially), in audible form, in source code, in pseudo-code, in virtual form, any form, or any combination thereof. In certain embodiments, the data and information may be in release notes, help files, and/or in other types of documents.

The system 100 may include a static model discovery module 200, which may be a software module executing within a software application that conducts the operations of the system 100. In certain embodiments, the static model discovery module 200 may comprise a combination of hardware and software. The static model discovery module 200 may perform processes associated with discovering model information from the internal and external data sources 201, 202, which may be utilized to generate one or more models of the agglomerated models 208. The models may comprise representations of systems, programs, functions, processes, or any combination thereof, which may be utilized as a basis for comparison to a computing system, program, application, and/or function to be analyzed and/or tested by the system 100. Model data extracted by the static model discovery module 200 from static sources, such as the internal and external data sources 201, 202 may contribute to the efficient and dynamic discovery of models associated with an application under evaluation 230. In certain embodiments, the static model discovery module 200 may be configured to discover model information from the internal and external data sources 201, 202 that does not generally change based on interactions between the system 100 and a particular application under evaluation 230. In certain embodiments, new documents from the internal and external data sources 201, 202 may be inserted and utilized at any time. In certain embodiments, a new document may include a new version of a previous document utilized by the static model discovery module 200. As a result, while a particular document may be static, the number of documents may not be. The static model discovery module 200 may be configured to recursively and continuously enhance model information extracted from the internal and external data sources 201, 202 through the use of agglomerated models 208 that have been developed from earlier static and dynamic model discovery, executor/evaluator 220 testing of hypotheses (e.g. testing hypotheses relating to the expected functionality of an application under evaluation 230), the data transformers 232, the learning engine 226, and user inputs received from the first and/or second users 101, 110 via the first and/or second user devices 102, 111.

In certain embodiments, the system 100 may include a model change management module 204, which may be a software module executing within a software application that conducts the operations of the system 100. In certain embodiments, the model change management module 204 may comprise a combination of hardware and software. The model change management module 204 may perform processes associated with modifying and/or updating agglomerated models 208 based upon static and dynamic discovery processes conducted by the static model discovery module 200 and the dynamic model discovery module 206, which is discussed in further detail below. In certain embodiments, the model change management module 204 may modify one or more models of the agglomerated models 208 specifically when source concepts extracted from the static and dynamic discovery processes are of a threshold confidence level or are within a range of confidence levels. In certain embodiments, the module change management module 204 may be configured to resolve conflicts and manage issues that may arise from simultaneous and asynchronous static and dynamic discovery. For example, if information obtained from a static discovery process performed by the static model discovery module 200 conflicts with information obtained from a dynamic discovery process performed by the dynamic discovery module 206, the model change management module 204 may arbitrate which information should be utilized to update the agglomerated models 208, which information should be excluded from updates to the agglomerated models 208, and which information should be modified prior to inclusion into the agglomerated models 208.

As indicated above, the system 100 may include a dynamic model discovery module 206, which may be a software module executing within a software application that conducts the operations of the system 100. In certain embodiments, the dynamic model discovery module 206 may comprise a combination of hardware and software. The dynamic model discovery module 206 may perform processes associated with discovering model information from a specific application under evaluation 230 that is being tested, analyzed, and/or explored by the system 100. For example, the dynamic model discovery module 206 may discover model information used to generate new models for the agglomerated models 208 or update existing models in the agglomerated models 208 based on information and data gathered from outputs generated based on interactions between the system 100 and the application under evaluation 230 being tested by the system 100. In certain embodiments, the dynamic model discovery module 206 may represent the model extraction component of the system 100 associated with interactions and hypothesis testing driven by evaluators 220 on the application under evaluation 230. In certain embodiments, the dynamic model discovery module 206 may recursively and continuously enhance model information extracted from interactions between the system 100 and the application under evaluation 230 through the use of agglomerated models 208 developed from earlier static and dynamic model discovery (i.e. previously conducted static and dynamic model discovery), executor/evaluator 220 testing of hypotheses (e.g. testing hypotheses relating to the expected functionality of an application under evaluation 230), the data transformers 232, the learning engine 226, and user inputs received from the first and/or second users 101, 110 via the first and/or second user devices 102, 111.

The system 100 may include a set of agglomerated models 208. In certain embodiments, the models may comprise representations of systems, programs, functions, processes, information, data, or any combination thereof, which may be utilized as a basis for comparison to a computing system, program, application, and/or function to be analyzed, and/or explored, and/or tested by the system 100. For example, a model of the agglomerated models 208 may be utilized by a software application performing the operations of the system 100 to determine whether a particular application under evaluation 230 has any defects, conflicts, or other issues based on a comparison of the model to one or more functions, features, and/or states of the application under evaluation 230. The agglomerated models 208 may include models contributed to or generated from an application under evaluation 230, and may be utilized to interpret unstructured and incomplete information obtained from the internal data sources 201, external data sources 202, the application under evaluation 230, any other source, or any combination thereof. For example, the agglomerated models 208 may be utilized to interpret information from JIRAs, application programming interface documents, user stories, code comments, requirements, release notes, tutorials, help texts, error messages, alerts, any other information, or any combination thereof. The agglomerated models 208 may be modified, updated, removed, replaced, or otherwise changed by the model change management module 204, and may be created based on information and data obtained from the internal and external data sources 201, 202 by the static discovery model module 200 and/or by information gathered from interactions by the system 100 with the application under evaluation 230 and/or other applications that have been already evaluated or will be evaluated in the future.

The agglomerated models 208 may include any type of model that may be utilized to perform the functionality provided by the system 100, and may represent data and information common to the operation of the system 100 across all applications under evaluation 230, within common domains of the applications under evaluation 230, and in representation of a single application under evaluation 230. For example, the agglomerated models 208 may include, but are not limited to, finite state machine (FSM) models 209, linear temporal logic (LTL) models 210, entity relationship/database (ER-DB) models 211, activity (AC) models 212, sequence (SQ) models 213, learning model/neural network (LM-NN) models 214, language (LM) models 215, conceptual (CM) models 216, n-Dimensional physical (nD) models 217, mathematical models (MS) 218, petri nets, any other models, or any combination thereof. In certain embodiments, the FSM model 209 may be an abstract, mathematical model of computation that may be in exactly one of a finite number of states at any given time. The FSM model 209 may be defined by a list of its states, its initial state or states, and the conditions for each transition. In certain embodiments, the LTL models 210 may comprise modal temporal logic models with modalities that refer to time. The ER-DB models 211 may be composed of entity types, which classify things of interest, and may specify relationships that may exist between instances of the entity types. In certain embodiments, entity relationships in the ER-DB models 211 may describe inter-related things of interest within a specific domain of knowledge. In certain embodiments, the ER-DB models 211 may represent the relations in a relational database. In certain embodiments, the ER-DB models 211 may include hypotheses, constraints, hypothesis tests, hypothesis test results, confidences levels, or a combination thereof. The AC models 212 may represent workflows of stepwise activities and actions with support for choice, iteration, and concurrency, such as with respect to activities conducted within an application being tested (e.g. application under evaluation 230). The SQ models 213 may be models that capture how objects in an application operate with one another and in what order.

The LM-NN models 214 may refer to a broad class of models that may be utilized in machine learning applications and/or artificial intelligence applications. In certain embodiments, the LM-NN models 214 may be trained based on internal and external feedback received by the system 100. Such feedback may relate to hypothesis testing, user feedback, and/or any other feedback received by the system 100. The LM models 215 may be probability distributions over sequences of words. For example, give a particular sequence of length m, a LM model 215 may assign a probability $P(w_1, \ldots, w_m)$ to the whole sequence. In certain embodiments, the LM models 215 may refer to a variety of models built over text, such as part of speech tagging, lemmatizing, parsing, regular expression matching, annotating, summarizing, rewriting, along with other techniques. The CM models 216 may be representations of systems, which may be made of the composition of concepts that are utilized to help, know, understand and/or simulate an application or domain concept. The CM models 216 may also include relationships amongst the various concepts. The nD models 217 may be models, which represent the geometric relationship of modeled components, and, in the case of dynamic physical models, their interactions. In certain embodiments, the nD models 217 may be linear (i.e. one-dimensional), planar (i.e. two-dimensional), spatial (i.e. three-dimensional), and/or multi-dimensional (i.e. n-dimensional). The MS models 218 may be models, which are mathematical and/or statistical models. For example, a sample MS model 218 may be a Bayesian network model.

The system 100 may include a plurality of evaluators 220 (can also be executors 220), which may be one or more software modules executing within a software application that conducts the operations of the system 100. In certain embodiments, the evaluators 220 may comprise a combination of hardware and software. The evaluators 220 may comprise a plurality of processes that generate data and information based on their interactions with a given application under evaluation 230. In certain embodiments, there may be several types of evaluators 220. A first type of evaluator 220 may be a composer 221, which may be configured to execute a series of steps on the application under evaluation 230 to generate results, which may be composed into one or more outputs. In certain embodiments, the composer 221 may execute a set of steps on the application under evaluation 230, while capturing screenshots or screen outputs for conversion into a media content video by a data transformer 232 of the system 100. For example, the media content video may be a training video to assist a user with navigating through various features and functions of the application under evaluation 230. As another example, the media content may be a problem recreation and/or debugging video to assist a developer or tester to debug a problem with the application under evaluation 230. In this scenario, the problem creation and/or debugging video may document the steps to recreate the problem that occurred in the application under evaluation 230 so that the developer or tester may readily perceive and/or visualize how the problem occurred. As yet another example, the media content may be a test verification video for facilitating the historical verification of tests for auditing purposes. When the test verification video is being utilized for auditing the verification of tests that have been run, the test verification video may be a video that proves that a test was executed and that the test was passed by the application under evaluation 230. Notably, any other media content may be generated by the composer 221 for any suitable and/or desired purpose as well. In certain embodiments, a composer 221 may execute a series of steps on an application under evaluation 230, while capturing statistical information, which may be utilized by an analysis engine 239 to generate analyses 243. In certain embodiments, a composer 221 may be configured to observe inputs into the application under evaluation 230 and outputs generated from a validator 222 and/or explorer 223 and generate composed output results. A second type of evaluator 220 is a validator 222, which may be configured to execute a series of steps on the application under evaluation 230 test-modeled functionality and/or to evaluate hypotheses generated by the system 100 as they relate to the functionality of the application under evaluation 230. The validators 222 may assist in developing high confidence agglomerated models 208 based on the series of steps executed or otherwise. In certain embodiments, the system 100 may require zero or more validators 222 to operate because trivial or special use cases exist where sufficient model confidence may be obtained without utilizing the functionality of the validators 222. A third type of evaluator 220 is an explorer 223, which may be configured to execute a series of steps on an application under evaluation 230 to dynamically explore and model the application under evaluation 230 in conjunction with the dynamic model discovery module 206. In certain embodiments, the explorers 223 may assist in the discovery and creation of models corresponding to the application under evaluation 230, correlating with one or more functions and/or features of the application under evaluation, or a combination thereof.

The system 100 may also include a controller 224, which may be software, hardware, or a combination thereof. The controller 224 may be configured to control the application, hardware, and/or components of the system 100 that facilitate the functionality of the system 100. In certain embodiments, the controller 224 may govern the high-level behavior of the system 100 itself, and may be configured to start the operation of the system 100, start subsystems of the system 100, and/or stop the operation of the system 100 and subsystems. In certain embodiments, the controller 224 may manage the configuration of the system 100, along with the configuration of the application under evaluation 230. The controller 224 may also direct the flow of control or flow of data between the various modules of the system 100, such as, but not limited to, the static model discovery module 200, the model change management module 204, the dynamic model discovery module 206, the evaluators 220, the data transformers 232, any other module or software in the system 100, or any combination thereof. In certain embodiments, the controller 224 may allocate and direct computing resources within the system 100. For example, the controller 224 may allocate and direct computing resources such as, but not limited to, memory (e.g. random-access memory), processors, and/or network resources. In certain embodiments, the controller 224 may also allocate and direct virtual computing resources, such as, but not limited to, containers, virtual machines, virtual processors, virtual memory (e.g. virtual random-access memory), cloud resources, virtual networks, other virtual resources, or any combination thereof. In certain embodiments, the controller 224 may direct the priority, the level of parallelism, and/or redundancy of various components in the system 100. In further embodiments, the controller 224 may control the backup and recovery of data and information stored and/or traversing the system 100. In still further embodiments, the controller 224 may be configured to control the operation of any program, hardware, and/or system associated with the system 100.

In addition to the controller 224, the system 100 may also include a learning engine 226. The learning engine 226 may be software, hardware, or a combination thereof, and may be supported by any suitable machine learning and/or artificial intelligence algorithms. The learning engine 226 may be a system that determines patterns and/or associations in behaviors or objects, such as, but not limited to, behaviors and/or objects of an application under evaluation 230 that is being analyzed and/or tested by the system 100. The learning engine 226 may allow for improved efficiency and accuracy of the system 100, while enabling more advanced static model discovery modules 200, evaluator 220 modules, and/or data transformer 232 modules. In certain embodiments, the learning engine 226 may allow for supervised learning, which may be supported through the user interface 228 that may be accessed and interacted with by the first user 101, the second user 110, and/or n-other users. For example, the learning engine 226 may receive inputs from the first and/or second users 101, 110 that endorse one or more models, test validation, perform sentence tagging in documents, etc. that may be utilized to enhance the agglomerated models 208, the operation of the system 100, and the knowledge base of the system 100. Additionally, the learning engine 226 may support unsupervised learning by automatically feeding validated test results from the evaluators 220 and statistical, performance-based, evaluator 220 results back through the system 100 as they are generated. In certain embodiments, the learning engine 226 may be configured to associate confidences or confidence levels with determined patterns and/or associations determined by the learning engine 226. Notably, the learning engine 226 may increase the confidence value of a particular pattern as the pattern is detected more frequently by the learning engine 226 over time, or lower the confidence value of the particular pattern if the pattern is contradicted in some regard or is not detected frequently over time. In certain embodiments, the confidence values may range from 0.0 to 1.0, however, any suitable scale may be utilized according to the present disclosure. In certain embodiments, the first user 101 and/or the second user 110 may be allowed to provide inputs via the first and/or second user devices 102, 111 to directly alter the confidence values. In certain embodiments, the first user 101 and/or the second user 110 may alter the confidence values via user interface 228 of the software application that performs the operative functions of the system 100. The user interface 228 may be made accessible to the first and/or second user devices 102, 111. In certain embodiments, the learning engine 226 may train or improve a model, parameter, a weight, dictionary, threshold, confidence, or filter associated with the generating of a future hypothesis; hypothesis test, test set, or test subset; hypothesis test, test set, or test subset exclusion; hypothesis test, test set, or test subset optimization; hypothesis test, test set, or test subset ordering; hypothesis test, test set, or test subset selection; or hypothesis test, test set, or test subset enumeration; wherein the training or improving is based on feedback, hypothesis test results, an internal document, an external document, the application under evaluation, the hypothesis, a similar hypothesis, a related hypothesis, a hypothesis test, a hypothesis abstract test, a hypothesis concrete test, a hypothesis test set, a hypothesis test subset, a hypothesis testing goal, a hypothesis testing enumeration, a hypothesis strategy, a hypothesis test ordering or classification, or any other source or combination thereof.

A sample use-case scenario may be utilized to illustrate how the first user 101 may adjust a confidence value. In this use-case scenario, the learning engine 226 may determine that each employee having an account being generated by an application under evaluation 230 has a phone number with a 0.95 confidence value. The first user 101 may review the learning engine's 226 determination and verify that the determination is accurate via an input transmitted via the first user device 102. Based on the first user's 101 verification, the learning engine 226 may increase the confidence value from 0.95 to 0.99 or even to 1.00 for an employee having a phone number. As another use-case scenario, the system 100 may determine from information gathered from the static model discovery module 200 that a user should not be able to change their date of birth in a user account created by an application. This determination, however, may be deemed as inaccurate or wrong by the first user 101. In this scenario, the learning engine 226 may alter the confidence value attributed to a user not being able to change the date of birth down to 0.01 or even to 0.00 from a higher confidence value originally determined by the learning engine 226. In contrast, the confidence value attribute to the user being able to change the date of birth may be increased by a certain amount by the learning engine 226. In certain embodiments, the verification of the learning engine's 226 determination may come from another source, such as another source of information. For example, a previous release or version of the application under evaluation 230 may have had the same or similar constraint. The finding of the same suggested constraint in the history of the application under evaluation 230 by the system 100 may provide a level of verification and allow improvement of the confidence associated with the suggested constraint.

The software application that facilitates the functional operations of the system 100 may include a user interface 228. The user interface 228 may be a graphical user interface, which may allow the first and/or second users 101, 110 and devices to interact with the software application performing the operations of the system 100. In certain embodiments, the user interface 228 may be a text-based terminal/command interface. The user interface 228 of the application may have both visual and auditory elements as output, and may be configured to receive keyboard inputs, mouse inputs, microphone inputs, screen inputs (e.g. touchscreen inputs) any type of inputs, or any combination thereof, from a user and/or device interacting with the user interface 228. In certain embodiments, the user interface 228 may be adapted to receive inputs and/or send outputs via user interface elements specifically configured for people with disabilities or challenging circumstances. In certain embodiments, an application programming interface (API) or software development kit (SDK) may be utilized for remote computers to connect with the system 100, and may input or output information as needed.

The system 100 may be configured to access, test, and/or interact with one or more applications under evaluation 230. An application under evaluation 230 may be a software application that the first and/or second user 101, 110 may wish to analyze and/or test by utilizing the system 100. In certain embodiments, instead of a user requesting that an application under evaluation 230 be analyzed or tested, a device, robot, and/or program may request the analyzing and testing of the application under evaluation 230. Based on interactions between the system 100 and an application under evaluation 230, information and data may be obtained to facilitate the creation of one or more models of the agglomerated models 208, the updating of one or more models of the agglomerated models 208, the verification of one or more models of the agglomerated models 208, or any combination thereof. In certain embodiments, the applications under evaluation 230 may be accessed, tested, and explored by utilizing the evaluators 220, which include the composers 221, validators 222, and explorers 223.

In certain embodiments, the system 100 may include a plurality of data transformers 232. In certain embodiments, the data transformers 232 may be software, hardware, or a combination thereof. The data transformers 232 may be configured to take one or more inputs, such as, but not limited to, the agglomerated models 208 and information and data obtained from the evaluators 220 to generate a useful output, such as by manipulating the data and information in the inputs. In certain embodiments, the system 100 may include any number of data transformers 232, which may include code generators 233, application compilers 234, model interpreters 235, translators 236, media converters 237, report generators 238, and analysis engines 239. The code generators 233 may be configured to access model inputs from the agglomerated models 208 and one or more objectives obtained from the evaluators 220, other data transformers 232, or even the code generators 233 themselves to create software code that satisfies the objectives. In certain embodiments, the software code generated by the code generators 233 may be utilized to fix a defect detected by the system 100 in an application under evaluation 230. In certain embodiments, the generated software code may be utilized to add, change, and/or remove functionality of the application under evaluation 230. In certain embodiments, the generated software code may be utilized to test or exercise the application under evaluation 230. In further embodiments, the generated code may be internal to the application under evaluation 230 or external to the application under evaluation 230, and the generated code may be related to the application under evaluation 230 or the generated code may benefit other software applications outside of the application under evaluation 230, such as applications that support the environment of the application under evaluation 230 (e.g. cloud programs, SaaS, operating systems, related applications, etc.). In certain embodiments, the generated code may be written and/or compiled by utilizing any suitable programming language, such as, but not limited to C, C++, Java, Python, and/or other language. In certain embodiments, the generated code may be generated at a high level, such as through the use of scripting languages, or low level, such as through the use of assembler/assembly languages. In certain embodiments, the generated code may be software that may enhance, replace, and/or modify the software application (including any modules) supporting the operation of the system 100. For example, the generated code may be utilized to update a start-up script based on execution patterns of the application under evaluation 230 or usage patterns of users of the application under evaluation 230.

The application compilers 234 may utilize outputs from the code generators 233 and compile the generated code into one or more computer applications/programs 241. In certain embodiments, the application compilers 234 may utilize inputs from the agglomerated models 208 and data from the evaluators 220, and incorporate such inputs and data when compiling software code. Inputs may also include compiler options, such as, but not limited to optimizations, performance goals, goals relating to the operation of the application under evaluation 230, configuration options, etc. The application compilers 234 may include target models (i.e. selected) of the agglomerated models 208 to improve directly or indirectly, such as by improving the functional features of the application under evaluation 230. The model interpreters 235 may be utilized in interpreting the models in the agglomerated models 208. In certain embodiments, the model interpreters 235 may comprise software, hardware, or a combination of hardware and software. An example use-case scenario of using a model interpreter 235 involves the use of a LM model 215. For the LM model 215, there may need to be a model interpreter 235, which is configured to understand the LM model 215 and how it relates to the application under evaluation 230, or how the application under evaluation 230 is understood by the evaluators 220. For example, the LM model 215 may tag or mark parts of speech or concepts found in paragraphs of text obtained from the internal or external data sources 201, 202, and the model interpreter 235 may be configured to comprehend the parts of speech as it pertains to the application under evaluation 230. In this case, the comprehension by the model interpreter 235 may comprise understanding an application page title, an application widget (e.g. text box, menu, pull down menu, radio button, etc.), an application user or role, an application message (e.g. alerts, emails, highlighted text, etc.), and/or any action in the application under evaluation 230 (e.g. create, read, update, delete, navigate, click, select, choose, enter, etc.)

The translators 236 may be software, hardware, or a combination thereof, and may take a model of the agglomerated models 208 or outputs from the evaluators 220, and convert them into a form that is more useful for a given task. As an example, a translator 236 may take a FSM model 209 and convert the FSM model 209 from a representation in a database 155 to a graphical representation, which may be more readily understood by the first or second user 101, 110. For example, the states of the FSM model 209 may be represented by circles or tiles, which further represent or illustrate a portion of the specific application that they represent. In certain embodiments, transitions between states may be shown as lines, which may have effects, which may imply characteristics of the transitions. Such effects may include adjusting thickness of a line to show popularity of use, a number of paths, complexity, or any other attribute. As another example, a translator 236 may take a LM model 215 or output from the evaluators 220, and convert them from English language to another language, such as Chinese or any other desired language, and vice versa. The translators 236 may also be utilized to translate from one encoding to a second encoding, such as from ASCII to Unicode. As yet another example, the translators 236 may take a SQL database (e.g. database 155) and convert it to a NOSQL database. Any translated information, programs, content, or output from the translators 236 may be fed into the agglomerated models 208, the evaluators 220, and/or the outputs 240 for further use by the system 100.

The media converters 237 of the system 100 may be configured to utilize outputs of the evaluators 220 and the agglomerated models 208 and convert them from a first form to a second form. In certain embodiments, the media converters 237 may be software, hardware, or a combination thereof. As an example of the operation of the media converters 237, the media converters 237 may take a textual description of the application under evaluation's 230 actions and steps, and convert them into listenable audio, which may be particularly useful to those with visual impairment. For those with hearing impairment, the media converters 237 could convert audio into text or images, which may be utilized for closed caption purposes in a presentation. The report generators 238 of the system 100 may be hardware, software, or a combination thereof, and may be utilized to create reports 242 based on the outputs of models of the agglomerated models 208, outputs from the evaluators 220, outputs from the data transformers 232, outputs from the application under evaluation 230, along with any other outputs received by the system 100. As an example, the report generators 238 may generate reports 242 that include the results of test cases executed on the application under evaluation 230 by the system 100 and/or reports of hypothesis tests. In certain embodiments, the outputs may simplify, summarize, and/or otherwise organize the data in the outputs. The analysis engines 239 may also comprise hardware, software, or a combination thereof. The analysis engines 239 may analyze the outputs of the agglomerated models 208, the outputs of the evaluators 220, the outputs of the data transformers 232 and any other outputs received by the system 100 to take an intelligent action. An intelligent action may include identifying a noteworthy condition based on the outputs analyzed, for example. The condition may be output in an analysis 243, and, in certain embodiments, the condition may be a defect detected in a test result 246. In certain embodiments, the condition may be based on the performance, popularity, complexity, or any other metric of a state or transition of a FSM model 209.

In addition to the functionality provided by the various components of the system 100 described above, the system 100 may also generate a variety of outputs 240 based on use of the components. The outputs 240 generated by the system 100 may include, but are not limited to, computer programs 241, reports 242, analyses 243, system models 244, computer code 245, test results 246, and test data 247. The computer programs 241 may be sets of instructions, which may be executed by various components of the system 100 to perform one or more tasks. As described above, the application compilers 234 may utilize outputs from the code generators 233 and compile the generated code into one or more computer applications/programs 241. The created computer programs 241 may be utilized to supplement functionality of an application under evaluation 230, integrated into an application under evaluation 230, replace functionality of the application under evaluation 230, modify functionality of the application under evaluation 230, or any combination thereof. The reports 242 may be generated by the report generators 238 of the system 100, and the reports 242 may be generated based on the outputs of models of the agglomerated models 208, outputs from the evaluators 220, outputs from the data transformers 232, outputs from the application under evaluation 230, along with any other outputs received by the system 100. The reports 242 may combine information from the outputs in a visual format, audio format, a format understandable by those with hearing and visual impairments, or any combination thereof. As an example, a report 242 may visually show all the successful paths that the evaluators 220 were able to take while testing the application under evaluation 230, along with any defects and/or any potential conflicts detected while exploring the functionality of the application under evaluation 230. Of course, any type of report 242 may be generated by the system 100, and a report 242 may include any information generated, received, stored, transmitted, and/or manipulated by the system 100.

The analyses 243 may be a type of output 240 of the system 100, which may identify a noteworthy condition, such as a condition associated with an application under evaluation 230 (e.g. a defect or conflict), a condition associated with one or more components of the system 100, any type of condition, or any combination thereof. The condition may be output in the analysis 243, and may be generated by the analysis engines 239. The system models 244 that may be output by the system 100 may comprise an architecture and/or behavior of the system 100 or any other system that the system 100 interacts with. For example, a system model 244 may be a model that describes an architecture or behavior of the application under evaluation 230, functions and products related to the application under evaluation 230, a computing environment associated with the application under evaluation 230, and/or an application related to the application under evaluation 230. In certain embodiments, the system model 244 may be one or more models from the agglomerated models 208. The computer code 245 may be an output 240 that comprises instructions for executing a task, such as on a processor of one or more of the components of the system 100. The computer code 245 may be generated by the code generators 233 and may be compiled by the application compilers 234. In certain embodiments, the computer code 245 may be obtained from the agglomerated models 208, the evaluators 220, and/or the data transformers 232. In certain embodiments, the computer code 245 may be utilized to supplement functionality of an application under evaluation 230, integrated into an application under evaluation 230, replace functionality of the application under evaluation 230, modify functionality of the application under evaluation 230, modify functionality of modules and applications supporting the functionality of the system 100, or any combination thereof.

The test results 246 of the outputs 240 may be results of executing various software, hardware, and/or application tests on components of the system 100, the application under evaluation 230, or any combination thereof. The test results 246 may be obtained based on tests and/or analyses conducted by the validators 222, the analysis engines 239, any of the evaluators 220, and/or any of the data transformers 232. In certain embodiments, the test results 246 may include information relating to a test, such as, but not limited to, an identifier identifying the type of test executed, inputs inputted into the test, outputs generated from the test, performance metrics associated with the test, or a combination thereof. In certain embodiments, the test results 246 may indicate whether the test was successful or a failure. If a failure occurred, additional data and metadata may be included with the test results 246, such as, but not limited to, call stacks, offsets within computer programs, source code, addresses of objects (e.g. objects within the application under evaluation or other components being tested), actual objects, memory dumps, screenshots, and/or any other information that may assist with failure remediation and/or analysis. In certain embodiments, test results 246 may include the test results of hypothesis tests. Test data 247 may be any information that pertains to the assessment of software, hardware, applications, or any combination thereof, that the system 100 interacts with. In certain embodiments test data 247 may include inputs and outputs of tests, executable and/or manual test steps, expected results of tests, actual results of tests, functional results of tests, performance results of tests, or any combination thereof. In certain embodiments, test data 247 may include metadata describing the tests, such as, but not limited to, how many tests exist, the priority or ordering of tests to be utilized, computer resources (e.g. memory resources, processing resources, etc.) assigned to and utilized for executing certain tests, instructions or media content (e.g. pictures, video, audio, etc.) describing the application under evaluation 230, any other information, or a combination thereof. In certain embodiments, test data 247 may include information that pertains to hypothesis tests and/or the test results of hypothesis tests.

Operatively, the system 100 may operate according to the following exemplary use-case scenarios as described in the context of method 600 and/or as otherwise described herein. Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving and processing inputs, including hierarchical and/or graphical models of various functionality of an application under evaluation 230, text or other content obtained from various sources, such as, but not limited to, the internal and external sources 201, 202, the knowledge engine 153, the learning engine 226, any other component of the system 100, or a combination thereof; analyzing text extract from the inputs, such as by utilizing one or more natural language processing or other techniques; determining source concepts from the analyzed text; determining suggested constraints for an application under evaluation 230 based on the analyzing and/or source concepts; generating one or more hypotheses associated with the suggested constraint and/or one or more tests for testing the hypotheses and/or suggested constraints; testing the hypotheses on a field, order of operations and/or transition of an application under evaluation 230; analyzing the test results of the hypothesis testing; generating feedback based on the test results; generating and/or modifying hypotheses based on the feedback and adjusting confidence levels for sources of information, techniques for determining the suggested constraints; the hypotheses, the hypotheses tests, or a combination thereof; combining and/or merging suggested constraints to form generalized constraints; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-2 illustrates specific example configurations of the various components of the system 100, the system 100 may include any configuration of the components, which may include using a greater or lesser number of the components. For example, the system 100 is illustratively shown as including a first user device 102, a second user device 111, a communications network 135, a server 140, a natural language processing engine 143, a part-of-speech tagger 144, a knowledge engine 153, a hypothesis tester 154, a constraint solver 155, a server 150, a server 160, and a database 155. However, the system 100 may include multiple first user devices 102, multiple second user devices 111, multiple communications networks 135, multiple servers 140, multiple natural language processing engines 143, multiple part-of-speech taggers 144, multiple servers 150, multiple knowledge engines 153, multiple hypothesis testers 154, multiple constraint solvers 155, multiple servers 160, multiple databases 155, or any number of any of the other components inside or outside the system 100. Similarly, the system 100 may include any number of internal data sources 201, external data sources 202, static model discovery modules 200, model change management modules 204, dynamic model discovery modules 206, agglomerated models 208, evaluators 220, data transformers 232, controllers 224, learning engines 226, user interfaces 228, applications under evaluation 230, any other component, program, or device of the system 100, or a combination thereof. In certain embodiments, substantial portions of the functionality and operations of the system 100 may be performed by other networks and systems that may be connected to system 100. In certain embodiments, the architecture of the system 100 may relate key functional elements, while remaining agnostic as to the technical processes employed within each functional element of the system. For example, deep neural networks, natural language processing, Bayesian analysis, and a variety of other techniques may be employed within any of the primary functional elements (static model discovery module 200, model change management module 204, dynamic model discovery module 206, evaluators 220, and data transformers 232) as well as within the cross-functional elements of the system 100 (controller 224, learning engine 226, and user interface 228). In certain embodiments, the system 100 may operate in conjunction with a single application under evaluation 230 or across multiple applications under evaluation 230. In certain embodiments, the system 100 may operate in a multi-threaded environment with multiple instances of each module, program, and/or component of the system 100 operating in parallel. Such parallel operations may be limited, in certain embodiments, by predetermined limits or ratios, performance metrics and statistics, hardware availability, user interfaces, external interfaces, and access limitations associated with the application under evaluation 230.

Figure 6:
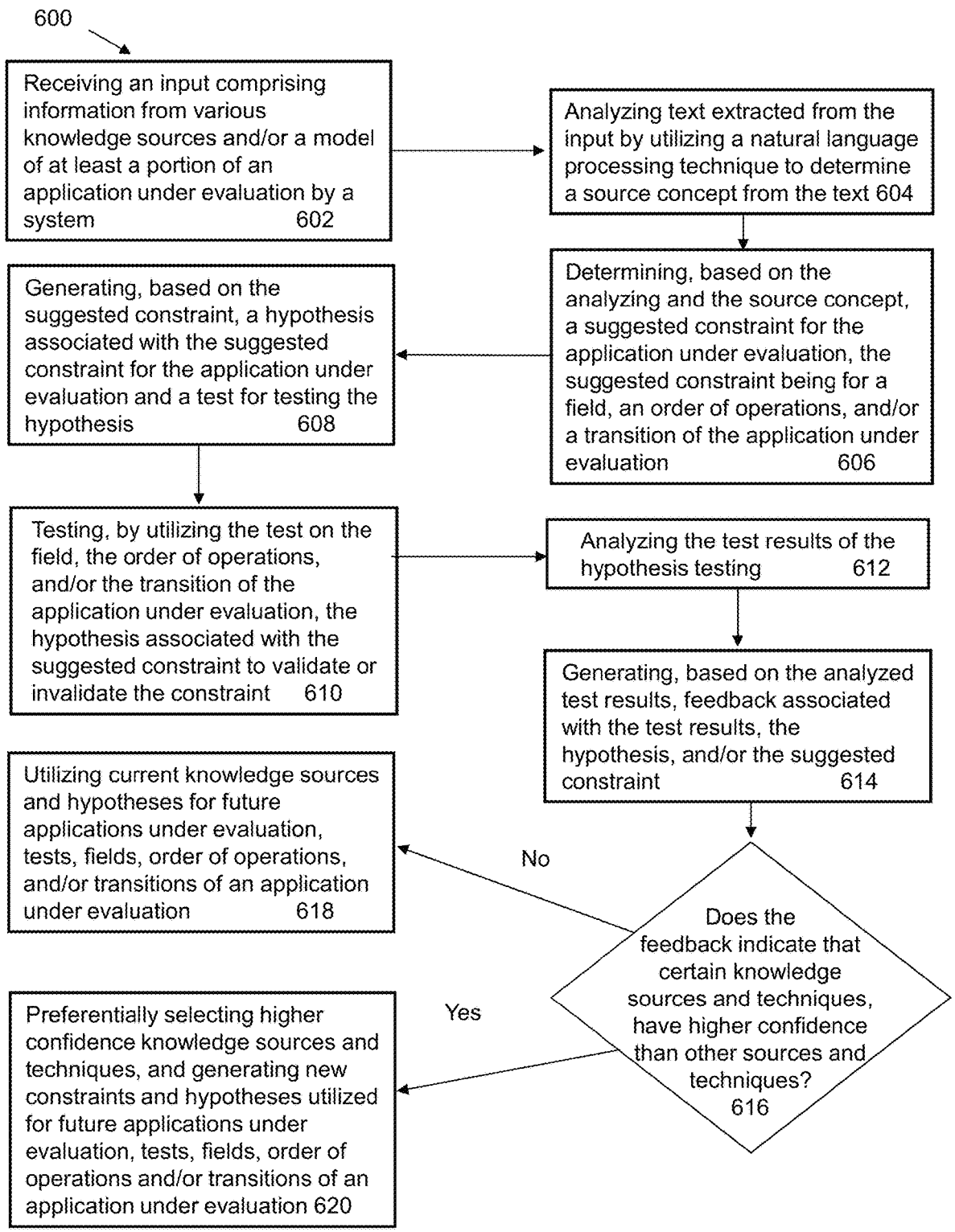
FIG. 6 is a flow diagram illustrating a sample method for understanding navigational semantics via hypothesis generation and contextual analysis according to an embodiment of the present disclosure.

As shown in FIG. 6, an exemplary method 600 for understanding navigational semantics via hypothesis generation and contextual analysis is schematically illustrated. In particular, the method 600 provides for state and constraint exploration based upon continuous generation, execution, and analysis of semantic hypotheses (e.g. web site semantic hypotheses) based on likely semantic suggestions from knowledge sources (e.g. knowledge engine 153, natural language processing techniques, internal and/or external sources 201, 202, database 155, any other source, or any combination thereof). For the purposes of method 600, a user, such as first user 101, or a device, such as first user device 102, may be interested in having text or other information parsed and processed by the system 100, and may be interested in having the system 100 discover constraints for input fields of an application under evaluation 230, constraints for navigating through various states of the application under evaluation 230, and/or constraints associated with the required order of operations to be performed for various functionality of the application under evaluation 230. Additionally, the user may be interested in having the system 100 conduct hypothesis testing on the constraints to determine whether the constraints are accurate and/or need to be modified, whether new hypotheses and/or modified hypotheses need to be generated, or a combination thereof.

Figure 3:
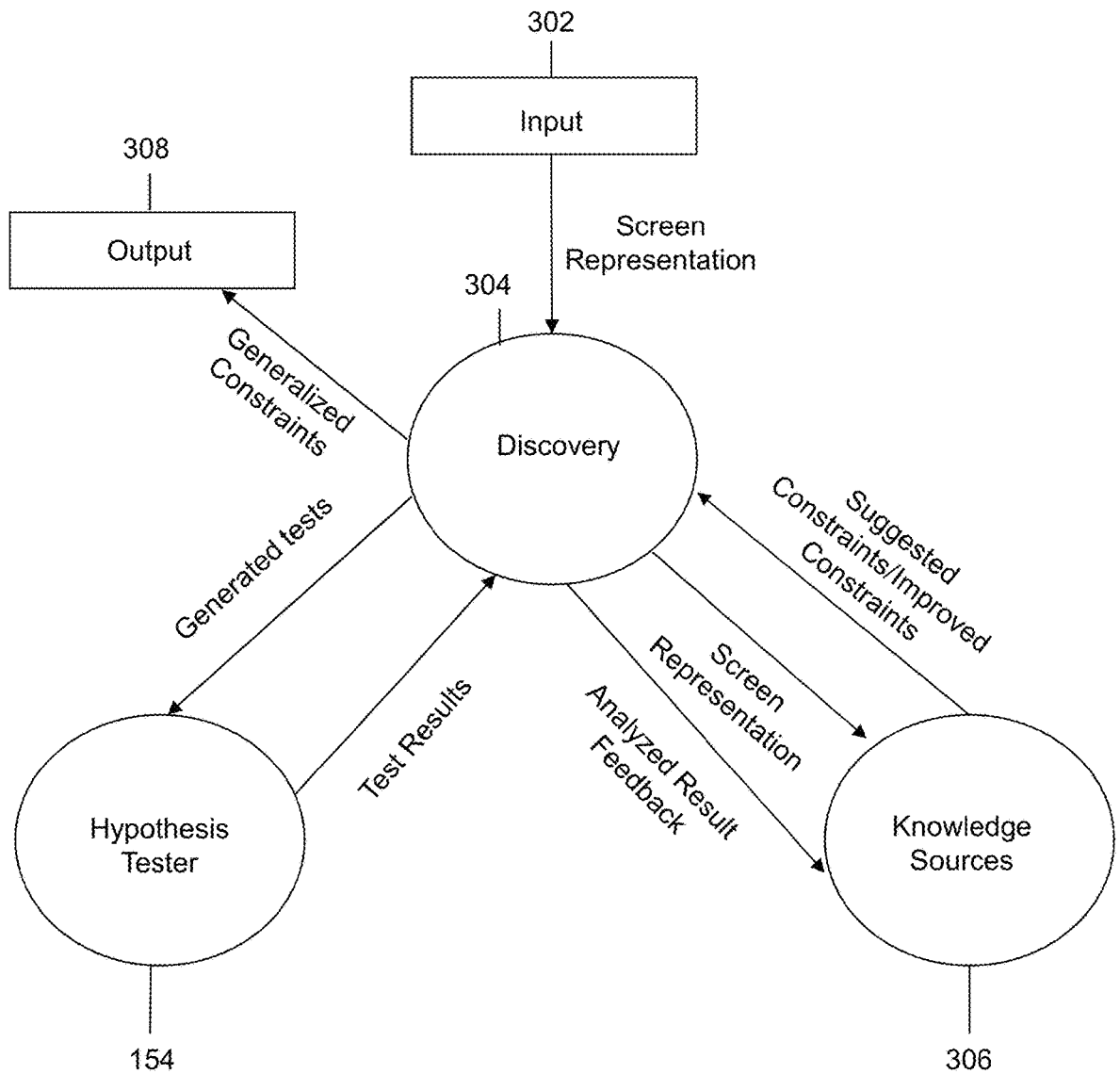
FIG. 3 is a schematic diagram for state and constraint exploration based upon continuous generated, execution, and analysis of semantic hypotheses based on likely semantic suggestions from integrated knowledge sources for use with the system of FIG. 1.

To that end and referring also to both FIGS. 3 and 6, at step 602, the method 600 receiving an input (e.g. input 302) comprising an output of an application under evaluation 230 (or other application) and/or comprising information from various knowledge sources 306 (e.g. document and/or other information sources of knowledge engine 153, the internal and/or external sources 201, 202, database 155, and/or any other source of knowledge, such as the knowledge engine 153, etc.) to facilitate with discovery 304 of constraints and/or information for the application under evaluation 230. For example, the input may be text that may be extracted from a user interface screen or other output displayed by the application under evaluation 230. A subset (all or some of the text) of the text of the input (i.e. source text to be utilized by the system to facilitate with the discovery of constraints, etc.) may include, but is not limited to including, input field labels, help text, menu text, error message text, sentences, paragraphs, words, any text, or a combination thereof. Such source text may include field attributes, metadata (X-Y coordinates of labels, information, etc. associated with a field on a web page, for example; font, colors, page/chapter of documents, number of occurrences of the source text), changes from previous states of the application under evaluation 230 (e.g. source text was previously black text and now the source text is red). In certain embodiments, the input may be a structured and/or graphical model, such as a model of one or more functions and features of the application under evaluation 230 and/or some or all of the application under evaluation 230 itself. For example, given a website screen with two groups of fields, "Price Range" and "Year Range," each containing minimum and maximum subfields, the input model may be a tree where "Price Range" and "Year Range" are siblings in the tree structure, and each of them having children for their subfields. In certain embodiments, each of the nodes of the tree structure may be annotated with contextual information (e.g. labels for the fields and/or associated with the fields and/or subfields). In certain embodiments, the input may be received by utilizing the natural language processing engine 143, the part-of-speech tagger 144, the knowledge engine 153, the static model discovery module 200, the controller 224, the first user device 102, the second user device 111, the server 140, the server 150, the server 160, the communications network 135, any combination thereof, or by utilizing any other appropriate program, network, system, or device.

At step 604, the method 600 may include analyzing and/or parsing text extracted from the input, such as by utilizing one or more natural language processing techniques. For example, the text to be parsed may be extracted from the hierarchical and/or graphical model, the agglomerated models 208, document manuals, requirements documents for the application under evaluation 230 or other applications, user stories, tutorials, software and/or hardware documentation, any information source, or any combination thereof. In certain embodiments, the text may be extracted from documents and/or files obtained from the internal data sources 201, the external data sources 202, the application under evaluation 230, the database 155, any component in system 100, and any components illustrated in FIGS. 1 and 2, or any combination thereof. The natural language processing techniques may be utilized to extract an intent from the text, a sentiment from the text, relationships between words in the text, a meaning of the text, likely constraint information from the text, navigational information from the text, order of operations information from the text, source concepts from the text (e.g. single or multiword concepts, which may be a noun, pronoun, subject, or object of a sentence, or any other classification), any other information, or a combination thereof. When extracting the information from the text, the system 100 may integrate and/or connect with the knowledge engine 153, which may include the natural language processing engine 143 and/or part-of-speech tagger 144 in certain embodiments. In certain embodiments, the parsing and/or analyzing may be performed and/or facilitated by utilizing the natural language processing engine 143, the part-of-speech tagger 144, the knowledge engine 153, the static model discovery module 200, the controller 224, the first user device 102, the second user device 111, the server 140, the server 150, the server 160, the communications network 135, any combination thereof, or by utilizing any other appropriate program, network, system, or device.

At step 606, the method 600 may include determining, based on the analyzing, a suggested constraint (or any number of suggested constraints) for one or more constraint targets (i.e. a target which the system intends to relate to the suggested constraint), such as, but not limited to, fields of the application under evaluation 230 (e.g. input fields), an order of operations that may be performed within the application under evaluation 230, and/or one or more transitions of the application under evaluation 230. In certain embodiments, the constraint may be stored in a configuration, which may represent a web page or portions thereof, and the constraint may be constructed in terms of the identifier of the constraint target related to the constraint. In certain embodiments, the suggested constraints may include, but are not limited to, the likely type of values to be utilized with input fields and/or parameters of the application under evaluation 230 (e.g. the fields under the "Price Range" label are dollar-denominated fields), appropriate default values for input fields and/or parameters, an indication of whether an input field is required or optional, appropriate formatting settings for values to be inputted into the input fields and/or parameters, an indication of which fields are to be completed and in what precise order, a range of values that constrain potential input values for input fields and/or parameters (e.g. the minimum should be less than the maximum for each field and/or subfield of each field), an indication of operations to be conducted and/or values to be inputted to successfully transition from one state of the application under evaluation 230 to another state, any other constraint, or any combination thereof. In certain embodiments, the determining of the suggested constraint may be performed by determining potential correlations between the parsed text and one or more fields of the application under evaluation 230 (e.g. input fields), an order of operations that may be performed within the application under evaluation 230, and/or one or more transitions of the application under evaluation 230. For example, based on the parsing and/or processing conducted at step 604, the system 100 may determine that the parsed text corresponding to a label (e.g. a price label or other label) should be correlated to an input field of the application under evaluation 230 that can receive an input value corresponding to the label. As another example, based on the analyzing, parsing and/or processing conducted at step 604, the analyzed text may indicate an association with and information relating to the order of operations to be conducted for a specific function(s) of the application under evaluation 230. As a further example, based on the parsing and/or processing conducted at step 604, the analyzed text may indicate information pertaining to how to transition from one state of the application under evaluation 230 to another state or next state of the application under evaluation 230. In certain embodiments, the determining of the potential correlations may include scoring a relationship between two items (e.g. a label and an alert message outputted by the application under evaluation 230, or a label and a constraint) to determine how closely the items are related. In certain embodiments, the score may be between 0.0 and 1.0, however, other ranges are contemplated according to the present disclosure. In certain embodiments, the relationship between the items being correlated may be defined by the similarity of different attributes including, but not limited to, proximity, semantic meaning, application function, format, hierarchy (siblings, parent-child, etc. in a tree), constraints, natural language processing attributes, similarity scores, fuzzy matches, regular expression matching, and/or any other criteria. In the certain embodiments, the determining of the suggested constraints may be performed and/or facilitated by utilizing the natural language processing engine 143, the part-of-speech tagger 144, the knowledge engine 153, the constraint solver 155, the static model discovery module 200, the controller 224, the first user device 102, the second user device 111, the server 140, the server 150, the server 160, the communications network 135, any combination thereof, or by utilizing any other appropriate program, network, system, or device.

In certain embodiments, the method 600 may also include, at step 606, generating and/or determining a confidence value for the suggested constraint (e.g. initial confidence value), which may be based on a variety of factors. For example, in certain embodiments, the confidence value may be based on the strength of the correlation or association between the process information and the input field, order of operations, and/or transitions of the software application, the quality of the natural language processing of the textual and contextual information, the number of reinforcing and/or conflicting sources of constraint information, any other factor, or a combination thereof. The confidence value may correspond to a level of confidence that the system 100 has built and/or constructed the constraint correctly. In certain embodiments, the confidence value may include uncertainty from the natural language processing of the parsed text, uncertainty from pulling source concepts and information from the text, uncertainty from building the constraint from the concepts and the text, uncertainty of mapping the constraint to the correct labels, widgets and/or other information on a web page, any other uncertainty, or any combination thereof. In certain embodiments, the difference between the initial confidence value and the correlating performed in step 606 is that correlating may be the task of mapping at least one object to at least one other object, where an object may be, for example: a label, a field, an alert message, an error, a window, a menu, a radio button, a button, a tab, a widget, a word, a phrase, a sentence, a paragraph, a concept, a constraint, and/or any other item. Whereas, the initial confidence may be an aggregate of confidences all along the path from exploring the raw text (e.g. English text) to building the constraint to mapping the constraint to label(s), as well as other steps disclosed herein. In certain embodiments, the confidence value may be determined by utilizing the natural language processing engine 143, the part-of-speech tagger 144, the knowledge engine 153, the constraint solver 155, the static model discovery module 200, the controller 224, the first user device 102, the second user device 111, the server 140, the server 150, the server 160, the communications network 135, any combination thereof, or by utilizing any other appropriate program, network, system, or device. In certain embodiments, the correlating between the parsed text and the field, order of operations, and/or transitions of the application under evaluation 230 may be based on a softmatch. The functionality for a softmatch may be performed by utilizing the natural language processing engine 143, the hypothesis tester 154, the knowledge engine 153, any other suitable component of the system 100, or a combination thereof. A softmatch may be a match with some degree of uncertainty between a field (or order of operations and/or transition) and a constraint. The softmatch may be computed from the potential correlation similarity methods. In certain embodiments, a softmatch may be a match having a confidence value less than 1.0 (where normalized certainty or confidence value ranges between 0.0 and 1.0). A softmatch may be in contrast to a hard match, especially with manually configured systems, where a hard match between field and constraint is hardcoded and certain (i.e. 1.0 or at least implicitly 1.0). Besides confidence, in some embodiments, a softmatch may be composed by having at least two similarity confidences computed (for example, a proximity check as well as a natural language processing similarity score). In certain embodiments, the scores may be combined in different embodiments such as an average, a weighted average, or a max/min score may be chosen, or a score picked from the most trusted source (e.g. natural language processing similarity score), or any other criteria. In certain embodiments, softmatches with too low of a confidence score (e.g. below a threshold) may be unused or discarded by a filtering step conducted by the system 100.

At step 608, the method 600 may include generating, based on the suggested constraint, a hypothesis associated with the suggested constraint for the application under evaluation, and/or generating one or more tests for testing the hypothesis. In certain embodiments, the system 100 may generate the hypotheses from the suggested constraints, and the accompanying hypothesis test cases by leveraging a constraint resolution engine, such as hypothesis tester/constraint resolution engine 154. Referring to the above example, a first pass by the system 100 may generate several hypotheses: the likely types of the fields (dollar, year), and/or the likely constraints between the fields (minimum<=maximum). In certain embodiments, a combination of a rules engine with a built-in constraint solver (e.g. constraint solver 155) may be used to generate a set of test cases to validate the generated hypotheses. For each constraint suggestion, a constraint solver 155, (in certain embodiments the constraint solver 155 may be Microsoft Research's Z3 SMT constraint solver or another suitable constraint solver) may be utilized to create a set of solutions for both the suggested constraint, and the negation of the constraint. As an example, considering the "Price Range" fields discussed above, an initial set of generated hypothesis tests may include tests such as (minimum==maximum, minimum<maximum, minimum>maximum), which collectively may be used to validate the initial hypotheses. Other hypothesis tests may include verifying suggested data types and formats. Similarly, the system may further verify that non-dollar inputs ("arbitrary strings", 4.52E10, £5.23, 555-55-5555) fail for the "Price Range" fields. In certain embodiments, as part of generating hypothesis tests, some tests may be generated that can be considered equivalent. For such tests, the system 100 may optionally run a hypothesis test optimizer to simplify or reduce the number of hypothesis tests, which run via use of input partitioning techniques and equivalence classing of necessary test inputs. Additionally, in some cases the system 100 may order the hypothesis test cases to improve locality of reference, which thereby improves runtime performance. In certain embodiments, the system may generate a pool of possible hypothesis test cases and leverage sampling or rotation techniques to both reduce the number of test cases executed during any given session, while allowing for other cases to be covered in subsequent sessions. Additionally, the system 100 may observe and learn (e.g. by using learning engine 226) if a group of hypothesis test cases yielded a higher reward (information gain, or performance gain), and may choose to add more test cases from the pool for a particular focused area of the application under evaluation 230. Additional example details regarding the simplification or reduction of the number of hypothesis tests is discussed below with regard to FIGS. 7-10. In certain embodiments, the generating of the hypotheses and/or the tests for testing the hypotheses may be performed and/or facilitated by utilizing the natural language processing engine 143, the part-of-speech tagger 144, the knowledge engine 153, the hypothesis tester 154, the constraint solver 155, the static model discovery module 200, the controller 224, the first user device 102, the second user device 111, the server 140, the server 150, the server 160, the communications network 135, any combination thereof, or by utilizing any other appropriate program, network, system, or device.

At step 610, the method 600 may include conducting hypothesis and/or other testing on the suggested constraint by utilizing one or more tests. In certain embodiments, hypothesis testing may comprise testing a constraint by determining how the application under evaluation 230 reacts when using the suggested constraint with the application under evaluation 230, along with determining the outputs generated by the application under evaluation 230 when input values are utilized with input fields, parameters, operations, and/or transitions of the application under evaluation 230 in accordance with the suggested constraint. In certain embodiments, hypothesis testing may be performed to increase the initial confidence value for the suggested constraint. For example, if input values for a suggested constraint fail when inputted into the application under evaluation 230, the initial confidence value may be reduced or the constraint may be discarded. Similarly, if the input values for the suggested constraint are accepted, the initial confidence value may be increased accordingly. In certain embodiments, the resulting increased confidence value may be utilized by the system 100 to keep or discard the hypothesized constraint, or prioritize the hypothesized constraint over other constraints, such as constraints that already exist or other constraints that have been suggested by the system 100. As part of running the hypothesis tests, the system 100 may encounter more information, such as an alert and/or error pertaining to the fields in question. A new screen representation can then be constructed by the system 100 and sent to the knowledge engine 153, which may lead to the generation of a new suggested constraint, such as one that imposes a lower bound and upper bound on the Price Range (ex: must be between $0.00 and $100.00). The system 100 may further generate hypothesis tests that validate that the values inside the new constraint are accepted (e.g. $0.00, $12.34, $100.00). The system 100 may further verify that values outside of the constraint are not allowed (e.g. -$1.00, $100.01). The discovery 304 conducted by the system 100 continuously executes this process until no new constraints are found. In certain embodiments, the hypothesis and/or other testing may be performed and/or facilitated by utilizing the natural language processing engine 143, the part-of-speech tagger 144, the knowledge engine 153, the hypothesis tester 154, the constraint solver 155, the static model discovery module 200, the controller 224, the first user device 102, the second user device 111, the server 140, the server 150, the server 160, the communications network 135, any combination thereof, or by utilizing any other appropriate program, network, system, or device.

Also, at step 610, the method 600 may include determining if the suggested constraint is valid. In certain embodiments, as the suggested constraints generated by the system 100 are tested, the results may also be fed to the executors/evaluators 220 of the system 100. For example, the results may be fed to the validators 222, which may be configured to evaluate the hypotheses generated by the system 100 and/or validate the tested constraints. In certain embodiments, the validation may be conducted by verifying that values inputted into the application under evaluation 230 that are outside of the constraint are not allowed by the application under evaluation 230, and conversely, that values inside the constraint are allowed by the application under evaluation 230. In certain embodiments, validation may be conducted by verifying the suggested constraints relating to formatting of input values for input fields. For example, if the system 100 attempts to input an value in an input field of the application under evaluation 230 that has a precision outside the formatting of the suggested constraint and the application under evaluation 230 returns an error, the suggested constraint may be validated. In certain embodiments, the validating may be performed and/or facilitate by utilizing the evaluators 223, the natural language processing engine 143, the part-of-speech tagger 144, the knowledge engine 153, the hypothesis tester 154, the constraint solver 155, the static model discovery module 200, the controller 224, the first user device 102, the second user device 111, the server 140, the server 150, the server 160, the communications network 135, any combination thereof, or by utilizing any other appropriate program, network, system, or device.

If the suggested constraint is determined to be valid, the method 600 may include validating the suggested constraint and utilizing the suggested constraint with the application under evaluation 230, such for testing purposes or for other purposes. If the suggested constraint is determined to not be valid, the method 600 may proceed back to step 608 and may continue to generate further suggested constraints.

At step 612, the method 600 may include analyzing the tests results of the hypothesis testing conducted by the system 100. For example, the test results may include information indicating that a suggested constraint is confirmed to be accurate, confirmed to be inaccurate, has been rejected, has been accepted, and/or any other information associated with the testing of the suggested constraint may be included in the test results. In certain embodiments, the analyzing may be performed and/or facilitated by utilizing the natural language processing engine 143, the part-of-speech tagger 144, the knowledge engine 153, the hypothesis tester 154, the constraint solver 155, the static model discovery module 200, the controller 224, the first user device 102, the second user device 111, the server 140, the server 150, the server 160, the communications network 135, any combination thereof, or by utilizing any other appropriate program, network, system, or device. At step 614, the method 600 may include generating, based on the analyzed test results, feedback associated with the test results, the hypotheses, and/or the suggested constraint. In certain embodiments, the system 100 may include a feedback loop mechanism, which may include providing confidence level feedback to the knowledge source engines (e.g. knowledge engine 153) based in part on the success and/or failure rates resulting from the hypothesis testing of the hypotheses associated with the suggested constraints, thereby improving the confidence and accuracy of newly generated hypotheses during the continuous discovery 302 process. Another example of feedback may include execution time, allowing the knowledge sources (e.g. as included in knowledge engine 153) to prefer more efficient suggestions over slower, otherwise equivalent in result, counterparts. In certain embodiments, knowledge source feedback mechanisms may include learning, such as by utilizing learning engine 226, which techniques produce the best suggestions, and thereby giving such techniques more confidence in future constraint and/or hypotheses suggestions. Learning may further include predicting which data (e.g. English sentences/features (subject->verb->object)) produces which constraint and/or hypotheses suggestions. Thus, an incoming sentence, which is similar to a historical one, may have the same outputted constraint and/or hypothesis suggestion with a higher confidence. Learning may further include machine-learning aspects in order to classify the best techniques and/or data to utilize for new screen representations (e.g. for use in a model that may be used as input in step 602, for example) based on feedback from prior constraint and/or hypothesis suggestions. Thus, the system 100 may learn that knowledge source techniques with high positive feedback re to be preferred over methods with negative feedback allowing for the system 100 to get more intelligent over time.

Also, at step 614, the method 600 may include providing additional information relating to the testing of the suggested constraint to the learning engine 226 for further processing. For example, information indicating that a suggested constraint is confirmed to be accurate, confirmed to be inaccurate, has been rejected, has been accepted, and/or any other information associated with the testing of the suggested constraint may be provided to the learning engine 226. In certain embodiments, the providing of the information to the learning engine 226 and/or the functionality of the learning engine itself may be performed and/or facilitated by utilizing the natural language processing engine 143, the part-of-speech tagger 144, the knowledge engine 153, the hypothesis tester 154, the constraint solver 155, the static model discovery module 200, the controller 224, the first user device 102, the second user device 111, the server 140, the server 150, the server 160, the communications network 135, any combination thereof, or by utilizing any other appropriate program, network, system, or device. In certain embodiments, the learning engine 226 may assist in refining (e.g. adjusting and/or making more precise) confidence values for the suggested constraints over time as new information is obtained from information sources, as new information is obtained from the results of natural language processing of textual information received from the information sources, and/or new information is received from the application under evaluation 230 itself. In certain embodiments, the suggested constraints and/or related confidence values may be utilized to represent the application under evaluation 230. In such embodiments, the constraint information may be utilized to successfully navigate or exercise the application under evaluation 230. In another embodiment, the system 100 may include utilizing the constraints and/or related confidences to represent the desired or even intended functionality of the application under evaluation 230. In such an embodiment, the system 100 may utilize the constraint information to support the autonomous testing of the application under evaluation. The learning engine 226 may process all of the information received from the hypothesis testing and/or other testing and may utilize such information for future applications under evaluation 230, such as when generating constraints. For example, if a suggested constraint was rejected at step 610 based on the hypothesis testing, the learning engine 226 may cause the system 100 to not even suggest the constraint for the same application under evaluation 230, a different application under evaluation 230, and/or any type of application, when discovering input field, navigation, and/or order of operation constraints on a subsequent occasion.

At step 616, the method 600 may include determining if the feedback analyzed by the learning engine 226 and/or other components of the system 100 indicate that certain knowledge sources and techniques have higher confidence than other sources and techniques. If not, the method 600 may proceed to step 618, which may include utilizing current knowledge sources and/or hypotheses for future applications to be tested, for a future test of the application under evaluation 239, for generating constraints for future applications and/or future tests of the current application under evaluation 230, or a combination thereof. If, on the other hand, the feedback analyzed indicates that certain knowledge sources and techniques having higher confidence than other sources and/or techniques, the method 600 may proceed to step 620. At step 620, the method may include preferentially selecting the higher confidence knowledge sources and/or techniques when generating new constraints and/or hypotheses for future applications to be tested, for a future test of the application under evaluation 239, for generating constraints for future applications and/or future tests of the current application under evaluation 230, or a combination thereof, thereby optimizing the generation of constraints and/or hypotheses as the system 100 gets more intelligence. Notably, the method 600 may further incorporate any of the features and functionality described for the system 100 or as otherwise described herein.

The method 600 and system 100 may also include other functionality and features. For example, the method 600 and system 100 may include determining if the suggested constraint (or multiple suggested constraints) can be merged and/or combined with one or more other constraints to form generalized/merged constraints as an output 308 of the system 100. In certain embodiments, the determining may be performed and/or facilitated by utilizing the natural language processing engine 143, the part-of-speech tagger 144, the knowledge engine 153, the hypothesis tester 154, the constraint solver 155, the static model discovery module 200, the controller 224, the first user device 102, the second user device 111, the server 140, the server 150, the server 160, the communications network 135, any combination thereof, or by utilizing any other appropriate program, network, system, or device. If the suggested constraint can be merged with one or more other constraints, the method 600 may include merging the suggested constraint with the one or more other constraints to generate a generalized, complex, and/or relational constraint. For example, if the feedback, hypothesis testing, and/or analyzing indicates that certain constraints have values dependent on one another, have related features, are compatible, have at least a portion of overlapping constraint information, or have any connection to one another, the system 100 may merge such constraints to create a generalized, complex, and/or relational constraint. For example, if the system 100 determines that a constraint for one input field must contain a value that is less than the value to be inputted into a second input field, the system 100 may merge these constraints based on their relation and/or dependence on one another. In certain embodiments, the merging and/or combining may be performed and/or facilitated by utilizing the natural language processing engine 143, the part-of-speech tagger 144, the knowledge engine 153, the hypothesis tester 154, the constraint solver 155, the static model discovery module 200, the controller 224, the first user device 102, the second user device 111, the server 140, the server 150, the server 160, the communications network 135, any combination thereof, or by utilizing any other appropriate program, network, system, or device. If the suggested constraint cannot be merged with one or more other constraints and/or if the system 100 determines that the suggested constraint should not be merged with one or more other constraints, the method 600 may simply proceed accordingly.

In certain embodiments and as indicated above, several constraints may be suggested, tested, and/or analyzed during the discovery 302 process. In certain embodiments, the system 100 may determine that it is possible that the combination of several constraints may be closer to the true semantic constraint on the application under evaluation 230 (e.g. website or software application), and, as such, should also be hypothesis tested and further analyzed. The system 100 may construct one or more complex constraints on multiple fields or functional transitions with associated confidences based on the testing results of the hypothesis testing. As an example and referring now also to FIGS. 4 and 5, the combination of several constraint fragments may lead to the creation of the following generalized constraint, which covers both the minimum<maximum requirement, as well as the lower/upper bound requirement, as well as possibly a requirement capturing the ability to leave the fields blank altogether. In certain embodiments, an additional point of complexity may be that the "Price Range" fields may be entirely optional (i.e. may or may not enter a value for these fields), which may yield four possible combinations: (both Minimum Price and Maximum Price filled in, the Minimum Price filled in and the Maximum Price not filled in, the Minimum Price not filled in and the Maximum Price filled in, and/or none filled in). The system 100 may handle this use-case scenario by using a truth table and a constraint fragment collection algorithm to combine the constraints. For the "Price Range" fields, for example, the constraint fragment output 402 is schematically illustrated in FIG. 4. In constraint fragment output 402, each of the four possible combinations described above for the "Price Range" fields are logically ORed together (i.e. using the || operator) to create the combined constraint fragment output 402. In particular, from FIG. 4, (Minimum Price !=null && Maximum Price !=null && Minimum Price<=Maximum Price && Minimum Price>=$0.00 && Maximum Price<=$100.00) corresponds to the possible combination of inputting values in both the Minimum and Maximum Price fields, having the Minimum Price being less than or equal to the Maximum Price, having the Minimum Price being greater than or equal to $0.00, and having the Maximum Price being less than or equal to $100.00. Additionally, from FIG. 4, (Minimum Price !=null && Maximum Price==null && Minimum Price>=$0.00 && Minimum Price<=$100.00) corresponds to the possible combination of inputting values for the Minimum Price field, not inputting values for the Maximum Price field, having the Minimum Price being greater than or equal to $0.00, and the Minimum Price being less than or equal to $100.00. Furthermore, from FIG. 4, (Minimum Price==null && Maximum Price !=null && Maximum Price>=$0.00 && Maximum Price<=$100.00) corresponds to the possible combination of having no input value for the Minimum Price field, having an input value for the Maximum Price field, having the Maximum Price being greater than or equal to $0.00, and having the Maximum Price being less than or equal to $100.00. Lastly, from FIG. 4, (Minimum Price==null && Maximum Price==null) corresponds to the combination where no input values are inputted into the Minimum Price field and the Maximum Price field. Because these constraints are related, the system 100 may logically OR each of the constraints together since they relate to and/or affect each other (i.e. Maximum Price and Minimum Price fields of the Price Range Field).

Since there may also be fields corresponding to a "Year Range", the constraint fragment output 404 in FIG. 4 may also be generated. The output 404 includes the logically ORed possible combinations for the "Year Range" fields. For example, the combinations may include both Minimum Year and Maximum Year filled in, the Minimum Year filled in and the Maximum Year not filled in, the Minimum Year not filled in and the Maximum Year filled in, and/or neither Minimum Year nor Maximum year filled in. In particular, from FIG. 4, (Minimum Year !=null && Maximum Year !=null && Minimum Year<=Maximum Year && Minimum Year>=1980 && Maximum Year<=2017) corresponds to the possible combination of inputting values in both the Minimum and Maximum Year fields, having the Minimum Year being less than or equal to the Maximum Year, having the Minimum Year being greater than or equal to 1980, and having the Maximum Year being less than or equal to 2017. Additionally, from FIG. 4, (Minimum Year !=null && Maximum Year==null && Minimum Year>=1980 && Minimum Year<=2017) corresponds to the possible combination of inputting values for the Minimum Year field, not inputting values for the Maximum Year field (i.e. Null value), having the Minimum Year being greater than or equal to 1980, and the Minimum Year being less than or equal to 2017. Furthermore, from FIG. 4, (Minimum Year==null && Maximum Year !=null && Maximum Year>=1980 && Maximum Year<=2017) corresponds to the possible combination of having no input value for the Minimum Year field, having an input value for the Maximum Year field, having the Maximum Year being greater than or equal to 1980, and having the Maximum Year being less than or equal to 2017. Lastly, from FIG. 4, (Minimum Year==null && Maximum Year==null) corresponds to the combination where no input values are inputted into the Minimum Year field and the Maximum Year field. As with the Price Range example above, these constraints may be related, and the system 100 may logically OR each of the constraints together since they relate to and/or affect each other (i.e. Maximum Year and Minimum Year fields corresponding to the year range).

Referring now also to FIG. 5, the system 100 may conduct another iteration and determine relationships between the Price Range fields and the Year Range fields. The determined relationships may indicate that the Price Range field constraints and Year Range constraints are related, have a threshold level of similarity to one another, depend on one another, take similar input values to one another, and/or have any other relation to one another. In this case, the system 100 may determine that the constraint fragments for Price Range and Year Range, while having different minimum and maximum values, have a threshold level of similarly for the combinations to be tested (e.g. both Minimum and Maximum Price and Year fields filled in, the Minimum Price and Minimum Year filled in and the Maximum Price and Maximum Year not filled in, the Minimum Price and Minimum Year not filled in and the Maximum Price and Maximum Year filled in, and/or none of the fields filled in). Based on the analysis and functionality provided by the system 100, the system 100 may determine that the combination of the constraint fragments 402, 404 may more accurately resemble the true semantic constraint on the application under evaluation 230 and may formalize the generalized total constraint 502 in FIG. 5 by logically ANDing (i.e., combining using the logical AND operator signified by "&&") the constraint fragments 402 and 404 together. The system 100 may then proceed to conduct hypothesis testing or other testing the generalized total constraint 502 and analyze the results accordingly.

Optionally, in certain embodiments, one or more components of the system 100 may include a constraint optimizer that may run to simplify constraints or reduce the number of constraints as part of creating the generalized constraints (e.g. constraint 502). Once a set of improved generalized constraints are established, the system 100 may create two finite state machine transitions, one with the above constraint which starts from the website screen in question, and leads to a success state (indicating that valid inputs were provided by the user). A second finite state machine transition may include the negated version of the above constraint (not shown), which would lead to an error state (indicating invalid inputs were provided) with the application under evaluation 230. In certain scenarios and embodiments, a hypothesis may be proved correct or incorrect. When a hypothesis is incorrect, the system 100 may generate a new hypothesis and go through a further round of hypothesis testing. The new hypothesis may be modifications of the old hypothesis, or the new hypothesis may be completely independent of the old hypothesis. In either case and in certain embodiments, the new hypothesis tests may be based on the results of previous hypothesis tests. As an example, if a hypothesis was that only values 1-12 should be accepted for a month field, but, when entering a "1", an error is returned which says please enter month as two digits, then a next constraint for the system 100 to try may be to see if the values should be in range 01, 02, 03, . . . , 12.

As another different example, which is indicative of learning, it may be that the hypothesis of a field the system 100 understands to be a month field is not correct at all, and when the system 100 attempts different permutations of numeric constraints, none of the numeric constraints are satisfied. At that time, the system 100 may recognize that the original hypothesis is completely wrong, and the system 100 may provide information to the knowledge engine 153 indicating the incorrect hypothesis for future use. Next, the system 100 may try textual month representations (e.g. Jan or January, Feb or February, etc.). If this also fails again, the system 100 may recognize that the hypothesis is completely wrong, and may provide an indication of this to the knowledge engine 153 for future use. In certain embodiments, if the system 100 is unable to satisfy the constraint for this field, the system 100 may check for other knowledge sources, other hypothesis to test, other models to use, other applications under evaluation 230, other systems, or the system 100 may need to generate an issue or conflict to a human user so that the human user can advise regarding the proper behavior. If the system 100 needs to wait on a conflict to be resolved externally, the system 100 may continue on with discovery, constraint identification, and hypothesis testing of other portions of the application under evaluation 230, which are not affected by the conflict.

As is discussed above, one or more tests may be generated for testing the hypothesis (see step 608 of FIG. 6). These tests may be any type of tests that may test the hypothesis. For example, the tests may be validation tests (e.g., field accepts valid inputs for its type such as for an integer, it accepts negative_max_int, −1, 0, 1, positive_max_int), constraint tests of a field (e.g., field allows certain values such as only accepting integers 1-12), constraint tests between fields (e.g., FieldA must be greater than FieldB), equivalence tests (e.g., if testing a month field, testing with November may be equivalent to testing with October), boundary tests which focus on values around the limits (e.g., for a month field that accepts only integers, a boundary test may focus on the lower bound 1 and provide test value 0, 1, 2 and may similarly focus on the high bound 12 and provide test values 11, 12, 13, then it may choose an arbitrary value outside the range and inside the range, 1234 and 5 respectively), performance tests (both wall time or computing resources used time), any other test for testing a hypothesis, or any combination thereof. In certain embodiments, when testing fields, positive tests (e.g., tests expected to pass) and negative tests (e.g., tests expected to fail) may be generated for testing the hypothesis. In certain embodiments, hypothesis tests may be generated for any field, subfield, input, output, or combination thereof, of an application under evaluation 230. A simple example of generated hypothesis tests is shown below, where these hypothesis tests are related to a zip code field and a year field. Each of these hypothesis tests includes a test value (e.g., the value being tested) and an expected result of the test (e.g., expected to pass, expected to fail). Although not illustrated, similar hypothesis tests may be generated for various types (e.g., integer, phone, URL, Boolean, email, etc.) and formats thereof (e.g., for date: dd/mm/yyyy, dd-mm-yy, yyyy.dd.mm etc.).

| Type of Field being Tested | Test Value | Expected Result |
| --- | --- | --- |
| Zipcode | 12345 | Positive |
|  | 12345-1234 | Positive |
|  | 54321 1234 | Positive |

-continued

| Type of Field being Tested | Test Value | Expected Result |
|---|---|---|
|  | 123 | Negative |
|  | 1.2345 | Negative |
|  | abcdef | Negative |
| Year | 15 | Positive |
|  | 2015 | Positive |
|  | 99 | Positive |
|  | −99 | Negative |
|  | 19.99 | Negative |
|  | @#$% | Negative |

In certain embodiments, the amount of tests generated for testing a hypothesis may be problematic. In certain embodiments, the generated hypothesis tests may number in the hundreds or even thousands for moderately complex web pages, and may be significantly larger for entire applications. Such a large number of hypothesis tests may, in certain embodiments, (1) require an excessively long runtime, and (2) require use of an excessively large amount of (expensive) system resources. The long runtime may be measured in hours and/or days, in certain embodiments. For example, execution of hypothesis tests may take hours per web page, while execution of hypothesis tests may take days per application under evaluation 230. Thus, running each of these tests may create unnecessary delay and/or it may also require the use of expensive system resources for long periods of time.

One example of the potential problem caused by the generation and/or execution of tests for testing the hypothesis in an application under evaluation 230 is shown in FIG. 7. FIG. 7 illustrates one example of tests generated for testing a hypothesis in an application under evaluation 230. The hypothesis tests in FIG. 7 relate to the testing of the minimum and maximum subfields of the "Year Range" field included on a website screen in an application under evaluation 230. As can be seen in the example shown in FIG. 7, there are at least 36 tests that can be performed on these minimum and maximum subfields of the "Year Range". Each of these tests is based on a combination of two of the following: (1) a first strategy for testing these subfields with an example test value (1979) that is below the expected lower boundary and thus is expected to fail ("below lower bound (fail)"); a second strategy for testing these subfields with an example test value (1980) that is above the expected lower boundary and thus is expected to pass ("above lower bound (pass)"); (3) a third strategy for testing these subfields with an example test value (2018) that is above the expected upper boundary and thus is expected to fail ("above upper bound (fail)"); a fourth strategy for testing these subfields with an example test value (2017) that is below the expected upper boundary and thus is expected to pass ("below upper bound (pass)"); a fifth strategy for testing these subfields with an example test value (2000) that is in-between the expected lower boundary and the expected upper boundary and thus is expected to pass ("mid range (pass)"); and (6) a sixth strategy for testing these subfields with an example test value where no entry is provided for the subfield ("null"). When two of these strategies are combined to form a test, an expected result may be generated for the test (e.g., "pass" or "fail"). After execution of the test (e.g., by inputting the test values into the subfields), the result of the executed test (e.g., "pass") may be compared to the expected result ("pass") to determine whether the test performed the way it was expected to.

As can be seen in the example embodiment shown in FIG. 7, at least 36 hypothesis tests may be generated for testing these subfields. However, these 36 tests are only for two subfields (i.e., minimum and maximum) of a single field (i.e., "Price Range") of a single website screen. That same single website screen may include dozens of different fields (e.g., "Year Range", "Start Date", "First-Name", "Middle-Name", "Last-Name", etc.), each with multiple subfields, in certain embodiments. Thus, as is discussed above, in certain embodiments, the generated hypothesis tests may number in the hundreds or even thousands for moderately complex web pages, and may be significantly larger for entire applications (which may include hundreds, if not thousands of these web pages). Execution of all of these tests for an application under evaluation 230 may, as is discussed above, require an excessively long runtime, and require use of an excessively large amount of (expensive) system resources, which may be problematic.

Figure 8:
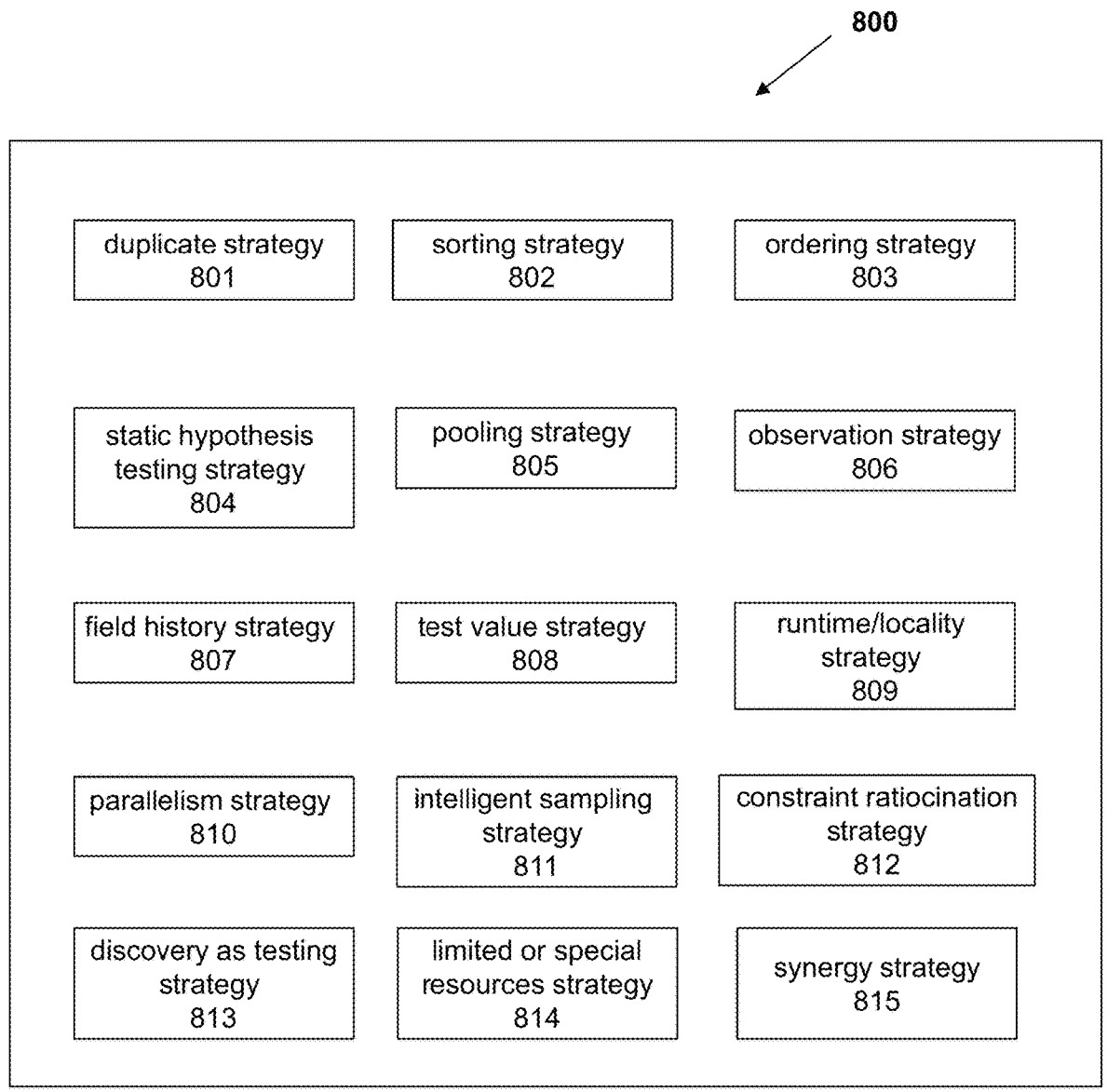
FIG. 8 is a schematic diagram illustrating various hypothesis optimization strategies for use in optimizing system resources and runtime during a testing procedure according to an embodiment of the present disclosure.

In order to simplify and/or reduce the number of hypothesis tests (thereby optimizing system resources and runtime during a testing procedure), system 100 may include one or more hypothesis optimization strategies 800. Hypothesis optimization strategies 800 may include any type of strategy that may be utilized to simplify and/or reduce the number of hypothesis tests for testing, and may represent data and/or one or more mathematical algorithms that may be utilized by system 100 (e.g., by evaluators 222, learning engine 226, analysis engine 239, etc.) to simplify and/or reduce the number of hypothesis tests for testing. Hypothesis optimization strategies 800 may base their optimizations in whole or in part on estimated rewards or risks, on actual rewards or risks, on historical rewards or risks, or any other criteria, or any combination thereof. For example, as is illustrated in FIG. 8, the hypothesis optimization strategies 800 may include, but are not limited to, duplicate strategy 801, sorting strategy 802, ordering strategy 803, static hypothesis testing strategy 804, pooling strategy 805, observation strategy 806, field history strategy 807, test value strategy 808, runtime/locality strategy 809, parallelism strategy 810, intelligent sampling strategy 811, constraint ratiocination strategy 812, discovery as testing strategy 813, limited or special resources strategy 814, synergy strategy 815, any other strategy, or any combination thereof.

In certain embodiments, the duplicate strategy 801 may be utilized to analyze each hypothesis test (or a portion of the hypothesis tests) to verify that all hypothesis tests are unique. The duplicate strategy 801 may analyze the hypothesis tests to find and remove simple duplications. For example, if two hypothesis tests both test the exact same thing (e.g., that FieldA<FieldB), one of those hypothesis tests may be removed (and may not be executed). The duplicate strategy 801 may also analyze the hypothesis tests to find and remove complex duplicates. For example, if a first hypothesis test is used to test that FieldA<FieldB−1 and a second hypothesis test is used to test that FieldA+1<FieldB, these two hypothesis tests may be determined to be complex duplicates, and one of these hypothesis tests may be removed (and may not be executed). In certain embodiments, complex duplicate removal may involve many techniques which create equivalent constraints ranging from changing the order of predicates (ex. (A<B) vs (B>A)), to using Demorgan's Law, merging subset into a superset, and other logic, set, or algebra operations.

As a further example, if a first hypothesis test satisfies the goal or objective of a second hypothesis test, these tests may be determined to be duplicative, and one of these hypothesis tests may be removed. In certain embodiments, the removal of a hypothesis test may be accompanied by the modification of the retained hypothesis test such that the modified retained hypothesis test includes one or more goals, objectives, categories, types, history, other characteristic, other metadata, or combination thereof of the discarded hypothesis test. In certain embodiments, the duplicate tests may be merged. For example, an input for FieldA, of the application under evaluation, may accept a formatted string. A first hypothesis test, focused on testing acceptable input values, may test that "word" can be input into a FieldA. This first hypothesis test may not have a preference for the font or emphasis of the input text; however, it may set the font to "Helvetica" and the emphasis to "Normal" such that all test parameters are defined explicitly or implicitly. A second hypothesis test, focused on testing the different emphasis values for a field, may test that "Bold" is a valid emphasis. This second hypothesis test may set the font to "Helvetica" and the input value to "another_word." These two hypothesis tests may be identified as duplicates due to the fact that a single hypothesis test could satisfy both objectives using "word" as the input value and "Bold" as the emphasis value. In certain embodiments, identified duplicates of this type may be replaced with a single hypothesis test that satisfies the testing objectives of the duplicate hypothesis tests. In certain embodiments, the duplicate strategy 801 may be dynamically applied such that new and/or modified hypothesis tests may be processed and/or reprocessed on a continual, periodic, as required basis, or combination thereof.

In certain embodiments, if "a single hypothesis test that satisfies the testing objectives of the duplicate hypothesis tests" results in a failure during testing, the duplicate strategy 801 may "un-de-dup" the duplicate hypothesis tests. In such embodiments, each individual hypothesis test may be run, so as to isolate the defect further. For example, it may be that the "Bold" emphasis is broken, or it may be that the "normal" emphasis is broken. In such an example, by "un-de-dup"-ing and running both hypothesis tests, the defect may be isolated to one of the test cases. Alternatively, in certain embodiments both hypothesis tests may fail. If both tests fail, the system 100 may choose to report the de-dup version so that the report is cleaner (fewer entries) in some embodiments. In certain embodiments, the system 100 may leave both "un-dep-dup"ed versions as failing so that a human developer may understand clearly that both tests failed and therefore there is no need to run both individual versions to try to isolate the failure.

In certain embodiments, the sorting strategy 802 may be utilized to sort and/or partition each hypothesis test into groups. For example, the sorting strategy 802 may sort and/or partition each of the hypothesis tests into sets and/or subsets of sets. Then, only a portion of the hypothesis tests in a particular set (or a particular subset) may be selected for execution, with the other portion of tests may be skipped (or removed). In certain embodiments, the sorting and/or partitioning of each of the hypothesis tests may be based on test features. Such test features may include, but are not limited to, boundary values (e.g., above or below a boundary), equivalence class values, performance values, wrong type values, invalid data values, constraint values (e.g., valid and invalid constraint values as well as inter-field and intra-field restrictions), intra-product as well as inter-product dependencies, relationships, and constraints, test quality (e.g., optimal test, a worst case test, and/or tests that are in-between), test runtime (estimated, actual or historical), any other test feature (estimated, actual or historical), or any combination thereof. In certain embodiments, the sorting strategy 802 may be dynamically applied such that remaining, untested hypotheses may be reordered based on a change in testing goals, available resources, a changed or new external parameter, a changed or new internal parameter, prior hypothesis testing results, the generation of new hypothesis tests, the removal of hypothesis tests, the modification of hypothesis tests, or a combination thereof.

In certain embodiments, the ordering strategy 803 may be utilized to intelligently order the hypothesis tests, and then skip (and/or remove) one or more of these ordered tests based on results of the testing. The hypothesis tests may be ordered in any manner. For example, they may be ordered based on test runtime, test quality, any other test feature (discussed above), other value assessment, or any combination thereof. In certain embodiments, the ordering of hypothesis tests may allow less useful (or less important) hypothesis tests to be ranked lower in the order. Then, these lower ranked hypothesis tests may be skipped if their results may be duplicative, or if their results may not be necessary to achieve the testing objectives. For example, if a first constraint (e.g., A>B && C>D, or A>B||C>D) has already been verified using a first higher ranked hypothesis test, it may be less useful to verify the similar second constraint (e.g., A>B) (which may be a subset or superset in various embodiments) using the second lower ranked hypothesis test since that was verified when testing the first constraint. In certain embodiments, the order or rank of the hypothesis tests may be compared to a threshold (e.g., a predetermined threshold) in order to determine which tests may be executed and which may be skipped. For example, hypothesis tests having a test runtime that is less (or greater, and/or equal) to a threshold may be selected for execution, while the others may be skipped. As another example, hypothesis tests having a test quality that is greater (or less, and/or equal) to a threshold may be selected for execution, while the others may be skipped. In such an example, the test quality of a test may be based on, for example, number of errors it is expected to cause, history (ex. of finding defects), human weighting, any other factor, or a combination thereof. The ordering strategy 803 may be utilized on any portion of the hypothesis tests. For example, the ordering strategy 803 may be used on all of the hypothesis tests (or a portion of the tests). This may, in certain embodiments, cause tests to be sorted and/or grouped in sets (and/or subsets of sets) based on their rankings. As an example of this, the highest ranked hypothesis tests may all be sorted into a first set, the second highest ranked hypothesis tests may be sorted into a second set, and so on. In certain embodiments, the ordering strategy 803 may be used on all (or a portion) of the hypothesis tests included in a particular set (or subset of a set). In certain embodiments, the ordering strategy 803 may be dynamically applied such that remaining, untested hypotheses may be reordered based on a change in testing goals, available resources, a changed or new external parameter, a changed or new internal parameter, prior hypothesis testing results, the generation of new hypothesis tests, the removal of hypothesis tests, the modification of hypothesis tests, or a combination thereof.

In certain embodiments, the static hypothesis testing strategy 804 may be utilized to select tests with a high confidence level and execute these selected tests first (or at a higher priority). Then, if the selected tests perform the way they were expected to (e.g., they "pass" when they were expected to "pass"), one or more of the tests having a lower confidence may be skipped. This may result in fewer low confidence tests being executed. The static hypothesis testing strategy 804 may be utilized on any portion of the hypothesis tests. For example, the static hypothesis testing strategy 804 may be used on all of the hypothesis tests (or a portion of the tests). This may, in certain embodiments, cause tests to be sorted and/or grouped in sets (and/or subsets of sets) based on their confidence level. As an example of this, the hypothesis tests with the highest confidence level may all be sorted into a first set, the hypothesis tests with the second highest confidence level may be sorted into a second set, and so on. Conversely, in another example, the high confidence hypotheses/constraints may be sorted lower, allowing the system 100 to work on the low confidence hypotheses or constraints to improve the system 100's understanding of them. In certain embodiments, the static hypothesis testing strategy 804 may be used on all (or a portion) of the hypothesis tests included in a particular set (or subset of a set). In certain embodiments, the static hypothesis testing strategy 804 may be dynamically applied such that remaining, untested hypotheses may be reprocessed, based on a change in testing goals, available resources, a changed or new external parameter, a changed or new internal parameter, prior hypothesis testing results, the generation of new hypothesis tests, the removal of hypothesis tests, the modification of hypothesis tests, or a combination thereof.

In certain embodiments, the pooling strategy 805 may be utilized to pool multiple tests together for a single iteration of testing. This may allow multiple tests to be executed at the same time. In certain embodiments, the pooling strategy 805 may determine that a particular number (e.g., N) of fields (e.g., phone number field, age field, name field) can be set during a single testing iteration. The number (e.g., N) of fields may be determined based on the scope of the web page or application under evaluation 230. A larger scope (e.g., a whole screen) may have a larger number of fields than a smaller scope (e.g., a visual subgroup on a page). The pooling strategy 805 may be applied at different scoping levels such as: a whole screen, a visual subgroup on a page, or fields scoped to a particular widget, row, or column of a page, any other scope of an application, or any combination thereof. In certain embodiments, following determination of the number of fields, the tests may be pooled together based on the fields that they test (e.g., a first pool of tests for the phone number field, a second pool of tests for the age field, etc.) A specific test may then be selected from a respective pool and set for each of the N fields. Finally, all of the tests may be executed in a single iteration, allowing each of the N fields to be verified in the single testing iteration. The pooling strategy 805 may be utilized on any portion of the hypothesis tests. For example, the pooling strategy 805 may be used on all of the hypothesis tests (or a portion of the tests). This may, in certain embodiments, cause tests to be sorted and/or grouped in sets (and/or subsets of sets) based on their field. As an example of this, the hypothesis tests that test the phone number field may all be sorted into a first set, the hypothesis tests that test the age field may all be sorted into a second set, and so on. In certain embodiments, the pooling strategy 805 may be used on all (or a portion) of the hypothesis tests included in a particular set (or subset of a set). In certain embodiments, the pooling strategy 805 may be dynamically applied such that remaining, untested hypotheses may be repooled, based on a change in testing goals, available resources, a changed or new external parameter, a changed or new internal parameter, prior hypothesis testing results, the generation of new hypothesis tests, the removal of hypothesis tests, the modification of hypothesis tests, or a combination thereof.

The pooling strategy 805 may preferably be utilized with tests that are all expected to pass (i.e., positive tests). When all of the positive tests pass on a first iteration of testing, a second round of positive tests may be selected and set for the N fields. This allows all of the second round of positive tests to be run in a single second iteration. Alternatively, if one or more of the positive tests do not pass (e.g., an error occurs), the scope of the testing may be narrowed iteratively so that a smaller and smaller number of fields are tested together in a single iteration, thereby isolating the test that did not pass. The pooling strategy 805 may also be utilized with tests that are all expected to fail (i.e., negative tests). In certain embodiments, a set of negative tests may all be executed in a single iteration to verify whether the failures are detected at once or one at a time. If all failures are detected at once, a subsequent set of these negative tests may be executed in the next testing iteration to verify that they all fail also, as was expected. In certain embodiments, negative tests may need to be executed (and verified) one at a time. In such embodiments, a negative test may be executed in a single iteration with one or more positive tests. To do so, system 100 may first determine whether the particular scope focus causes tests to be executed (and verified) in a particular order during a single iteration. This may, in certain embodiments, be determined by selecting multiple negative tests in a given order for a large enough test set and verifying that the top or leftmost failure is detected first. When such a determination is made, one or more positive tests may be combined with a single negative test, with the negative test being positioned at the end of the order. In such an example, this combination may work because all of the positive tests must have been verified (i.e., they must have passed) before the testing iteration can move on to the negative test.

In certain embodiments, the observation strategy 806 may be utilized to observe how a particular field (or subfield) of an application under evaluation 230 reacts to various test values, and then skip certain tests that include such test values. For example, the observation strategy 806 may be utilized to observe how a phone number field of the application under evaluation 230 reacts to a test having a test value that includes phone extension values. To do so, one or more tests that include valid phone extension values may be selected for execution. If these tests pass (e.g., the field accepts the valid phone extension values), it may be determined that the field accepts phone extension values. Furthermore, one or more remaining tests that include phone extension values may then be skipped. In certain embodiments, this determination that the field accepts phone extension values may be further strengthened by subsequently selecting one or more tests that include invalid phone extension values for execution. If these tests fail (e.g., the field does not accept the invalid phone extension values), it may be determined that the field accepts valid phone extension values but does not accept invalid phone extension values. The observation strategy 806 may be utilized on any portion of the hypothesis tests. For example, the observation strategy 806 may be used on all of the hypothesis tests (or a portion of the tests). This may, in certain embodiments, cause tests to be sorted and/or grouped in sets (and/or subsets of sets) based on their test value. As an example of this, the hypothesis tests that test valid phone extension values may all be sorted into a first set, the hypothesis tests that test invalid phone extension values may all be sorted into a second set, and so on. In certain embodiments, the observation strategy 806 may be used on all (or a portion) of the hypothesis tests included in a particular set (or subset of a set). In certain embodiments, the observation strategy 806 may be dynamically applied such that additional hypothesis tests are added, or remaining, untested hypotheses may be reassessed, based on a change in testing goals, available resources, a changed or new external parameter, a changed or new internal parameter, prior hypothesis testing results, the generation of new hypothesis tests, the removal of hypothesis tests, the modification of hypothesis tests, or a combination thereof.

In certain embodiments, the field history strategy 807 may be utilized to examine the historical test record of a test or test collection (e.g. a particular test, a category of tests, tests associated with a field, or a combination thereof), to adjust the value of the test or test collection in accordance with the examined historical test record, and to remove, skip, and/or change the frequency of testing of the test or test collection. For example, an application under evaluation 230 may have a field that is generally simple (e.g., age field, gender field, marital status field). In such an example, it may be determined whether testing of that simple field has historically been positive (e.g., the tests have mostly passed) or problematic (e.g., lots of errors). This historical data may be based on testing results from a previous release of the application (e.g., a previous version, a beta version), the testing results of the same simple field in a previous portion of the application (e.g., the testing results of the gender field in a previous section or web page in the application), the testing results of the simple field in other applications, any other testing results, or any combination thereof.

In certain embodiments, the field history strategy 807 may determine the historical importance of testing a field by examining the history of the field within the application under evaluation 230, including current versions, prior versions, current releases, prior releases, or a combination thereof, and including testing histories, discovery histories, and operational usage histories associated with the field. The field history strategy 807 may further utilize the importance to adjust the number of hypothesis tests enumerated or generated as tests for the field, the percentage of hypothesis tests to be executed, the priority or ordering of hypothesis tests to be executed, the test set or sets for which the field hypothesis tests are associated, the subset or subsets for which the field hypothesis tests are associated, or a combination thereof. In a further embodiment, the field history strategy 807 may utilize the calculated historical importance, in combination with another testing strategy, to modify an importance, value, priority, other parameter, or a combination thereof, associated with one or more hypothesis tests. For example, if a field is a new field with little history, possibly because it is located on a new page within the application under evaluation 230, a higher historical importance may be associated with the field, which may result in more hypothesis tests for the field being generated, prioritized, and/or executed. In another example, a field may be in a rarely visited location on the application as indicated by the discovery histories and/or operational usage histories of the field within the application under evaluation 230, and as such, a lower historical importance may be associated with the field which may result in fewer hypothesis tests for the field being generated, prioritized, and/or executed.

In certain embodiments, if it is determined that a field has never had a test failure or problem before and/or it is a simpler field with a lower likelihood of issues, it may be determined that the field requires less testing or no testing at this time. As such, in certain embodiments, a smaller subset of the tests for that field may be selected for execution. Such a smaller subset may potentially include zero tests. Alternatively, if testing of a subset of tests for the field has already begun, some or all of the remaining tests for that field may then be skipped. In another case, if it is determined that a field has had many problems before, if the field is generally complex, if there are a lot of constraints associated with the field (e.g., a Password field which has constraints such as the length must be at least 8, at least one upper case and one lower case character, at least one special character, and at least one number, etc.), if the constraints associated with the field are complex, if the field has historically had many constraints that have been changed or been updated, if the field has historically had many default values that have been changed or updated, if the field has historically had many defects, or any combination thereof, it may be determined that more testing is required for the field, in certain embodiments. In this case, additional hypothesis tests may be added and/or a greater percentage of existing hypothesis tests may be performed.

In certain embodiments, the historical importance of tests on a field may be further modified based on the age of the historical information. For example, historical test failures which are one year old may have less impact than historical test failures from the prior week in the calculation of the historical importance of tests on a field. In certain embodiments, the historical test value of a test may be further modified to reflect the similarity of the current application under evaluation 230 and the application under evaluation 230 at the time of the historical test. For example, historical test failures resulting from testing on prior versions or releases of the application under evaluation 230 may not have as much impact on the historical importance of testing on a field as historical test successes resulting from testing on the current application under evaluation 230.

The field history strategy 807 may be utilized on any portion of the hypothesis tests. For example, the field history strategy 807 may be used on all of the hypothesis tests (or a portion of the tests). This may, in certain embodiments, cause tests to be sorted and/or grouped in sets (and/or subsets of sets) based on their historical data and/or the status of the field (e.g., complex, simple). As an example of this, the hypothesis tests for a simple field that is historically positive may all be sorted into a first set, the hypothesis tests for a simple field that is historically negative may all be sorted into a second set, and so on. In certain embodiments, the field history strategy 807 may be used on all (or a portion) of the hypothesis tests included in a particular set (or subset of a set). In certain embodiments, the field history strategy 807 may be dynamically applied such that changes to the testing goals, changes to the available resources, changes to the external testing parameters, changes to the internal testing parameters, changes to the prior hypothesis testing results, the generation of new hypothesis tests, the removal of hypothesis tests, the modification of hypothesis tests, or a combination thereof may result in the reapplication of the field history strategy 807 to the test sets.

In certain embodiments, the test value strategy 808 may be utilized to determine the test value of a hypothesis test, collection of hypothesis tests, test objective, other parameter to which a test value may be associated, other grouping to which a test value may be associated, or a combination thereof. In certain embodiments, this value information may be used to adjust a quantity of hypothesis tests generated, to adjust the enumeration of hypothesis tests, to modify the sorting of hypothesis tests, to prioritize hypothesis tests, to adjust the prioritization of hypothesis tests, to determine a subset of hypothesis tests, to modify a subset of hypothesis tests, to determine a hypothesis test to be executed, or a combination thereof. In certain embodiments, the determining of a value may include an analysis of internal and/or external information (e.g. documents, multimedia information, support tickets, user inputs, agglomerated models, accessibility information, help materials, other information) associated with the application under evaluation 230 that may support the calculation of a test value in whole or in part. For example, an analysis of support tickets may indicate that certain hypothesis tests may be critical to preventing errors from reaching a user of the application under evaluation 230. In another example, the change history of the software code of the application under evaluation 230 may indicate that tests associated with recently changed software code should have a higher value. In another example, user stories, requirements documents, and domain information may be examined to determine that hypothesis tests, which may validate that a pricing calculation is performed accurately within the application under evaluation 230, are more important than other hypothesis tests, which may validate search field preferences within the application under evaluation 230.

In certain embodiments, the test value of a hypothesis test, or grouping of hypothesis tests, may be determined, in part or in total, from a historical examination of the utility of the hypothesis test. In certain embodiments, the historical test value of a hypothesis test may be based on the likelihood that execution of the hypothesis test causes a failure on the application under evaluation 230, on the likelihood that not running the hypothesis test may allow a defect in the application under evaluation 230 to go undetected, or a combination thereof. For example, if a hypothesis test has historically never resulted in a failure on the application under evaluation 230, and/or if no failure of the application under evaluation 230 during operations has been associated with not executing the hypothesis test, the hypothesis test may have a low test value. Alternatively, if a hypothesis test has caused a failure on the application under evaluation 230 in more than half of its previous tests (or any other number of previous tests), or if operational failures (e.g., defects resulting in support tickets) of the application under evaluation 230 have occurred and are associated with the hypothesis test, directly or indirectly, the hypothesis test may have a high test value. In certain embodiments, the test value of a hypothesis test may be based on whether it has historically provided a better reward than other tests (e.g., information gain, performance gain). In certain embodiments, the test value of a test may be based on testing results of the same test from a previous release of the application (e.g., a previous version, a beta version), the testing results of the same test in a previous portion of the application under evaluation 230, the testing results of the same test from related applications (e.g., from a suite of products by the same company, from a suite of a products having the same domain), the testing results of the same test from all applications tested or designed in a particular geographic area, the testing results of the same test from all applications tested, or any combination thereof.

In certain embodiments, the test value strategy 808 may cause a high percentage (or all) of the tests having a high test value (or any other test value over a particular threshold) to be executed. Furthermore, the test value strategy 808 may cause only a subset of tests, or no tests, having a low test value to be tested. Thus, a portion of these tests having a low test value may be skipped. In certain embodiments, this may allow the application under evaluation 230 to be tested with all (or most) of the tests that are likely to cause failures in the application (or that provide greater rewards), and also to be tested with only a portion of the tests that are unlikely to cause failures in the application (or that provide lesser rewards). The test value strategy 808 may be utilized on any portion of the hypothesis tests. For example, the test value strategy 808 may be used on all of the hypothesis tests (or a portion of the tests). This may, in certain embodiments, cause tests to be sorted and/or grouped in sets (and/or subsets of sets) based on their historical test value. As an example of this, the hypothesis tests having the highest historical test value may all be sorted into a first set, the hypothesis tests having the second highest historical test value may all be sorted into a second set, and so on. In certain embodiments, the test value strategy 808 may be used on all (or a portion) of the hypothesis tests included in a particular set (or subset of a set).

In certain embodiments, the runtime/locality strategy 809 may be utilized to observe how the resources of system 100 react to testing of a particular field (or subfield), and then, based on the observation, to adjust a quantity of hypothesis tests generated, to adjust the enumeration of hypothesis tests, to modify the sorting of hypothesis tests, to prioritize hypothesis tests, to adjust the prioritization of hypothesis tests, to determine a subset of hypothesis tests, to modify a subset of hypothesis tests, to determine a hypothesis test to be executed, or a combination thereof. In certain embodiments, testing a particular field (or subfield) may require more system resources than the testing of other fields. For example, testing of a particular field in an application under evaluation 230 may require access to particular data sources (e.g., external data sources 202), may require access to particular networks (e.g., external network 165), may require additional computation work, or any combination thereof. In such examples, executing all of the tests for that particular field (before moving to tests for another field) may result in increased performance for system 100 (and/or improved runtime performance) due to, for example, caching of data at different levels of system 100. As an example of this, if FieldA requires access to DatabaseA, then data from Database A (e.g., tables, indexes, columns, and/or rows) may be cached in memory after a first test is performed for FieldA. In certain embodiments, the remaining tests for FieldA may be selected for execution immediately after the first test, thereby allowing system 100 to utilize the already cached data. As such, if tests for another field were originally scheduled for execution, these tests may be skipped over in favor of the remaining tests for FieldA.

In certain embodiments, if the testing process then moves to a subsequent portion of the application (e.g., a second webpage) and finds a second instance of FieldA (which was just tested on the previous portion), that second instance of FieldA may be selected for immediate testing because the same data required to test FieldA is likely already cached. Similarly, in certain embodiments, if FieldA is included in other portions of the application (e.g., on another webpage in the application), system 100 may activate a search for such portions and then skip to those portions to perform immediate testing of FieldA. When done, the testing process may then move back to the original portion of the application to continue testing. Similarly, besides runtime, cost may be a consideration, in certain embodiments. For example, if a fieldX needs a resourceX which has a costX, then it may be cost effective to do all of the fieldX tests at one time and just have one costX (as opposed to spreading them out and having multiple costX). Also, the runtime/locality strategy 809 may consider fluctuations in costX. For example, at night a resourceX may have a cheaper costX than during business hours. Therefore, the system 100 may schedule the tests for fieldX after hours.

In certain embodiments, system 100 may track resource activity and runtime when testing fields. This may allow particular fields (and their associated hypothesis tests) to be selected for testing when it is most optimal. For example, if FieldA has historically required 20% resource activity for efficient runtime during testing, testing of FieldA may be postponed until at least 20% of resources are available. As another example, if FieldA has historically required 30 minutes of runtime using minimal resources, testing of FieldA may be postponed until those minimal resources are available for at least 30 minutes. The runtime/locality strategy 809 may be utilized on any portion of the hypothesis tests. For example, the runtime/locality strategy 809 may be used on all of the hypothesis tests (or a portion of the tests). This may, in certain embodiments, cause tests to be sorted and/or grouped in sets (and/or subsets of sets) based on the field (or subfield) they test. As an example of this, the hypothesis tests that test a first field may all be sorted into a first set, the hypothesis tests that test a second field may all be sorted into a second set, and so on. In certain embodiments, the runtime/locality strategy 809 may be used on all (or a portion) of the hypothesis tests included in a particular set (or subset of a set). In certain embodiments, the runtime/locality strategy 809 may be dynamically applied such that new observations of how the resources of system 100 react to the execution of hypothesis tests, and/or changes in testing goals, available resources, a changed or new external parameter, a changed or new internal parameter, the generation of new hypothesis tests, the removal of hypothesis tests, the modification of hypothesis tests, or a combination thereof, may be utilized to adjust a quantity of hypothesis tests generated, to adjust the enumeration of hypothesis tests, to modify the sorting of hypothesis tests, to prioritize hypothesis tests, to adjust the prioritization of hypothesis tests, to determine a subset of hypothesis tests, to modify a subset of hypothesis tests, to determine a hypothesis test to be executed, or combination thereof.

In certain embodiments, the parallelism strategy 810 may be utilized to observe how hypothesis tests perform when multiple testing processes are being performed, and then, based on the observation, to adjust a quantity of hypothesis tests generated, to adjust the enumeration of hypothesis tests, to modify the sorting of hypothesis tests, to prioritize hypothesis tests, to adjust the prioritization of hypothesis tests, to determine a subset of hypothesis tests, to modify a subset of hypothesis tests, to determine a hypothesis test to be executed, or a combination thereof. For example, when tests are being executed, data may be collected on how efficiently the test is executed when only a single testing process is occurring, and when multiple testing processes (e.g., 2 processes, 3 processes, N processes) are occurring. Based on a comparison of this data, it may be determined that for particular tests, each new process results in nearly linear performance improvements up to a point. In certain embodiments, the point at which the performance drops off may be the result of limited system resources or the architecture of the testing (such as locking on a particular page). In certain embodiments, such determination may allow the system 100 to identify tests that can be executed efficiently even when N testing processes are being performed. A group of these tests may then be selected for execution simultaneously in parallel processes, thereby allowing multiple tests to be simultaneously executed without decreasing efficiency of the test.

In certain embodiments, the parallelism strategy 810 may be utilized to determine where in an application under evaluation 230 each parallel testing process should be performed. For example, it may be determined that all of the parallel testing processes (e.g., N processes) are quicker if they operate on the same portion of the application (e.g., on the same web page) so as to increase the locality of required data, for example. Alternatively, it may be determined that all of the parallel processes are quicker if each process is operated on different portions of the application (e.g., on different web pages) so that they do not lock or have contention for the same data or resource, for example. The parallelism strategy 810 may be utilized on any portion of the hypothesis tests. For example, the parallelism strategy 810 may be used on all of the hypothesis tests (or a portion of the tests). This may, in certain embodiments, cause tests to be sorted and/or grouped in sets (and/or subsets of sets) based on the number of parallel processes they can be tested efficiently with. As an example of this, the hypothesis tests that may be tested with N parallel processes may all be sorted into a first set, the hypothesis tests that may be tested with N−1 parallel processes may all be sorted into a second set, and so on. In certain embodiments, the parallelism strategy 810 may be used on all (or a portion) of the hypothesis tests included in a particular set (or subset of a set). In certain embodiments, the parallelism strategy 810 may be dynamically applied such that new observations of how hypothesis tests perform when multiple testing processes are being performed, and/or changes in testing goals, available resources, a changed or new external parameter, a changed or new internal parameter, the generation of new hypothesis tests, the removal of hypothesis tests, the modification of hypothesis tests, or a combination thereof, may be utilized to adjust a quantity of hypothesis tests generated, to adjust the enumeration of hypothesis tests, to modify the sorting of hypothesis tests, to prioritize hypothesis tests, to adjust the prioritization of hypothesis tests, to determine a subset of hypothesis tests, to modify a subset of hypothesis tests, to determine a hypothesis test to be executed, or a combination thereof.

In certain embodiments, the intelligent sampling strategy 811 may be utilized to achieve a wide variety of tests in a given testing process by determining or adjusting the sorting of hypothesis tests into test sets, by selecting or adjusting the test subsets of test sets, by determining or adjusting the prioritization of hypothesis tests, by determining a hypothesis test to be executed, or combination thereof. For example, by adjusting the prioritization of hypothesis tests, the intelligent sampling strategy may select particular tests for execution in order. As a further example, if a positive test is selected to be executed for a particular field, the intelligent sampling strategy 811 may be used to also select a negative test to be executed for that particular field. In this case, the selecting of the positive test and negative test pair may be accomplished by placing the positive and negative test into a common test set or a common test subset, by determining or adjusting the priority of the positive test and negative test so they have the same or similar priorities, by causing the positive test and the negative test to be selected for execution, or a combination thereof. As another example, if a first selected test is used to test a passing low boundary value in a date range field, the second selected test may be a test that is used to test a passing mid-range boundary value in the date range field, and the third selected test may be a test that is used to test a passing high boundary value in the date range field. In certain embodiments, this may allow for the widest range of tests to be performed on that field. In certain embodiments, the intelligent sampling strategy 811 may subsequently select the other tests for that field to be executed in subsequent testing processes. This may allow all (or most) of the tests for the field to be run over time. However, in certain embodiments, the testing process using the widest range of tests may be the fastest process to execute. Thus, to save time, the intelligent sampling strategy 811 may choose to only test a field using the widest range of tests. In such examples, the other tests for the field may be skipped.

In order to select the widest range of tests, a distance function may be used to compute values that should be tested. This distance function may use a max distance (or other max metric) to select tests that have the widest range of test values. This may, in certain embodiments, cause very dissimilar test values to be selected for testing. For example, if the test value of a first selected test is an outlier, the test value of a second selected test may be an average value. Furthermore, if the test value of a first selected test is unique, the test value of a second selected test may be highly duplicated (e.g., LastName='Johnson'). If the test value of a first selected test is a long string, the test value of a second selected test may be a short string. Also, if the test value of a first selected test has a small decimal precision, the test value of a second selected test may have a large decimal precision (e.g., 1.2345678). In certain embodiments, any other function may be used to select the widest range of tests. For example, the intelligent sampling strategy 811 may utilize a function which computes estimated resources needed. In such an example, the intelligence sampling strategy 811 may choose the widest range of tests that minimize the estimated resources needed.

The intelligent sampling strategy 811 may be utilized on any portion of the hypothesis tests. For example, the intelligent sampling strategy 811 may be used on all of the hypothesis tests (or a portion of the tests). This may, in certain embodiments, cause tests to be sorted and/or grouped in sets (and/or subsets of sets) based on the range of their test values. As an example of this, the hypothesis tests having the widest range of values for a field may all be sorted into a first set, the hypothesis tests having the second widest range of values for a field may all be sorted into a second set, and so on. In certain embodiments, the intelligent sampling strategy 811 may be used on all (or a portion) of the hypothesis tests included in a particular set (or subset of a set). In certain embodiments, the intelligent sampling strategy 811 may be dynamically applied to achieve a wide variety of tests in a given testing process such that changes in testing goals, available resources, a changed or new external parameter, a changed or new internal parameter, the generation of new hypothesis tests, the removal of hypothesis tests, the modification of hypothesis tests, or a combination thereof, may cause the reapplication of the intelligent sampling strategy to the hypothesis tests, or a portion of the hypothesis tests.

In certain embodiments, the constraint ratiocination strategy 812 may be utilized to consider the confidences of the simplest constraints, and then run hypothesis testing to validate those simple constraints. Next, the constraint ratiocination strategy 812 may consider those confidences combined (AND'd or OR'd) together. In certain embodiments, if estimated confidences are too low for various combinations, the constraint ratiocination strategy 812 may skip those low confidence combinations, and only try high confidence combinations to actually do the hypothesis testing.

When building a final constraint to represent a field (or other widget), or group of fields (or group of widgets), there are often multiple smaller constraints that must be put together. Traditionally, a system may try various combinations (ANDS, ORs) of simpler base constraints to try to build the final constraint. The system may try all combinations of various base constraints, and look for and keep constraints with the highest confidence from hypothesis testing. As an optimization to this typical strategy (which is exhaustive in nature), the constraint ratiocination strategy 812 may prefer combinations that are "likely" to result in a higher confidence, by taking into account the confidences of the base constraints. This creates a tradeoff between running all permutations and processes, and only running some of them (merge/generalize/combine). The constraint ratiocination strategy 812 may try an optimization in most cases and verify whether it can come to a high enough confidence value, or if not, it may try sampling some of the more exhaustive methods or permutations to see if there are any constraints confidences worth pursuing, or it may exhaustively test all combinations. Examples of this include (1) Merge, Generalize, then Combine, which may cause the algorithm to converge quicker, but ultimately result in slightly lower confidence as some data may be lost on the way; and (2) Merge, and Combine (no generalization), where the algorithm may run for much longer, but may ultimately result in the highest confidence constraint as data is never lost on the way.

An example of an OR optimization may occur when there are lower confidences such as: a confidence A of 0.6 and confidence B of 0.7, so that the combined AND confidence would be 0.42 (i.e., 0.6*0.7) via standard probability theory which may be a low confidence. Even if hypothesis testing is able to improve the confidence some, it is starting too low to be likely, and thus, it can be decided not to hypothesis test this combination. Conversely, if combined with an OR, the combined OR confidence would be 0.88 (i.e., (0.6+0.7)—(0.6*0.7)) via standard probability theory which may be a high enough confidence to perform hypothesis testing with (and to see if this already high confidence can be improved). If the OR is not validated by the hypothesis testing, the system 100 may choose to test the AND, or in some embodiments, not test it all based on the low combined AND confidence. An example of an AND optimization may be, if we have a confidence C of 0.95 and confidence D of 0.96, so that the combined AND confidence would be about 0.91 (i.e., 0.95*0.96) via standard probability theory which may be a high confidence. Since the AND is more restrictive than the OR, and even so, the system 100 may still predict a high confidence, then system 100 may prefer the AND in the hypothesis testing. If the hypothesis testing confirms the AND, then system 100 may skip the OR processing. If the AND is not proven, then system 100 may consider hypothesis testing with the OR.

As a different optimization, if the system 100 has a set of hypothesis or constraints all referencing a field or widget, and that field is a numerical one, system 100 may arrange the field on a logical number line, and choose AND/ORs as seems appropriate. For example, given F<10, F>15, F<20. The system 100 may prefer ANDs where intersections of values on the number line are detected (F>15 && F<20) and ORs where gaps may be detected on the number line (F<10), resulting in (F<10) (F>15 && F<20) as the initial constraint to try to hypothesis test with. If hypothesis testing validates the constraint, then system 100 may be done, otherwise system 100 may try other permutations. In a hybrid solution, system 100 may vary how many tests it actually runs based on any number of goals or decisions. For example, depending on availability or costs of resources, number of or complexity of constraints (or hypotheses) to process, real-time deadlines, number or urgency of other processes, system 100 may run more or less hypothesis tests. The constraint ratiocination strategy 812 may be utilized on any portion of the hypothesis tests. For example, the constraint ratiocination strategy 812 may be used on all of the hypothesis tests (or a portion of the tests). In certain embodiments, the constraint ratiocination strategy 812 may be used on all (or a portion) of the hypothesis tests included in a particular set (or subset of a set).

In certain embodiments, the discovery as testing strategy 813 may be utilized to reduce the number of enumerated and/or executed tests by using the results of explorers 223, discovery 304, validators 222, other executors, or any combination thereof, as performed on the application under evaluation 230, or a prior, closely related version of the application under evaluation 230, as executed test results 916. For example, in the embodiment seen in FIG. 7, 36 tests are enumerated to evaluate hypotheses and/or constraints related to two input fields of an application under evaluation 230, "Min Year" and "Max Year". In certain embodiments, the constraints and/or hypotheses related to these fields, may have been produced, or may be validated, in whole or in part, by previously performed activities (an exploration, discovery, prior validation, other activity involving the execution of steps on the application under evaluation 230, or any combination thereof), performed on the application under evaluation 230. If performed under sufficiently similar conditions and if resulting in results sufficiently similar to test results 916, these previously performed activities may replace the need to enumerate similar tests and/or to execute similar tests. In certain embodiments, the results of such previously performed activities may be utilized as a test result 916 and/or as a contributor to the output of test results 928. For example, if explorations equivalent to tests 8 and 10 from FIG. 7 were executed by an explorer 223, and processed by dynamic model discovery 206, such that the results of the exploration were represented in the agglomerate models 218, and such that the results were available to strategy 813 and/or method 900, the enumerated test 8 and the enumerated test 10 may be skipped. In certain embodiments, a temporal measure may be utilized as a similarity measure such that the strategy may skip tests associated with previously performed activities if they occur within a certain time period. In certain embodiments, similarity measures may include the similarity of the current application under evaluation 230 to the application under evaluation on which the previously performed activities were performed, the similarity of abstract effect (e.g., test 20 from FIG. 7 may be matched to any previously performed activities where midrange values were input). In certain embodiments, the discovery as testing strategy 813 may be dynamically applied such that remaining, untested hypotheses may be reprocessed, based on a change in testing goals, available resources, a changed or new external parameter, a changed or new internal parameter, prior hypothesis testing results, the generation of new hypothesis tests, the removal of hypothesis tests, the modification of hypothesis tests, the availability of new or modified performed activity results, or a combination thereof. The discovery as testing strategy 813 may be utilized on any portion of the hypothesis tests. For example, the discovery as testing strategy 813 may be used on all of the hypothesis tests (or a portion of the tests). In certain embodiments, the discovery as testing strategy 813 may be used on all (or a portion) of the hypothesis tests included in a particular set (or subset of a set).

In certain embodiments, the limited or special resources strategy 814 may be utilized to further optimize the use of limited or special resources in the conduct of testing. For example, the enumerated tests may include a plurality of tests where a similar constraint, order of operations, and/or transition is tested on a variety of platforms and/or environments, on which the application under evaluation 230 may be deployed, in part or in total. In this example, it may be preferential to use one platform and/or environment, over another platform and/or environment, due to availability, cost, reliability of the platform, and/or other considerations. For example, in the embodiment seen in FIG. 7, where the hypothesis and associated tests apply to both mobile and desktop platforms, and where the costs associated with testing on the mobile platform are higher than on the desktop platform, the strategy may execute a larger number and more complete selection of tests on the desktop platform and a smaller set of tests on the mobile platform. In certain embodiments, if test failures are encountered on one platform and/or environment, the strategy may adjust the numbers and/or ratios of tests associated with any or all of the platforms and/or environments in response. In certain embodiments, the strategy may perform a higher number of tests (or alternatively a lower number of tests) on platforms and/or environments for which the platform and/or environment is more (or less) prone to error. In certain environments, the strategy may take into account consumables that may be expended in the conduct of certain tests, the cost of the consumables, and/or the availability of the consumables.

The limited or special resources strategy 814 may be utilized on any portion of the hypothesis tests. For example, the limited or special resources strategy 814 may be used on all of the hypothesis tests (or a portion of the tests). In certain embodiments, the limited or special resources strategy 814 may be used on all (or a portion) of the hypothesis tests included in a particular set (or subset of a set). In certain embodiments, the limited or special resources strategy 814 may be dynamically applied such that remaining, untested hypotheses may be reprocessed, based on a change in testing goals, available resources, a changed or new external parameter, a changed or new internal parameter, prior hypothesis testing results, the generation of new hypothesis tests, the removal of hypothesis tests, the modification of hypothesis tests, or a combination thereof.

In certain embodiments, the synergy strategy 815 may be utilized to sort tests which share setups into the same or similar sets. Thus, the actual execution may run the setup once, or a fewer number of times, for a larger number of tests. The setup of a test may refer to the processing that is performed (or that is needed to be performed) in order for a test to be executed. In certain embodiments, the running of hypothesis tests can be very expensive due to the setup needed to run a hypothesis test. In some cases, the hypothesis is testing a field or widget or constraint (or group thereof) which may take a long time to go from an initial state to one that can actually access or test the field or widget or constraint (or group thereof) in an application under evaluation 230. The constraint may be in a location which takes a large number of actions (e.g., clicks, text entries, numeric entries, settings, template submissions, etc.). Furthermore, it may be in a location which takes many states (web pages) or transitions between states, or satisfying many other constraints, or other processing to reach the web page just to run the test. It may take a lot of time, resources, or cost to get to the web page to run the test. It may require the construction, destruction, modification, etc., of a large number of supporting objects, documents, artifacts, configurations, etc. Collectively, this processing may be referred to as the setup.

In certain embodiments, a particular setup may be shared by different hypothesis tests. For example, two widgets on the same screen may share the same setup to reach that same screen. Therefore, by sorting these hypothesis tests into the same or similar set (according to the synergy strategy 815), the setup may only need to be run once (or a fewer number of times) in order to test all of these hypothesis tests included in the same or similar set. In addition to, or instead of, saving repeated setup steps, the system 100 may be faster by taking advantage of standard caching at various levels of the system (because the same setup, or actions thereon, are being run), in certain embodiments. In some embodiments, complete setups may be shared, and in other cases partial setups may be shared. In certain embodiments, an estimate of the savings from sharing setup costs may be used in deciding which set(s) to sort a hypothesis test into. In certain embodiments, a database of setups may be configured and the associated costs with using the setup can also be stored in the database. The costs may be actual costs from historical monitoring, or the costs may be estimates based on the actions, states, transitions, constraints, databases, products, web sites, artifacts, objects, etc. accessed by the setup, and/or the number of such items. The synergy strategy 815 may be utilized on any portion of the hypothesis tests. For example, the synergy strategy 815 may be used on all of the hypothesis tests (or a portion of the tests). In certain embodiments, the synergy strategy 815 may be used on all (or a portion) of the hypothesis tests included in a particular set (or subset of a set).

In addition to the hypothesis optimization strategies 800 discussed above, hypothesis tests may be selected for execution based on any consideration and/or function. For example, a portion of tests selected for execution from a set or subset may be smaller or larger based on various considerations, such as, for example, available resources, costs of available resources, or urgencies. As an example of this, the portion size may be selected in part based on a detected urgency. The detected urgency may be based on proximity (logical, functional, or visual or distance (ex. in clicks, or screens, or fields, underlying code etc.)) to detection of one or more application changes, and/or one or more application failures. Additionally the detected urgency may be detecting one or more upcoming or past dates (upcoming release dates, recently past integration dates), changes in status of documents (e.g., agile story move to integrated), or portions of an application under evaluation 230 identified in a document (such as a report which indicates there may be problems in a particular sub portion of an application under evaluation 230). The detected urgency or importance may be detected from a portion of the application under evaluation 230 itself, or detecting that the code of the application under evaluation 230 changed in some area. The detected urgency or importance may be detected from an internal or external document such as an agile story that was just integrated on a particular date. The detected urgency may apply to one urgent area of an application under evaluation 230 and not another area of the application under evaluation 230. In certain embodiments, the larger portion of tests may be chosen because they are associated with the urgent area of an application under evaluation 230. In such an example, smaller portions may be selected if they are associated with another area of the application under evaluation 230.

Any of the hypothesis optimization strategies 800 may be used to simplify and/or reduce (i.e., optimize) the number of hypothesis tests used to test an application under evaluation 230, to optimize the number of resources used, to optimize the costs associated with the resources used, or a combination thereof. Furthermore, in certain embodiments, any number, combination, and/or order of the hypothesis optimization strategies 800 may be used to optimize the number of hypothesis tests used to test an application under evaluation 230, to optimize the number of resources used, to optimize the costs associated with the resources used, or a combination thereof. As an example of this, hypothesis tests selected to test a particular field of an application may first be sorted into two or more sets using the sorting strategy 802. Then, the hypothesis tests in the first set may be ranked and put in order based on test quality using the ordering strategy 803. The five highest ranked hypothesis tests may then selected for execution, for example. If each of these selected tests are validated (i.e., the positive tests pass and the negative tests fail), the remaining tests in the first set may be skipped, so as to move to the other sets (e.g., the second set, the third set, etc.) of hypothesis tests. For each of the other sets, a particular hypothesis test may be selected using the intelligent sampling strategy 811 so as to achieve a wide variety of tests. These selected hypothesis tests may then be executed. If each of these selected tests are validated (i.e., the positive tests pass and the negative tests fail), testing for that particular field of an application may be concluded. The testing procedure may then move to a different field of an application, or may move to a different portion of the application, or may move to an entirely different application for testing.

Figure 9:
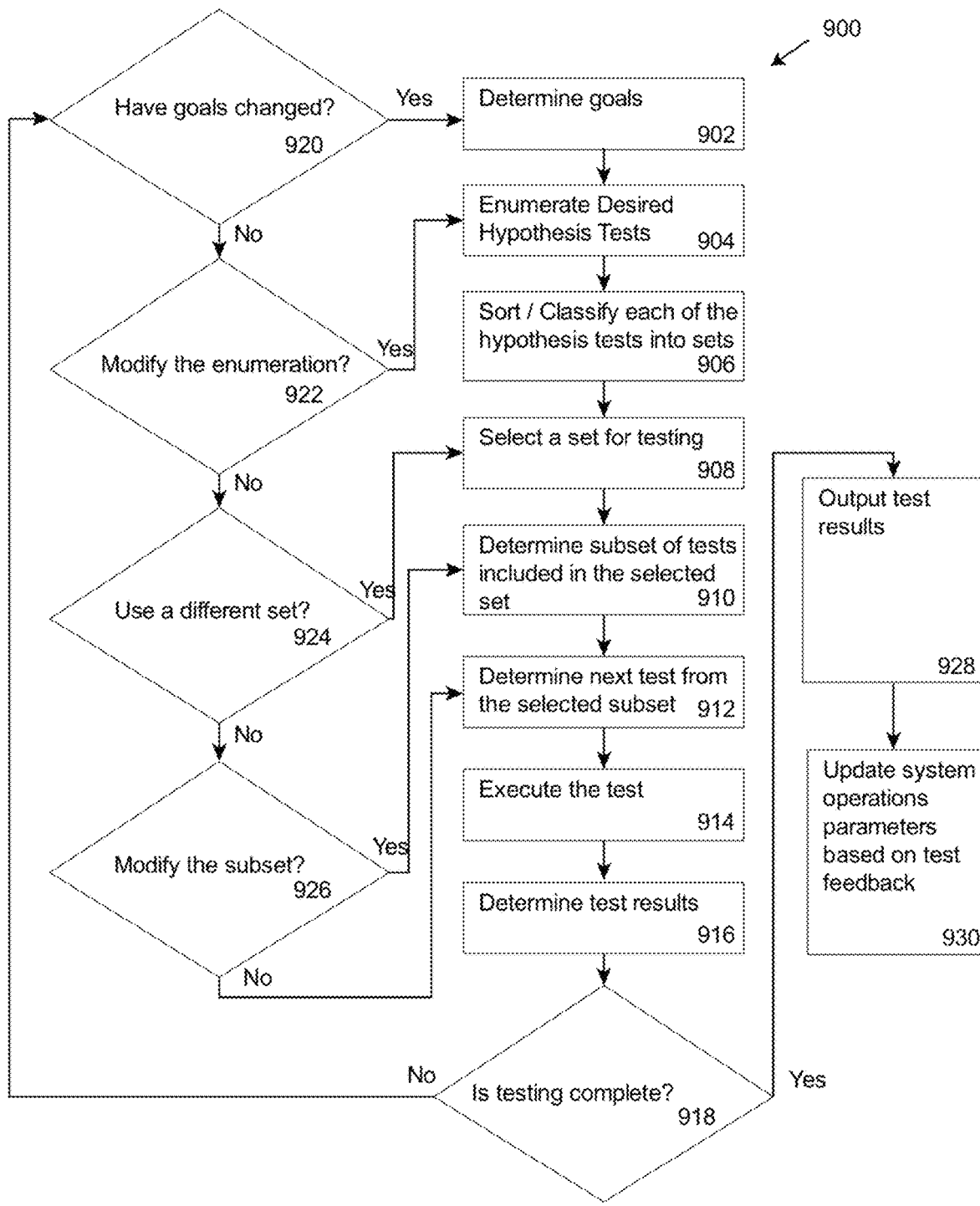
FIG. 9 is a flow diagram illustrating a sample method for optimizing system resources and runtime during a testing procedure according to an embodiment of the present disclosure.

In a use-case scenario and referring now also to FIG. 9, a method 900 for optimizing hypothesized tests during a testing procedure is shown. In certain embodiments, the method 900 may optimize the generation and/or execution of hypothesis tests using one or more hypothesis optimization strategies 800. In certain embodiments, this optimization may be performed to achieve an optimization goal, such that one or more characteristics or outcomes of the testing process is optimized, such as system resource usage (e.g., including processor usage, memory usage, network bandwidth usage, device usage, other resource usage, or any combination thereof); testing quality (e.g., including test coverage, test value, the probability of finding a defect, other testing quality measure, or any combination thereof); cost (e.g., including any testing cost, costs associated with missing an error or defect, costs associated with system resources usage (e.g., system resource usage costs may be associated with cloud usage, virtual machine usage, virtual CPU usage, virtual RAM/memory usage, virtual networking usage, owned machine usage, physical machine usage, CPU usage, RAM/memory usage, networking usage, service costs, software acquisition costs, software licensing costs, historical costs, estimated costs, other actual costs, opportunity costs, depreciation costs, purchase costs, rental costs, leasing costs, licensing costs, financing costs, any other costs, or any combination thereof)); any time measure or measures associated with the testing process (e.g., which may include the duration of the test, including deadlines, past events (such as an integration), future events (such as a release date), other temporal measure, or any combination thereof); consumables usage (e.g., including consumable device usage, consumables usage (e.g. paper, toner, fuel, other consumable), the usage of destructible devices or components); other optimizable characteristics; or any combination, in whole or in part, thereof.

For the purposes of method 900, a user, such as first user 101, or a device, such as first user device 102, or a self-testing application (e.g., the application under evaluation 230, itself), may be interested in testing a particular software application (e.g., application under evaluation 230). The testing may be performed before the application is made available for use, or while the application is in use. Additionally, the user may be interested in having the system 100 conduct hypothesis testing on constraints associated with any inputs or outputs of the application to determine whether the constraints are accurate, whether new constraints should be generated, whether existing constraints should be modified, or any combination thereof. Additionally, the user may be interested in expanding, reducing, modifying, sorting, ordering, prioritizing, and/or selecting the hypotheses and/or hypothesis tests enumerated and/or determined for the purpose of testing the application under evaluation 230. In certain embodiments, the goal of the optimizing may be the optimization of system resources, the maximization of quality, the minimization of costs, the optimum achievement of a test goal (e.g., test coverage, feature testing, boundary testing, equivalence class testing, user interface testing, API testing, performance testing, load testing, accessibility testing, international or language testing, etc.), other optimization goal, or any combination thereof. In certain embodiments, the method 900 may be a sub-method or extension of method 600 of FIG. 6. For example, method 900 may receive inputs from method 600, and may provide outputs to method 600. In certain embodiments, the method 900 may be a stand-alone method that may optimize any type of hypothesis tests, or that may optimize any other type of test, so as to achieve an optimization goal. As such, certain embodiments may be used independently or separately from method 600.

The testing process may be initiated, and the method 900 may include, at step 902, determining the goals of the testing process. In certain embodiments, a goal may indicate an intent of the testing, or a goal may be other information utilized by method 900 (e.g., agglomerate models 218, application under evaluation 230 information, constraints, hypothesis tests, internal data sources 201, external data sources 202, other data sources, or any combination thereof). The goals of the testing process may be determined at step 902 in any manner. In certain embodiments, the goals of the testing process may be determined, at least in part: by parameters, rules, algorithms, processes, or any combination thereof, that are established at least in part through machine learning techniques; by parameters, rules, algorithms, processes, or any combination thereof, that are established at least in part, by the application under evaluation 230; by parameters, rules, algorithms of the system 100; or by any combination thereof. In certain embodiments, the determining of the goals of the testing process may be performed and/or facilitated by utilizing the hypothesis tester 154, the analysis engine 239, the learning engine 226, the controller 224, the first user device 102, the second user device 111, the server 140, the server 150, the server 160, the communications network 135, the validators 222, the executors 223, the learning engine 226, static model discovery 200, dynamic model discovery 206, the agglomerated models 208, the user interface 228, by utilizing any other appropriate program, network, system, or device, or any combination thereof. In certain embodiments, the goals, in part or in total, may be explicitly or implicitly determined from a machine readable medium 1122, from static memory 1106, from main memory 1104, by a processor 1102, from a communications network 135, through a network interface device 1120, according to input from an alpha-numeric device 1112, according to input from a cursor-control device 1114, according to input from another type of input device (e.g., video camera, audio sensor, position tracker, other input device), or any combination thereof. For the purposes of method 900, a user, such as first user 101, or a device, such as first user device 102, or a self-testing application (e.g. the application under evaluation 230, itself), may be interested in testing a particular software application (e.g. application under evaluation 230), may be interested in setting the goals (in whole or in part), or any combination thereof.

In certain embodiments, the goals determined and/or received at step 902 of method 900 may establish, explicitly or implicitly, the optimizations desired. These optimizations desired may include: the identification of one or more hypothesis optimization strategies 800 to be used in the optimization, their importance, their weight, their relative importance, their relative weights, any operational parameter of an optimization strategy, or any combination thereof; system resource optimization goals where a system resource optimization goal may specify the resource to be optimized, its absolute importance, its relative importance, methods or equations for determining a measure or measures of the system resource utilization, weights or parameters associated with the determination of system resource utilization, or any combination thereof; testing quality goals where a test quality goal may specify a test quality measure, its absolute importance, its relative importance, methods or equations for determining the test quality measure, weights or parameters associated with the determination of the test quality measure, or any combination thereof; cost goals where a cost goal may specify the cost to be optimized, its absolute importance, its relative importance, methods or equations for measuring the cost, weights or parameters associated with the measuring of the cost, or any combination thereof; time optimization goals where a time optimization goal may specify the time measure to be optimized, its absolute importance, its relative importance, methods or equations for determining the time measure, weights or parameters associated with the determining of the time measure, or any combination thereof; consumables usage optimization goals where a consumable usage optimization goal may specify the consumable usage to be optimized, its absolute importance, its relative importance, methods or equations for determining the usage of the consumable, weights or parameters associated with the determining of the consumable usage, the amounts of the consumable available, or any combination thereof; destructible device optimization goals where a destructible device optimization goal may specify the destructible device to be optimized, its absolute importance, its relative importance, methods or equations for determining the usage of the destructible device, weights or parameters associated with the determining of the destructible device usage, the quantity of destructible devices available, or any combination thereof; other optimizable characteristic goals; or any combination, in whole or in part, thereof.

In certain embodiments, the goals may be implicitly or explicitly defined, may be defined once, may be defined and/or modified more than once, or any combination thereof. Where the goals are defined and/or modified more than once, the defining and/or modifying may occur periodically, as a result of a test result or test results, in response to changing system resources and/or costs, in response to a determination that the goals may have changed in step 920, in response to the receipt and/or availability of new or modified information, or any combination thereof. In certain embodiments, the goals may have priorities, where the priorities may be statically set, determined by a user (e.g. a first user 101, using a first user device 102, or a second user 110, using a second user device 111), determined and/or dynamically modified using internal sources, external sources, internal algorithms, external algorithms or a combination thereof.

The testing process may be alternatively initiated, and the method 900 may include, at step 904, enumerating desired hypothesis tests for the testing process. In certain embodiments, the goals determined at step 902 may be implicit or unchanging, and the method 900 may start with the enumeration of desired hypothesis tests (at step 904). In other embodiments, the enumerating of desired hypothesis tests may be based, at least in part, on the determined goals from step 902. For example, this enumerating may be achieved by: receiving the hypothesis tests (e.g., from internal data sources 201, external data sources 202, any other data source); obtaining through receiving, copying, or converting dynamic discovery hypotheses, which may be generated by explorers 223, by dynamic model discovery 206, by another application under evaluation 230 discovery process, or any combination thereof (e.g., where the discovery hypotheses may be represented in an agglomerate model 218 or in another data form); by listing, or otherwise identifying, the fields and/or values to be tested; generating the hypothesis tests (e.g., as is discussed in step 608 of FIG. 6) and enumerating the desired hypothesis tests from the generated hypothesis tests (noting that in some cases the enumerated, desired hypothesis tests may be the generated hypothesis tests); enumerating the desired hypothesis tests in any other manner, or any combination thereof.

In certain embodiments, the desired hypothesis tests may be enumerated when they are determined, which may occur when they are generated at step 608 of FIG. 6. The enumerated, desired hypothesis tests may be one or more tests used for testing the hypothesis also generated at step 608 of FIG. 6. In certain embodiments, the enumerating of the desired hypothesis tests may be performed and/or facilitated by utilizing the hypothesis tester 154, the analysis engine 239, the learning engine 226, the controller 224, the first user device 102, the second user device 111, the server 140, the server 150, the server 160, the communications network 135, the validators 222, the executors 223, the learning engine 226, static model discovery 200, dynamic model discovery 206, the agglomerate models 208, the user interface 228, by utilizing any other appropriate program, network, system, or device, or any combination thereof.

In certain embodiments, the desired hypothesis tests may be abstractly expressed, in a manner which allows the desired hypothesis test to be determined at a later step, but prior to, or at the time of, the execution of the desired hypothesis test as part of executing the test (at step 914). For example, an enumerated, desired hypothesis test abstractly defined may specify the desire to test the upper input value bound on a numerical input field, according to a constraint, without specifying the actual value, or the setup steps that may be required in order to set up the conditions for the test on the application under evaluation 230. In other embodiments, the desired hypothesis tests, enumerated in step 904, may be concretely defined as fully determined hypothesis tests ready such that they are ready to be executed at step 914. In yet other embodiments, the desired hypothesis tests, enumerated in step 904, may utilize any combination of abstract or concrete means to describe and/or define the desired hypothesis tests such that they may be fully determined prior to the execution of the desired hypothesis tests as part of step 914. For example, rather than abstractly defining a desired hypothesis test or tests in terms of the abstract concept of testing the upper input value bound of a numerical input field, a hypothesis test or tests associated with the abstract concept may be defined in concrete terms, where the actual value or values that are intended to be tested are expressly defined within the test. In a preferred embodiment, the abstract reasoning, or purpose of the test (e.g., testing the upper input bound of a field) may be retained as metadata associated with the desired hypothesis test such that the test may be easily modified if a constraint associated with the test changes, if the testing goals change, if the hypothesis test is to be merged with another hypothesis test, if the information may be used in the determining of an executable test, or any combination thereof. In another preferred embodiment, the full determining of the hypothesis test may be delayed until the hypothesis test is selected for execution as part of step 912, or until the hypothesis test is readied for execution as part of step 914. In such a way, the system resources required to fully determine a hypothesis test, such that the hypothesis test may be executed on the application under evaluation 230, may be conserved. For example, in certain cases an enumerated, desired hypothesis test may not be executed, or the concrete values, or executable steps, associated with a desired hypothesis test may be modified one or more times prior to execution. In these cases, it may be desirable to convert an abstract hypothesis test into a concrete, executable hypothesis test as late as possible prior to execution (at step 914), such that system resources are not unnecessarily expended in the development of concrete values and/or executable steps which may not be utilized.

In certain embodiments, a hypothesis test may be abstract, concrete or executable, in whole or in part, and/or may consist of one or more steps, where a step is an action (e.g., input to the application under evaluation 230 where examples of input may be an entry into a text field, a mouse click, an API call, sensor input, etc.) performed on the application under evaluation 230, and one or more expectations, where an expectation is an expected output of the application under evaluation 230, which results from a step or steps performed on the application under evaluation 230. In certain embodiments, a step may be abstract, concrete, and/or executable. In certain embodiments, an expectation may be abstract, concrete. In certain embodiments, a hypothesis test may consist of any number and/or combination of abstract, concrete, and/or executable steps and any number and/or combination of associated abstract and/or concrete expectations.

The determining of a hypothesis test to be executed may be performed, at least in part: externally to the method 900 and provided to method 900 as fully, or partially determined hypothesis tests; immediately prior to test execution as a part of executing the test at step 914; during the determining of the next test from the selected subset (at step 912); during the determining of the subset of tests included in the selected subset (at step 910); during the selecting a set for testing (at step 908); during the sorting/classifying of each of the hypothesis tests into sets (at step 906); during the enumeration of the desired hypothesis tests (at step 904); or during any combination of the steps thereof.

In certain embodiments, the enumeration of desired hypothesis tests may be enumerated once, may be enumerated more than once, or may be modified. Where the enumeration is enumerated and/or modified more than once, the enumerating and/or modifying may occur periodically, as a result of a test result or test results, in response to changing system resources and/or costs, in response to new and/or modified goals, in response to a decision to modify the enumeration in step 922, in response to the receipt and/or availability of new or modified information, or any combination thereof.

At step 906, the method 900 may include sorting and/or classifying of each of the hypothesis tests into sets. In certain embodiments, a set may be a group of one or more hypothesis tests. At step 906, the hypothesis tests may be sorted and/or classified into any number of sets. For example, the hypothesis tests may be sorted and/or classified into two sets, three sets, ten sets, twenty sets, or any other number of sets. Each set may include any number of hypothesis tests. For example, each set may include one test, two tests, three tests, five tests, ten tests, twenty tests, or any other number of tests. Furthermore, a set may include the same number of tests as the other sets, or may include a different number of tests than another set. In certain embodiments, sorting may involve sorting any given hypothesis test into one or more sets. In certain embodiments, classifying may be performed, where classifying may associate any given hypothesis with one or more sets. In certain embodiments, a combination of sorting and classifying may be performed.

In certain embodiments, the method 900 may sort each of the hypothesis tests into sets using any of the hypothesis optimization strategies 800, or any combination of hypothesis optimization strategies 800. In certain embodiments, the method 900 may sort each of the hypothesis test into sets using the sorting strategy 802, the ordering strategy 803, the static hypothesis testing strategy 804, the pooling strategy 805, the observation strategy 806, the field history strategy 807, the test value strategy 808, the runtime/locality strategy 809, the parallelism strategy 810, the intelligent sampling strategy 811, the constraint ratiocination strategy 812, the discovery as testing strategy 813, the limited or special resources strategy 814, the synergy strategy 815, any other strategy, or any combination thereof. In certain embodiments, if a hypothesis test is classified and/or associated with more than one set, then the hypothesis test results may be shared across all references to the hypothesis test, in any set in which the references may occur, following the execution of the hypothesis test in step 914. In certain embodiments, the sorting may be performed and/or facilitated by utilizing the hypothesis tester 154, the analysis engine 239, the learning engine 226, the controller 224, the controller 224, the first user device 102, the second user device 111, the server 140, the server 150, the server 160, the communications network 135, the validators 222, the executors 223, static model discovery 200, dynamic model discovery 206, the agglomerate models 208, the user interface 228, by utilizing any other appropriate program, network, system, or device, or any combination thereof.

One embodiment of the sorting of step 906 may be seen in FIG. 7. Using the sorting strategy 802, the method 900 may sort each of the hypothesis tests (i.e., shown as tests 1-36) into 8 different sets (i.e., optimized sets 1-8) based on test features. For example, tests 1-11 each focus on a particular test strategy for each subfield. As such, they may all be sorted into set 1. Furthermore, tests 12-13 and 28-29 may be sorted into set 2 because they each test two border errors; tests 14-16 may be sorted into set 3 because they each test an invalid minimum value and one valid maximum value; tests 17, 18, 30, 31, 35, and 36 may be sorted into set 4 because they each test one valid minimum value and one invalid maximum value; tests 19-21 may be sorted into set 5 because they each test equivalent passing values; tests 22, 23, and 24 may be sorted into set 6 because they each test a minimum value being smaller than a maximum value; tests 25-27 may be sorted into set 7 because they each test one minimum failing border value and one maximum passing border value; and tests 32-34 may be sorted into set 8 because they each test a minimum value being larger than a maximum value.

In certain embodiments, the sorting/classifying of desired hypothesis tests may be performed once or may be performed more than once. Where the sorting/classifying is performed more than once, the sorting/classifying may occur periodically, as a result of a test result or test results, in response to changing system resources and/or costs, in response to new and/or modified goals, in response to a new or modified enumeration of desired tests, in response to the receipt and/or availability of new or modified information, or any combination thereof.

At step 908, the method 900 may include selecting one of the sets for testing. In certain embodiments, any of the sets may be selected for testing. As an example, a first set may be selected for testing, a second set may be selected for testing, a third set may be selected for testing, or any other set may be selected for testing. In certain embodiments, the sets may be selected iteratively, in parallel, or in a manner that varies from iteratively to in parallel based upon the size of the sets, the availability of resources, the goals, any other reason, or any combination thereof. According to the embodiment illustrated in FIG. 7, set 1 (which includes hypothesis tests 1-11) may be selected for testing. In certain embodiments, more than one set may be selected for testing. For example, according to the embodiment illustrated FIG. 7, each of sets 2-8 (which include hypothesis tests 12-36) may be selected for testing.

A determination regarding which set to select for testing may be made in any manner. For example, a particular set (or sets) may be selected for testing if such a selection may reduce the number of future tests that need to be performed, if the tests in that set have a higher test value, if the tests in that set have a higher confidence level, if the tests in that set are all expected to pass (or all expected to fail), any other reason, or any combination of the preceding. Additionally, in certain embodiments, the determination regarding which set to select for testing may be based on the hypothesis optimization strategies 800, such as, for example, the sorting strategy 802, the ordering strategy 803, the static hypothesis testing strategy 804, the pooling strategy 805, the observation strategy 806, the field history strategy 807, the test value strategy 808, the runtime/locality strategy 809, the parallelism strategy 810, the intelligent sampling strategy 811, the constraint ratiocination strategy 812, the discovery as testing strategy 813, the limited or special resources strategy 814, the synergy strategy 815, any other strategy, or any combination thereof. In certain embodiments, the selecting may be performed and/or facilitated by utilizing the hypothesis tester 154, the analysis engine 239, the learning engine 226, the controller 224, the controller 224, the first user device 102, the second user device 111, the server 140, the server 150, the server 160, the communications network 135, by utilizing any other appropriate program, network, system, or device, or any combination thereof.

For example, as is seen in the embodiment illustrated in FIG. 7, the selection at step 908 may have first selected set 1 for testing. In such an example, step 924 may have returned the control flow to step 908, after each test within the subset of tests (determined in step 910) is both determined as a next test in step 912, and executed in step 914. In such an example, method 900 may have then selected set 5 at step 908. Then, at step 910, the method 900 may use the intelligence sampling strategy 811 in order to achieve a wide variety of tests in the current testing process. In such an example, this may cause test 19 (from set 5) to be selected as the subset of set 5, so as to test the passing low border value (e.g., "above lower bound (pass)" having a test value of 1980) for both subfields. Then, after the testing of the selected subset of set 5 is completed (in a manner similar to that of set 1 as described above), set 6 may have then been selected at step 908. Furthermore, in order to satisfy the widest variety of tests, the intelligence sampling strategy

811 may subsequently cause method 900 to select test 24 from the set 6, because the test 24 uses different test strategy values (including the midrange passing value (e.g., "mid range (pass)" with a test value of 200) and the high border passing value (e.g., "below upper bound (pass)" with a test value of 2017) than does test 19 (from set 5). This may allow various field test values to be exercised during the optimized testing process. In certain embodiments, such a testing strategy may reduce the number of hypothesis tests from 36 tests to potentially 18 tests, providing a more efficient testing process. In certain embodiments, this may reduce the time required for testing of an application under evaluation 230 and/or may reduce the number of resources in system 100 required for testing the application under evaluation 230.

As another example, and as is also seen in the embodiment illustrated in FIG. 7, method 900 may have first selected sets 2-8 (i.e., tests 12-36) for testing (at step 914), so as to verify that every field strategy and any corresponding error was encountered. If such testing was successful, the method 900 may then select set 1 (i.e., tests 1-11) for testing in step 922. Then, at step 924, a subset of these tests may be selected. For example, only tests 1, 2, and 7 may be selected for execution. This selected subset of tests allows method 900 to execute tests where the minimum year subfield is left blank ("null"), where the maximum year subfield is left blank ("null"), and where both the minimum year subfield and the maximum year subfield are left blank ("null"). If these tests are successful (i.e., the actual results match the expected results), method 900 may skip the remaining eight tests included in set 1. Thus, in certain embodiments, such a testing strategy may reduce the number of hypothesis tests by at least 8 tests, providing a more efficient testing process. In certain embodiments, this may reduce the time required for testing of an application under evaluation 230 and/or may reduce the number of resources in system 100 required for testing the application under evaluation 230.

In certain embodiments, the selection of a set may be based on previous set selections, the availability of system resources, the method 900 goals, other considerations, or a combination thereof. As an example, if a first set was selected for testing, the second set may be selected for testing after the first set has been tested, as may be indicated by the completion of a subset of tests from the first set. Similarly, a third set may be selected for testing after the second set has been tested. In certain embodiments, one or more sets may be selected for testing in series or in parallel based upon available system resources, the method 900 goals, other considerations, or a combination thereof. In certain embodiments, more than one non-tested set may be selected for testing. For example, according to the embodiment illustrated in FIG. 7, each of sets 2-8 (which include hypothesis tests 12-36) may now be selected for testing. A determination regarding which set to select for testing may be made in any manner. For example, a particular set (or sets) may be selected for testing if such a selection may reduce the number of future tests that need to be performed, if the set has a higher aggregate test value (e.g., the aggregate test value may be the highest or lowest test value in the set, the average test value, the median test value, or other aggregate test value), if the set has a higher aggregate confidence level (e.g., the aggregate confidence value may be the highest or lowest confidence value in the set, the average confidence value, the median confidence value, or other aggregate confidence value), if the tests in that set are all expected to pass (or all expected to fail), if the tests in that set require particular hardware resources and that resource is immediately available (or not), any other reason, or any combination thereof, in whole or in part. In certain embodiments, an aggregate score may be computed for the set, and the highest/lowest score chosen (e.g., the highest average confidence for a set, the highest summation of value for a set, the lowest summation of resources for a set etc.). In certain embodiments, a previously selected set may be reselected for testing. For example, according to the embodiment illustrated in FIG. 7, a failure of a test in set 4 may indicate a desire to conduct additional testing of sets 1, 2 or 3, and/or repeat tests in set 1, 2 or 3. Also, based on the failure of a test in set 4, the method 900 may decide to test more of any remaining tests in test 4 to further isolate the error, or conversely to test less of any remaining tests in set 4, because further testing of set 4 may be determined to be unnecessary or ineffective. Such a determination may be made based on the type of failure (which may involve getting advice from the knowledge engine), goals, or any other criteria.

In certain embodiments, the selecting of a set for testing may be performed once or may be performed more than once. Where the selecting of a set for testing is performed more than once, the selecting of a set for testing may occur periodically, as a result of a test result or test results, in response to changing system resources and/or costs, in response to new and/or modified goals, in response to a new or modified enumeration of desired tests, in response to a new or modified sorting or classifying of enumerated tests, in response to a decision to use a different set in step 924, in response to the receipt and/or availability of new or modified information, or any combination thereof.

At step 910, the method 900 may include determining a subset of tests included in the selected set. In certain embodiments, the subset of tests may be an empty subset, a single test, two tests, more than two tests, or all tests in the selected set. In certain embodiments, the subset of tests may be any number of tests in the selected set, other than all of the tests. For example, if the set includes ten hypothesis tests, the subset may be nine tests, eight tests, seven tests, two tests, one test, or any other number of tests lower than 10. The subset of tests may be selected in any manner. For example, a subset of tests may be selected if such a selection may reduce the number of future tests that need to be performed, if those tests have a higher test value, if those tests have a higher confidence level, if those tests are all expected to pass (or all expected to fail), any other reason, or any combination of the preceding. In certain embodiments, the determining a subset of tests included in the selected set includes selecting tests from the selected set for execution, where the execution of any or all of the tests in the subset may or may not be executed (in step 914) due to intervening changes in the goals, enumerated hypothesis tests, sets, subsets, and/or a determination that testing is complete. In certain embodiments, the determining a subset of tests included in the selected set may be performed and/or facilitated by utilizing the hypothesis tester 154, the analysis engine 239, the learning engine 226, the controller 224, the first user device 102, the second user device 111, the server 140, the server 150, the server 160, the communications network 135, the knowledge engine, by utilizing any other appropriate program, network, system, or device, or any combination thereof.

In certain embodiments, any number of hypothesis tests included in the selected set may be determined to be in the selected subset; where a hypothesis test may be an enumerated hypothesis test, a partially determined hypothesis test, or a fully determined concrete and executable hypothesis test; where a hypothesis test may be abstractly described, may be concretely described, or any combination thereof, in full or in part; where the determining may include the selecting of a hypothesis test for inclusion in the selected subset; and, where the determining may include the determining of a concrete and/or executable hypothesis test, in full or in part, from an abstract hypothesis test, from a partially determined concrete hypothesis test, or from a fully determined executable concrete hypothesis test (e.g. in the case of a modification to an existing, fully determined concrete hypothesis test). In certain embodiments, none of the hypothesis tests for a selected set may be determined to be in the selected subset, in which case, the selected subset may be an empty subset. In certain other embodiments, all of the tests in the selected set may be selected for execution. As an example of this, each of tests 1-11 of set 1 in FIG. 7 may be selected for execution. In certain embodiments, all of these tests may be selected for execution because they each focus on a particular test strategy for each subfield. As a further example, only a subset of the tests in the selected set may be selected for execution. As an example of this, only tests 1, 3, and 8 in the set 1 in FIG. 7 may be selected for execution. In certain embodiments, these tests may be selected for execution because they each leave a particular subfield blank (i.e., null) and they each are expected to pass. Because of this, in certain embodiments, if each of tests 1, 3, and 8 fail (despite being expected to pass), the method 900 may determine that none of the subfields may be left blank. Based on this, method 900 may skip the remaining tests in set 1, in certain embodiments. Alternatively, even if each of tests 1, 3, and 8 fail (despite being expected to pass), the method 900 may continue testing the remaining tests in set 1 so as to further confirm that none of the subfields may be left blank. Similarly, the method 900 may update a constraint with regard to leaving the field blank or the method 900 may request human user assistance. In another example, if one test, more than one test, or all tests in set 1 fail, method 900 may determine that none of the tests in sets 2, 3, 4, 5, 6, 7, or 8 will likely pass, or method 900 may determine that the marginal value of executing additional hypothesis tests does not justify the marginal cost of executing additional hypothesis tests. Based on this, the determined subsets for sets 2, 3, 4, 5, 6, 7, and 8 may be empty.

In certain embodiments, the number of tests from a selected set determined for a subset may be based on the hypothesis optimization strategies 800. For example, the number of tests that are selected for execution may be based on the sorting strategy 802, the ordering strategy 803, the static hypothesis testing strategy 804, the pooling strategy 805, the observation strategy 806, the field history strategy 807, the test value strategy 808, the runtime/locality strategy 809, the parallelism strategy 810, the intelligent sampling strategy 811, the constraint ratiocination strategy 812, the discovery as testing strategy 813, the limited or special resources strategy 814, the synergy strategy 815, any other strategy, or any combination thereof. As an example of this, if the hypothesis tests were sorted into the selected set based on the sorting strategy 802, the number of tests in the selected set that are selected for execution may also be based on the sorting strategy 802. As another example, if the hypothesis tests were sorted into the selected set based on the sorting strategy 802, but were then also ordered based on the test value strategy 808, only the highest ranked tests may be selected for execution. In such an example, the remaining tests may be retained in the selected set such that they may be later included in the selected subset if the conditions or inputs to a hypothesis optimization strategy change.

In certain embodiments, the determining a subset of tests included in the selected set may be performed once or may be performed more than once. Where the determining is performed more than once, the determining may occur periodically, as a result of a test result or test results, in response to changing system resources and/or costs, in response to new and/or modified goals, in response to a new or modified enumeration of desired tests, in response to a new or modified sorting or classifying of enumerated tests, in response to the selection of a new or modified set for testing, in response to a decision to modify the subset in step 926, in response to the receipt and/or availability of new or modified information, or any combination thereof.

At step 912, the method 900 may include determining the next test from the selected subset. In certain embodiments, the determining may be simply selecting the first item in the selected subset, the last item in the selected subset, an item in the selected subset according to an ordering procedure, an only item in a list, or any other manner of selecting the next test. In certain embodiments, the determining of the next test may be based on the hypothesis optimization strategies 800. For example, the determining of the next test may be based on the sorting strategy 802, the ordering strategy 803, the static hypothesis testing strategy 804, the pooling strategy 805, the observation strategy 806, the field history strategy 807, the test value strategy 808, the runtime/locality strategy 809, the parallelism strategy 810, the intelligent sampling strategy 811, the constraint ratiocination strategy 812, the discovery as testing strategy 813, the limited or special resources strategy 814, the synergy strategy 815, any other strategy, or any combination thereof. In certain embodiments, the valuation or prioritization of hypothesis tests within a selected subset may be performed as part of step 910, as part of step 912, or any combination thereof, in full or in part. In certain embodiments, the same or similar procedures as defined for the determining of a subset of tests from the selected set (as with step 910), may be performed in the determining of the next test from the selected subset (in step 912). In certain embodiments, the determining of the next test from the selected subset may be performed and/or facilitated by utilizing the hypothesis tester 154, the analysis engine 239, the learning engine 226, the controller 224, the first user device 102, the second user device 111, the server 140, the server 150, the server 160, the communications network 135, by utilizing any other appropriate program, network, system, or device, or any combination thereof.

In certain embodiments, one or more tests may be determined from the selected subset in series or in parallel, where the number of tests determined in series or in parallel may be based upon the content of the selected subset, available resources, estimated or actual resource usage requirements of the one or more tests, method 900 goals, other queue management strategy, or any combination thereof. In certain embodiments, a next test selected (e.g., where selecting is an example of determining) from the selected subset may be an enumerated hypothesis test, a partially determined hypothesis test, or a fully determined executable concrete hypothesis test. In certain embodiments, where a hypothesis test may be abstractly described, may be concretely described, or any combination thereof, in full or in part, the determining may include the determining of a concrete and/or executable hypothesis test, in full or in part, from an abstract hypothesis test, from a partially determined concrete hypothesis test, or from a fully determined and/or executable concrete hypothesis test (e.g., in the case of a modification to an existing, fully determined concrete hypothesis test). In certain embodiments, none of the tests within the selected subset may be determined to be the next test, in which case the processing may skip to step 916 or step 918.

At step 914, the method 900 may include executing the test. In certain embodiments, the executing may be performed and/or facilitated by utilizing the hypothesis tester 154, the analysis engine 239, the learning engine 226, the controller 224, the first user device 102, the second user device 111, the server 140, the server 150, the server 160, the communications network 135, by utilizing any other appropriate program, network, system, or device, or any combination thereof. In certain embodiments, the execution of the test in step 914 may be an example of (and may be similar to) the testing discussed in step 610 of FIG. 6. As such, when method 900 is a sub-process of FIG. 6, step 914 of method 900 may be at least a portion of the testing performed in step 610 of FIG. 6. In certain embodiments, the execution of the test may be performed by inputting the test values for each test into the input fields (or subfields) of the application under evaluation 230 so as to test existing or desired constraints on fields of the application under evaluation 230, the order of operations to be conducted within the application under evaluation 230, and/or functional transitions between various states of the application under evaluation 230. In certain embodiments, the execution of the test may involve inputting the test values and/or taking actions on the application under evaluation 230 so as to navigate the application under evaluation to a state where the constraint and/or field, order of operations, and/or functional transitions associated with the hypothesis test may be tested.

At step 916, the method 900 may include determining the test results. In certain embodiments, the determining may include comparing the results of the executed tests to the expected results of the tests, and evaluating whether the results of the executed test match the expected results. For example, as is discussed above with regard to FIG. 7, each test may have an expected result (e.g., "pass" or "fail"). In certain embodiments, this expected result (e.g., "pass" or "fail") may be compared to the actual results of the executed test (e.g., "pass" or "fail") to determine whether they match. The results may match when both the actual result and the expected result are the same (e.g., both are "pass" or both are "fail"), in certain embodiments. Additionally, the results may not match when the actual result is different from the expected result (e.g., one is "pass" and the other is "fail"). In certain embodiments, the determining may include analyzing feedback to determine if more tests should be constructed, as may be decided by step 920 and/or step 922, or if more tests should be executed as may be decided by step 924 and/or step 926, where the deciding may utilize the test results, at least in part. In certain embodiments, the determining the test results may be performed and/or facilitated by utilizing the hypothesis tester 154, the analysis engine 239, the learning engine 226, the controller 224, the first user device 102, the second user device 111, the server 140, the server 150, the server 160, the communications network 135, by utilizing any other appropriate program, network, system, or device, or any combination thereof.

In certain embodiments, a test result may be a new, modified, generalized, merged, or removed constraint and/or hypothesis, and the determining of the test result may include the generation, modification, generalization, merging, or removal of the constraint and/or hypothesis. In certain embodiments, the modification of a constraint and/or hypothesis may be the modification of a confidence or confidences associated with the constraint and/or hypothesis. In certain embodiments, a test result may include new, modified, merged, or removed agglomerate model(s), and/or the test result may include the generation, modification, and/or removal of parameter(s), constraint(s), association(s), link(s), or other information associated with an internal data source 201, an external data source 202, an agglomerate model 218, an executor/evaluator 220 (e.g., the modifying a parameter associated with an explorer), the application under evaluation 230, the learning engine 226, the controller 224, or any combination thereof. In certain embodiments the test result may include feedback 614 or may be included in feedback. In certain embodiments, the determining of test results may include the transforming 232 of test results into a test result output 246, test data 247, reports 242, analyses 243, other output, or any combination thereof.

At step 918, the method 900 may include determining whether the current testing process has been completed. In certain embodiments, the current testing process may be determined to have been completed when method 900 has conducted testing on all of the sets of tests (as established in step 906). That is, the current testing process may be determined to have been completed when method 900 has executed a subset of tests included in each of the sets established in step 906. In certain embodiments, the current testing process may alternatively be determined to have been completed when method 900 has purposely skipped all of the remaining sets of tests (e.g., skipped them in accordance with a particular testing strategy). In certain embodiments, the current testing process may be determined to not have been completed when there are additional set of tests that still need to be tested.

If the current testing process is determined to not have been completed, method 900 may, in certain embodiments, proceed through one or more decision steps, such as step 920, step 922, step 924, step 926, or any combination thereof, where one or more decision steps may be omitted. For example, in certain embodiments, if at step 918, it is determined that the current testing process has not been completed, the method 900 may proceed to step 920 where it may be determined if the goals have changed. This determination may be made in any manner. In certain embodiments, method 900 may also (or alternatively) determine whether other changes have occurred at step 920. For example, in certain embodiments, the method 900 may determine (at step 920) whether a portion of the application under evaluation 230 has been changed and/or updated. The determination may be made in any manner. For example, the method 900 may determine whether a particular field (or subfield) in the application has been changed recently, whether the order of operations and/or transition of the application has been changed recently, whether the program code for all or a portion of the application has been changed recently, whether any other change has occurred recently, or any combination of the preceding. As another example, the method 900 may determine (at step 920) whether web pages, states, transitions, widgets fields, and/or constraints have been changed recently. To make such a determination, the method 900 may compare these web pages, states, transitions, widgets fields, and/or constraints to previous versions of the application under evaluation 230, and/or to previous versions of the agglomerated models. In certain embodiments, the method 900 may determine (at step 920) whether internal data sources 201, external data sources 202, an agglomerate model 208 (or portion thereof), or a combination thereof has been changed and/or updated. This determination may also be made in any manner. For example, the field or program code may be compared to that included in a previous version of the application, as may be represented in an agglomerate model 208. As another example, web pages, states, transitions, widgets fields, and/or constraints may be compared to previous versions of the application under evaluation 230, and/or to previous versions of the agglomerated models.

In certain embodiments, the method 900 may determine (at step 920) whether the minimum threshold of computer resources needed for the testing process are currently available, whether the minimum threshold of time needed for the testing process is currently available, whether the cost of continued testing is worth the value, whether the cost of testing is below a threshold (e.g., maximum threshold), any other reason for continuing or skipping testing, or any combination thereof, in whole or in part. This determination may be made in any manner. For example, the method 900 may check the current and future usage of resources in system 100, or may check for any time constraints provided on the testing process. Although these determinations are discussed with regard to step 920, any or all steps in method 900 (e.g., steps 906, 908, 910, 912, 914, any other step, or any combination thereof), may include determining if the system should continue, considering resources, costs, goals, or other testing or operational rationale, in a similar manner. In certain embodiments, the method 900 may include executing all hypothesis tests if sufficient resources are available, and/or if the value of executing the tests exceeds the costs. That is, the number of hypothesis test may not be simplified or reduced. Instead, method 900 may execute all of the hypothesis tests. This execution of the hypothesis tests may be performed as is discussed in step 610 of FIG. 6 and/or as is discussed in step 914 of FIG. 9. In certain embodiments, the method 900 may include executing more (but not all) of the hypothesis tests if sufficient resources are available, and/or if the value of executing the tests exceeds the costs. For example, if ample resources are available, a larger subset of tests may be selected at step 910, but still less than the full set of hypothesis tests. Alternatively, if there are minimal resources, a minimal subset may be selected. Additionally, a sliding scale of the size of the subset may be selected, where the subset is proportionally based on the amount of resources.

At step 920, if it is determined that the goals have changed (or that other information has changed, as is discussed above), method 900 may proceed back to step 902, where the new goals are determined (and/or the new information is determined). If they have not changed, method 900 may proceed to step 922 where it may be determined whether the enumerated tests should be modified. If the enumerated tests should be modified, method 900 may proceed back to step 904 where method 900 enumerates desired hypothesis tests. Alternatively, if the enumerated tests should not be modified, method 900 may proceed to step 924 where it may be determined whether a different set should be selected. If a different set should be selected, method 900 may proceed back to step 908 where method 900 selects a set for testing. Alternatively, if a different set should not be selected, method 900 may proceed to step 926 where it is determined whether a different subset should be selected. If a different subset should be selected, method 900 may proceed back to step 910 where method 900 determines a subset of tests included in the selected set. Alternatively, if a different subset should not be selected, method 900 may proceed back to step 912 where method 900 determines the next test from the selected subset. As such, in certain embodiments, steps 902-926 may be repeated until there are no more sets to test, or until all of the remaining tests and/or set(s) have been purposely skipped.

In certain embodiments, any or all of the determinations made in steps 918, 920, 922, 924, or 926 of method 900 may be based on the hypothesis optimization strategies 800, such as, for example, the sorting strategy 802, the ordering strategy 803, the static hypothesis testing strategy 804, the pooling strategy 805, the observation strategy 806, the field history strategy 807, the test value strategy 808, the runtime/locality strategy 809, the parallelism strategy 810, the intelligent sampling strategy 811, the constraint ratiocination strategy 812, the discovery as testing strategy 813, the limited or special resources strategy 814, the synergy strategy 815, any other strategy, or any combination thereof. In certain embodiments, any or all of the determinations made in steps 918, 920, 922, 924, or 926 of method 900 may be performed and/or facilitated by utilizing the hypothesis tester 154, the analysis engine 239, the learning engine 226, the controller 224, the first user device 102, the second user device 111, the server 140, the server 150, the server 160, the communications network 135, by utilizing any other appropriate program, network, system, or device, or any combination thereof.

Returning to step 918, if the method 900 determines that the current testing process has been completed, the method 900 may proceed to step 928. At step 928, the method 900 may include optionally outputting the test results. In certain embodiments, the output of test results may include, an output of defects identified and reports, optimization results and reports, performance output and reports, lists of confidence adjustments and/or correlations, updates to any model, updates to the agglomerated models 208, requests for more/less system resources, any other type of output, or any combination thereof. In certain embodiments, the outputting of the test results may include analyzing the results of the executed tests. For example, when method 900 is a sub-process of FIG. 6, the output of test results (at step 928) may cause system 100 to proceed to step 612 of FIG. 6, where the test results of the hypothesis testing are analyzed. System 100 may then proceed through the remaining steps of FIG. 6. As such, method 900 of FIG. 9 may have been utilized as a sub-process of FIG. 6, allowing the generated hypothesis tests to be simplified and/or reduced prior to them being analyzed in FIG. 6. In certain embodiments, method 900 may not be a sub-process of FIG. 6. Instead, method 900 may be utilized to simplify and/or reduce any other hypothesis tests. In certain embodiments, the output of the testing results may be performed and/or facilitated by utilizing the hypothesis tester 154, the analysis engine 239, the learning engine 226, data transformer(s) 232, the controller 224, the first user device 102, the second user device 111, the server 140, the server 150, the server 160, the communications network 135, by utilizing any other appropriate program, network, system, or device, or any combination thereof.

At step 930, method 900 may include updating system operations parameters based on test feedback. Test feedback may include: feedback relating to a test report, or any aspect of a test report; information concerning application under evaluation operations and/or defects discovered (or not discovered) during said operations; updates to agglomerate model(s); learning feedback; new or modified goals; new or updated parameters; new or updated constraints, new or updated hypotheses, new or updated tests, new or updated confidences, other feedback, or any combination thereof, in whole or in part. In certain embodiments, the feedback may be fed to the learning engine 226 for further processing. In certain embodiments, the learning engine 226 may adjust the value associated with a test or tests; the cost of executing a test or tests; information concerning the availability of resources; the confidence levels or parameters for a hypothesis test, a strategy, a set, a subset, a constraint; confidences or parameters utilized within the application under evaluation 230; other confidences or parameters; or any combination thereof, that the learning engine 226 is already familiar with or has access to, where the feedback may indicate support (or the lack thereof) for the information, value, cost, confidence value, parameter, or any combination thereof. For example, if the feedback indicates that defects were found during operations of the application under evaluation 230 for which a fraction of the full enumerated set of tests were performed according to a strategy 800, the learning engine 226 may adjust the value of certain tests, the costs associated with certain tests, parameters of a strategy or strategies, the priority of a strategy or strategies, or other parameter associated with the application of a strategy or strategies, such that future applications of method 900 may select a higher proportion of hypothesis tests, enumerate additional or modified hypothesis tests, choose different hypothesis tests, or other modification to the application of one or more hypothesis testing strategies 800, to reduce the likelihood that defects are missed in the application of method 900.

As is discussed above, in certain embodiments, performance of the method 900 may result in skipping of all or some of the remaining unexecuted tests included in the selected set(s). For example, if the selected set includes 15 tests and only 5 of those tests were determined for a subset at step 910, then determined as the next test at step 912, and then executed at step 914, the remaining 10 tests may be skipped. In certain embodiments, skipping may be determined in one or more steps, including, for example: step 918, which may determine that testing is complete and all remaining unexecuted tests should be skipped; step 920 and/or step 902, which may determine that the method 900 goals have changed in a manner that may cause the remaining unexecuted steps to be skipped, modified so as to effect skipping, or removed so as to effect skipping; step 922 and/or step 904, which may cause the enumerated tests to change such that the remaining unexecuted steps are skipped, so as to effect skipping, or removed so as to effect skipping; step 906, which may cause the remaining unexecuted tests to be resorted/reclassified into sets which may be themselves skipped; step 924 and/or step 908, which may select a new set, thus skipping the remaining unexecuted tests in the selected set(s); step 926 and/or step 910, which may determine a new subset that does not include some or all of the remaining unexecuted tests included in the selected set(s); step 912, which may determine the next test, and in performing the determining, may decide to skip some or all of the remaining unexecuted tests in the selected subset of the selected set; or a combination thereof, in whole or in part. The skipping of unexecuted tests may allow method 900 to perform the testing process in less time (as it does not require testing of all of the enumerated tests). In certain embodiments, skipping the remaining unexecuted tests included in the selected set may not require system 100 to permanently skip these remaining tests. Instead, in certain embodiments, these remaining tests may only be skipped for a particular testing process. In subsequent testing processes, method 900 may select one or more of these remaining tests for execution, while the subset that was already tested may be skipped. In certain embodiments, this may allow system 100 to iteratively (or in parallel) proceed to execute all of the tests in the selected set(s), without requiring all of the tests to be executed in the same testing process (or testing run).

In certain embodiments, optimizing the hypothesis tests may cause the hypothesis tests to be simplified and/or reduced. For example, it may cause the number of hypothesis tests for testing to be reduced. As an example of this, and as is seen in FIG. 7, the number of hypothesis tests for testing may be reduced from 36 tests down to potentially only 18 tests. Furthermore, in certain embodiments, because the hypothesis tests are simplified and/or reduced using hypothesis optimization strategies 800 (e.g., the duplicate strategy 801, the sorting strategy 802, the ordering strategy 803, the static hypothesis testing strategy 804, the pooling strategy 805, the observation strategy 806, the field history strategy 807, the test value strategy 808, the runtime/locality strategy 809, the parallelism strategy 810, the intelligent sampling strategy 811, the constraint ratiocination strategy 812, the discovery as testing strategy 813, the limited or special resources strategy 814, the synergy strategy 815, or any combination thereof), the simplification and/or reduction may be performed in an intelligent manner that, in certain embodiments, does not reduce the quality of the testing process (or does not substantially reduce the quality of the testing process). As such, in certain embodiments, the hypothesis tests shown in FIG. 7 may be reduced in half (e.g., reduced from 36 tests to potentially 18 tests) without reducing the quality of the testing process (or without substantially reducing the quality of the testing process). This may, in certain embodiments, reduce the time required for testing of an application under evaluation 230 and/or may reduce the number of resources in system 100 required for testing the application under evaluation 230. Accordingly, in certain embodiments, it may optimize system resources and runtime during a testing procedure.

One or more modifications, additions, and/or subtractions may be made to method 900 of FIG. 9 without departing from the scope of this disclosure. For example, in at least one embodiment, the hypothesis test(s), once enumerated in step 904, may not be placed into a group or set, or may be placed into a trivial single group or set. In such an embodiment, the steps 906, 908, and 910 (or similar functionality) may not be present in method 900. Instead, the method 900 may skip to step 912 to determine the next test from the available tests without necessarily having a subset. In certain embodiments, the steps 904 and 912 may be functionally merged or combined without steps 906, 908, and 910. In such an embodiment, in step 912, the system may determine a next test to run. The next test to run may be picked with some amount of ranking, preference, or optimization over another test. In the simplest ranking or preference, it may be based on the time the test was created (first in first out). The ranking, preference, or optimization may appear as metadata associated with the tests, and may not be explicitly called out in a sorting or classifying step. Such an embodiment may take full advantage of the intelligence and real time decision making based on the goals in step 902 or enumerations in step 904 (whereas steps 908 and 910 having to do with sets may not apply). Such an embodiment is able to output results 928, and update system operations parameters based on test feedback 930.

Figure 10:
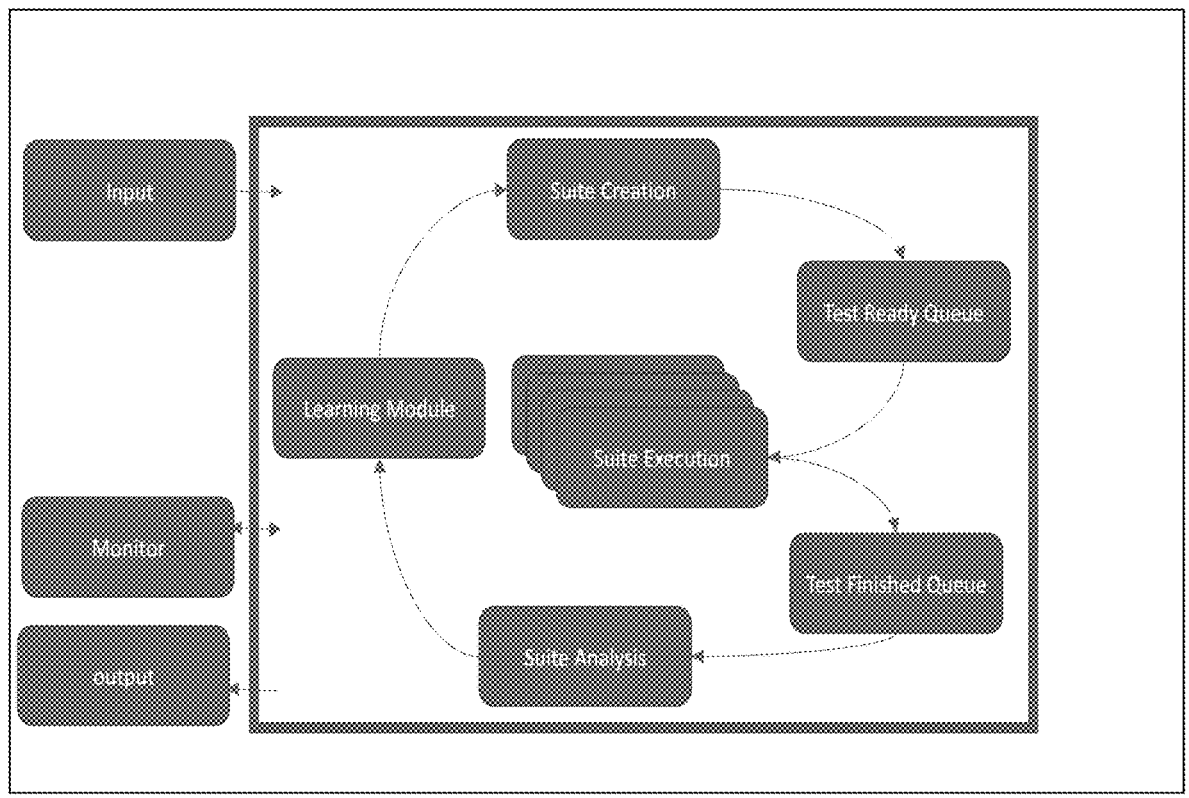
FIG. 10 illustrates one example of a process flow and the flow of data during an example testing procedure according to an embodiment of the present disclosure.

FIG. 10 illustrates one example of the flow of data during an example testing procedure. As illustrated, FIG. 10 includes an input, suite creation module, a suite execution module, a suite analysis module, a learning module, a monitor, and an output. In certain embodiments, the input may result from the discovery of an application under evaluation 230, as may be performed by static model discovery 200, dynamic model discovery 206, explorers 223, validators 222, discovery 304, or any combination thereof.

In certain embodiments, a common flow of data as illustrated in FIG. 10 may be utilized for discovery of an application under evaluation 230, for exploration of an application under evaluation 230 for testing and/or validation of an application under evaluation 230, testing of an application under evaluation 230, or a combination thereof. In certain embodiments, such as embodiments using the discovery as testing strategy 813, discovery exploration results may be used as hypothesis testing results, interchangeably or in part. In certain embodiments, the input may be a more general system with test suites to optimize. In certain embodiments, other inputs may be one or more of the agglomerated models 208 which may be used in conjunction with test suites to aid in optimization. In certain embodiments, other inputs may be additional system resources.

In certain embodiments, hypothesis tests may be generated and optimized at the suite creation module. For example, after receiving knowledge about the application under evaluation 230 from discovery (e.g., input on FIG. 10), agglomerate models 208 (e.g., input on FIG. 10), suite analysis results, and/or a learning module information, the suite creation module may generate a suite of hypothesis tests (where a suite of tests may contain any number of tests), and the suite creation module may then optionally optimize the suite of tests. The suite of hypothesis tests or the optimized suite of hypothesis tests may be placed in a test ready queue, as is seen in FIG. 10. Alternatively, the optimization of a test suite may be performed, in whole or in part, within the suite creation module, the test ready queue, the suite execution module, or any combination thereof.

In certain embodiments, the suite execution module may be responsible for consuming tests from the test ready queue, executing the tests, and placing results and observations onto the test finished queue. In certain embodiments, certain optimizations of the hypothesis test (e.g., in accordance with FIG. 9) may take place in the suite execution module, such as runtime, parallelism, sampling, etc. The suite execution module may be a set of parallel executors, in certain embodiments. In certain embodiments, the degree of parallelism (number of executers) can be easily and dynamically altered to accommodate any changes in the incoming workflow, changes in the results of prior executed tests, changes in the availability or lack thereof of system resources, changes in the cost of prior executed tests, changes in the anticipated future cost of testing, changes in the estimated cost/benefit of performing a test or tests, changes in availability of assets to cover the costs of testing, changes in the testing goals or objectives, or any combination thereof. In certain embodiments, feedback resulting from the execution of a test, tests, or suite of tests may be placed on the test finished queue.

In certain embodiments, the suite analysis module may process test results, extract pieces of knowledge, generalize knowledge (e.g., add new constraints, modify constraints, merge constraints, and/or remove constraints), produce knowledge onto the learning module, and/or produce an output including and/or regarding the test results. In certain embodiments, the output may include modifications to external information, documents, models (e.g., agglomerate models 208), or any combination thereof. In certain embodiments, the output may include information which is incorporated into one or more outputs 240 by a system internal or external to the system 100, in part or in total. In certain embodiments, confidence levels may be updated for various tests, test hypotheses, constraints, confidences associated with a learning process, or any combination thereof. In certain embodiments, certain optimizations of the hypothesis test (e.g., in accordance with FIG. 9) may take place in the suite analysis module such as test value, pooling adjustments, sampling adjustments, etc.

The learning module (e.g., learning engine 226) may learn about and/or guide optimizations for the hypothesis tests, including optimizations based on historical behaviors. In certain embodiments, the learning module may make correlations between tests, test sources, agglomerated models 208, system performance, hypotheses, constraints, fields, labels, alerts or errors, or other widgets, states or transitions, internal or external documents, histories, etc., or any combination thereof. In certain embodiments, the learning module may make adjustments in confidence level based on the results of the hypothesis testing. In certain embodiments, the learning module may modify parameters, algorithms, models, dictionaries, weights, confidences, or other attributes associated with the discovery and/or validation (e.g., testing) of an application under evaluation 230. In certain embodiments, it may link to other portions of the application under evaluation 230 and/or system 100.

In certain embodiments, the monitor may monitor resource usage (e.g., CPU, Memory, Disk, Network, etc.) of one or more systems. In certain embodiments, these monitored systems may include the application under evaluation 230, the system 100, the test system, the optimization system, any other system, or any combination thereof. These monitored system resources may be physical and/or virtual. In certain embodiments, the monitor may monitor the resource costs (e.g., cost of virtual machine usage in a cloud environment including virtual CPU, virtual memory, virtual networks, or costs of physical machines). Costs may be associated with renting hardware or with owned hardware.

In certain embodiments, the outputs of the system may include testing results, defects identified and defect report, optimization results and reports, performance output and reports, lists of confidence adjustments and/or correlations, updates to any model, updates to the agglomerated models 208, requests for more/less system resources, costs of more/less resources, any other type of output, or any combination thereof.

The systems and methods disclosed herein may include still further functionality and features. In certain embodiments, when parsing text from various sources, the text may be extracted from labels, widgets, web pages and window titles, help text, help videos, and/or any other accessible artifacts associated with the application under evaluation 230. In still other embodiments, the system 100 may perform lookups of terms that may be in other systems, such as, but not limited to, previously released applications under evaluation 230, accessible systems that are not under test by the system 100, online and/or internet sources, such as Wikipedia™, online journals, online domain knowledge, and other sources, such as, but not limited to, release notes, requirements, user stories, software and/or hardware manuals, API documents, etc. Notably, the systems and methods may be implemented in the environment as shown in FIG. 2 and in U.S. Patent Application Ser. No. 15,905,362, filed on Feb. 26, 2018. For example, the functionality provided by the system 100, the method 600, and/or the method 900 may be implemented as part of either or both of the static model discovery module 200 and/or the dynamic model discovery module 206. In certain embodiments, the system 100, the method 600, and/or the method 900 may include receiving text or other content from internal data sources 201, external data sources 202, and/or the application under evaluation 230. In further embodiments, the system 100, the method 600, and/or the method 900 may include receiving text or other content from any of the agglomerated models 208. The text or other content may be standalone in a document, contained within a table, contained within a picture (which may need optical character recognition (OCR) to read), contained within a subset of a larger document, and/or any other such configuration. In certain embodiments, the system 100, the method 600, and/or the method 900 may include updating, constructing, modifying, and/or storing constraints in any of the agglomerated models 208 with results and/or information accomplished by the system 100, the method 600, and/or the method 900, such as, but not limited to, the CM model 216, the LM model 215, the FSM model 209, ER-DB model 211, and/or any other model. In certain embodiments, the agglomerated models 208 may include portions of the knowledge sources (e.g. contained in knowledge engine 153 and/or elsewhere).

In certain embodiments, an analysis engine 239 and/or composer 221 may take one model of the agglomerated models 208, such as FSM model 209 or ER-DB 211, which contains one or more constraints, and may construct hypothesis test cases (e.g. which may be scripts composed of computer code 244). In certain embodiments, the system 100 may operate in one or more analysis engines 239 or 220 executers/evaluators. Then, the hypothesized test cases may execute (such as by utilizing validator 222), and produce test results 246, test data 247, feedback 614, suggested constraints 614, hypotheses 614, suggested constraints 306 to 304, improved constraints 306 to 304, or a combination thereof. In certain embodiments, the test results 246 and/or test data 247 may include feedback. In certain embodiments, the hypothesized test cases may execute and result in the removal of an existing constraint or hypothesis. Based on the test results 246 and test data 247, data transformers 232 may generate outputs 240, where a data transformer may be, but is not limited to, a report generator 238, and where the output may be, but is not limited to, test results 246 and/or test data. Based on the test results 246 and test data 247, report generator 238 may generate hypothesis test case result reports 242. Further, learning engine 226 may adjust confidences of hypothesized tests and results based on the results 246. Learning engine 226 may also store confidences and other items learned into a knowledge source, such as any of the agglomerated models 208. Such knowledge may be used to improve discovery of future constraints, alter or improve test hypothesis execution, or better understand any of agglomerated models 208, which may then be used to ultimately better understand the application under evaluation 230 and/or or internal and/or external data sources 201, 202. In still further embodiments, the learning engine 226 may utilize the results of the system 100, the method 600, and/or the method 900 alone or in combination with the agglomerated models 208 to determine patterns, histories, probabilities, confidences, and other information associated with constraints, fields, orders of operations, and/or transitions within an application under evaluation 230. In certain embodiments, the learning engine 226 may be configured to provide guidance regarding which constraints are most suitable for a particular application under evaluation 230, agglomerated model 208, and/or other component provided in FIGS. 1 and 2.

The systems and methods disclosed herein may include further functionality and features. For example, the operative functions of the system 100, the method 600, and/or the method 900 may be configured to execute on a special-purpose processor specifically configured to carry out the operations provided by the system 100, the method 600, and/or the method 900. Notably, the operative features and functionality provided by the system 100, the method 600, and/or the method 900 may increase the efficiency of computing devices that are being utilized to facilitate the functionality provided by the system 100, the method 600, and/or the method 900. For example, the system 100, the method 600, and/or the method 900 can optimize the performance of future actions through machine learning, such that a reduced amount of computer operations need to be performed by the devices in the system 100 using the processors and memories of the system 100 than in systems that are not capable of machine learning as described in this disclosure. In such a context, less processing power may need to be utilized because the processors and memories do not need to perform actions, operations, and analyses that have already been conducted by the system 100. In certain embodiments, the system 100 may learn that certain state(s) associated with and/or from discovery and/or testing may be faster on certain processing hardware. For example, for a state with complex mathematical operations and/or graphics, the system 100 may perform better when there is a floating point processor or a graphics processing unit. As another example, when compared to traditional part of speech solutions, the discovery of field, navigation, and/or order of operation constraints reduces computing costs, as measured by central processing unit (CPU) cycles, memory usage, and network bandwidth. In certain embodiments, the system 100 accomplishes such reductions in computing costs by learning over time which constraints should be utilized with which input fields, order of operations, and/or transitions for applications being evaluated by the system 100, refining the constraints as new information is received by the system 100, learning which hypotheses and/or tests are more efficient and/or superior to other hypotheses and/or tests, learning which sources of knowledge and information produce higher confidence level constraints and/or constraints relevant to an application under evaluation 230, any other learning, or any combination thereof. As a result, the functionality provided by the system 100, the method 600, and/or the method 900 may provide substantial savings in the usage of computer resources by utilizing the software and functionality provided in the present disclosure.

Notably, in certain embodiments, various functions and features of the system 100 and methods may operate without human intervention and may be conducted entirely by computing devices, robots, programs, and/or processes. For example, in certain embodiments, multiple computing devices may interact with devices of the system 100 to provide the functionality supported by the system 100. Additionally, in certain embodiments, system 100 may operate continuously to reduce the possibility of defects, conflicts, and/or errors from being introduced into the system 100 and/or the application under evaluation 230. In certain embodiments, the system 100 and methods may also provide effective computing resource management by utilizing the features and functions described in the present disclosure. For example, in certain embodiments, the system 100 may specify a quantity and/or cost of computer processor resources (e.g. processor clock cycles, processor speed, processor cache, etc.) that may be dedicated to parsing text extracted from outputs of the application under evaluation 230; parsing text extracted from hierarchical and/or graphical models of applications (e.g. application under evaluation 230); parsing text extracted from internal and/or external sources 201, 202; correlating the parsed text and/or sources of the text with one or more input fields, an order of operations, and/or transition of an application under evaluation 230; generating suggested constraints; determining if the constraint can be combined or merged with another constraint; conducting hypothesis testing using the suggested constraints; determining if a constraint is valid; generating feedback based on test results from the hypothesis testing; updating confidence levels for hypotheses, tests, sources of information, and/or suggested constraints; and performing any other operations conducted by the system 100, or any combination thereof. As another example, the system 100 may indicate a quantity of processor cycles of a processor that may be utilized to obtain data, process obtained data, and/or specify a selected amount of processing power that may be dedicated to evaluating the application under evaluation 230 or conducting the static and dynamic model discovery.

In certain embodiments, any device or program in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100, the method 600, and/or the method 900 at time periods when usage of processing resources and/or memory resources in the system 100 is at a selected and/or threshold value. In certain embodiments, the system 100 and methods may include transmitting signals to the memory devices utilized in the system 100, which indicate which specific portions (e.g. memory sectors, etc.) of the memory should be utilized to store any of the data utilized or generated by the system 100. For example, a signal may be transmitted to the memory devices indicating which portions of the memories should be dedicated to generating suggested constraints, conducting hypothesis testing, analyzing test results of the hypothesis testing, determining source concepts from parsed text, analyzing graphical and/or hierarchical models of various applications (e.g. application under evaluation 230), utilizing natural language processing techniques to parse and extract meaning from text, generating hypotheses, generating tests for hypotheses and/or suggested constraints, processing feedback generated based on the tests results, providing updates for the agglomerated models 208, any other information stored by the system 100, or a combination thereof. Notably, the signals transmitted to the processors and memories may be utilized to optimize the usage of computing resources while executing the operations conducted by the system 100. As a result, such features provide substantial operational efficiencies and improvements over existing technologies.

Figure 11:
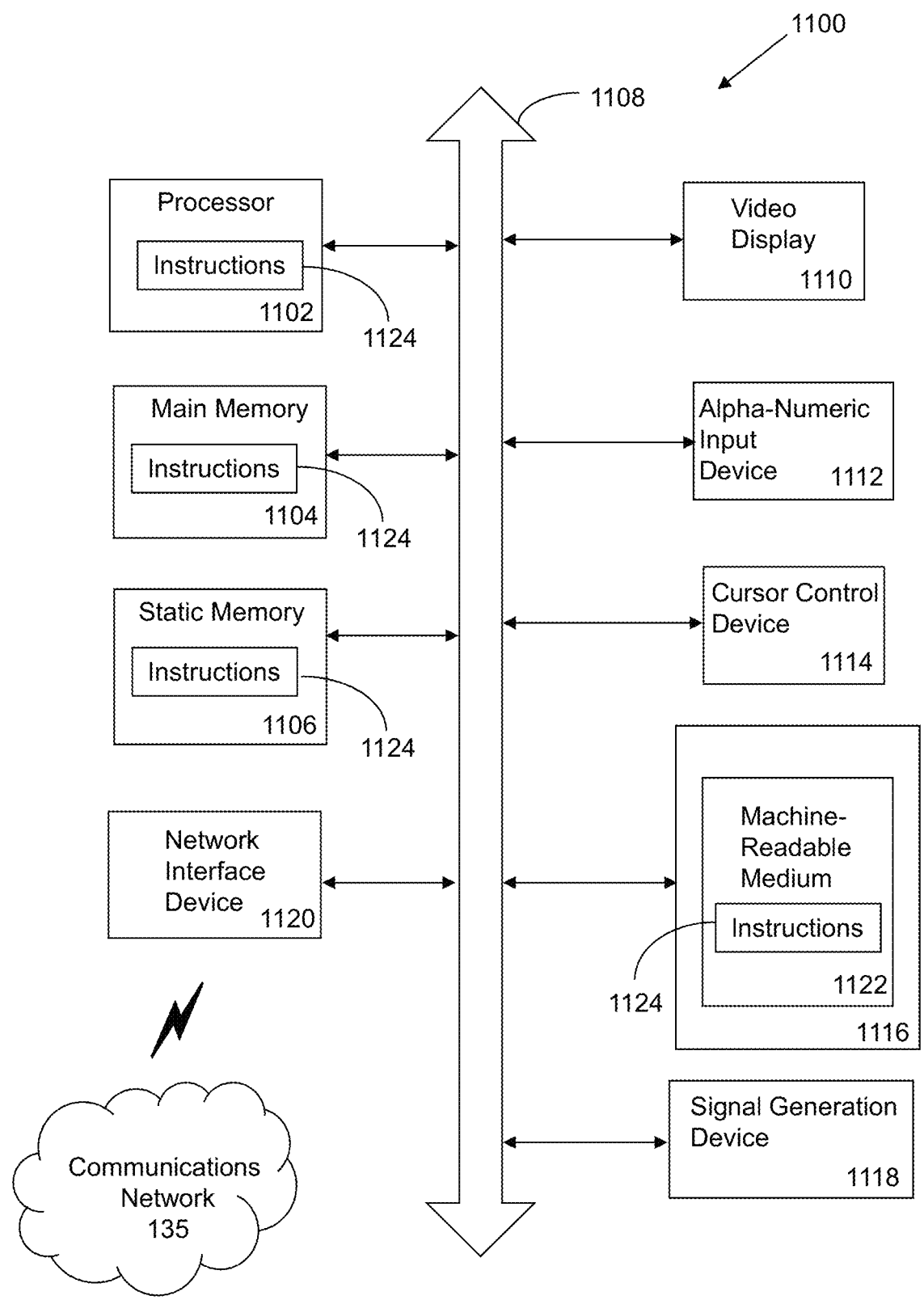
FIG. 11 is a schematic diagram of a machine in the form of a computer system within which a set of instructions, when executed, may cause the machine to perform any one or more of the methodologies or operations of the systems and methods for providing autonomous discovery of field or navigation constraints.

Referring now also to FIG. 11, at least a portion of the methodologies and techniques described with respect to the exemplary embodiments of the system 100 can incorporate a machine, such as, but not limited to, computer system 1100, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the server 140, the natural language processing engine 143, the part of speech tagger 144, the server 150, the knowledge engine 153, the hypothesis test 154, the constraint solver 155, the database 155, the server 160, or any combination thereof. The machine may assist with operations performed by the static model discovery module 200, the model change management module 204, the dynamic module discovery module 206, the controller 224, the learning engine 226, evaluators 220, the application under evaluation 230, the data transformers 232, any other component in the system, any programs in the system, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1100 may include a processor 1102 (e.g., a central processing unit (CPU), a graphics processing unit (GPU, or both), a main memory 1104 and a static memory 1106, which communicate with each other via a bus 1108. The computer system 1100 may further include a video display unit 1110, which may be, but is not limited to, a liquid crystal display (LCD), a flat panel, a solid state display, or a cathode ray tube (CRT). The computer system 1100 may include an input device 1112, such as, but not limited to, a keyboard, a cursor control device 1114, such as, but not limited to, a mouse, a disk drive unit 1116, a signal generation device 1118, such as, but not limited to, a speaker or remote control, and a network interface device 1120.

The disk drive unit 1116 may include a machine-readable medium 1122 on which is stored one or more sets of instructions 1124, such as, but not limited to, software embodying any one or more of the methodologies or functions described herein, including those methods illustrated above. The instructions 1124 may also reside, completely or at least partially, within the main memory 1104, the static memory 1106, or within the processor 1102, or a combination thereof, during execution thereof by the computer system 1100. The main memory 1104 and the processor 1102 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1122 containing instructions 1124 so that a device connected to the communications network 135, another network, or a combination thereof, can send or receive voice, video or data, and communicate over the communications network 135, another network, or a combination thereof, using the instructions. The instructions 1124 may further be transmitted or received over the communications network 135, another network, or a combination thereof, via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising: a memory that stores instructions; and a processor that executes the instructions to perform operations, the operations comprising: enumerating a plurality of hypothesis tests; sorting the enumerated hypothesis tests into a plurality of sets; selecting a set of the plurality of sets for testing; determining a subset from the selected set for testing; selecting a test from the subset for testing; executing the test on an application under evaluation, wherein the test has an expected result; obtaining a test result; and determining if testing is ready to be completed.

2. The system of claim 1, wherein the operations further comprise:
   repeating, based on test results, goals, conditions, or a combination thereof, the enumerating, the sorting, the selecting a set, the determining a subset, the selecting a test, the executing, the obtaining the test result, the determining if testing is ready to be completed, or a combination thereof, until testing is ready to be completed; and
   completing testing.

3. The system of claim 1, wherein the enumerating is based, at least in part, on goals.

4. The system of claim 1, wherein the enumerating a plurality of hypothesis tests comprises receiving the plurality of hypothesis tests, at least in part, from an external source.

5. The system of claim 1, wherein at least one hypothesis test includes at least one abstract step or abstract expectation, and wherein at least one abstract step or abstract expectation is converted to a concrete step or concrete expectation prior to executing a test determined from the hypothesis test.

6. The system of claim 1, wherein the sorting, in whole or in part, is performed on an as required basis, the determining a subset, in whole or in part, is performed on an as required basis, or a combination thereof.

7. The system of claim 1, wherein the selecting a set is performed two or more times, the determining a subset is performed two or more times, or a combination thereof.

8. The system of claim 1, wherein each of the hypothesis tests are for testing a hypothesis associated with a suggested constraint for the application under evaluation, wherein the suggested constraint is for a field of the application under evaluation, an order of operations of the application under evaluation, a transition of the application under evaluation, or a combination thereof.

9. The system of claim 1, wherein the operations further comprise:
analyzing the enumerated hypothesis tests to locate at least two hypothesis tests that are simple duplicates of each other in the enumerated hypothesis tests, to locate at least two hypothesis tests that are complex duplicates of each other in the enumerated hypothesis tests, or a combination thereof; and
removing all but one of the hypothesis tests that are simple duplicates of each other from the enumerated hypothesis tests, all but one of the hypothesis tests that are complex duplicates of each other from the enumerated hypothesis tests, or a combination thereof.

10. The system of claim 1, wherein sorting the enumerated hypothesis tests into a plurality of sets comprises sorting a first portion of the enumerated hypothesis tests into a first set based on a first test feature associated with each of the first portion of the enumerated hypothesis tests; and sorting a second portion of the enumerated hypothesis tests into a second set based on a second test feature associated with each of the second portion of the enumerated hypothesis tests.

11. The system of claim 1, wherein the operations further comprise training or improving a model, parameter, weight, dictionary, threshold, confidence, or filter associated with generating a future hypothesis; hypothesis test, test set, or test subset; hypothesis test, test set, or test subset exclusion; hypothesis test, test set, or test subset optimization; hypothesis test, test set, or test subset ordering; hypothesis test, test set, or test subset selection; or hypothesis test, test set, or test subset enumeration; wherein the training or improving is based on feedback, hypothesis test results, an internal document, an external document, the application under evaluation, the hypothesis, a similar hypothesis, a related hypothesis, a hypothesis test, a hypothesis abstract test, a hypothesis concrete test, a hypothesis test set, a hypothesis test subset, a hypothesis testing goal, a hypothesis testing enumeration, a hypothesis strategy, a hypothesis test ordering or classification, or any other source or combination thereof.

12. A method, comprising: enumerating, by utilizing instructions from a memory that are executed by a processor, a plurality of hypothesis tests; sorting the enumerated hypothesis tests into a plurality of sets; selecting a set of the plurality of sets for testing; determining a subset from the selected set for testing; selecting a test from the subset for testing; executing the test on an application under evaluation, wherein the test has an expected result; obtaining the test result; repeating, based on test results, goals, conditions, or a combination thereof, the enumerating, the sorting, the selecting a set, the determining a subset, the selecting a test, the executing, the obtaining a test result, or a combination thereof, until testing is ready to be completed; and completing testing.

13. The method of claim 12, wherein determining a subset from the selected set for testing comprises ordering the tests in the selected set based on test quality; and selecting only the ordered tests that have a respective test quality greater than a threshold.

14. The method of claim 12, wherein determining a subset from the selected set for testing comprises ordering the tests in the selected set based on test runtime; and selecting only the ordered tests that have a respective test runtime less than a threshold.

15. The method of claim 12, wherein determining a subset from the selected set for testing comprises ordering the tests in the selected set based on test cost; and selecting only the ordered tests that have a respective test cost less than a threshold.

16. The method of claim 12, wherein determining a subset from the selected set for testing comprises ordering the tests in the selected set based on confidence level; and selecting only the ordered tests that have a respective confidence level greater than a threshold.

17. The method of claim 12, wherein determining a subset from the selected set for testing comprises selecting only the tests in the selected set that have a positive expected result, or selecting only the tests in the selected set that have a negative expected result.

18. The method of claim 12, wherein determining a subset from the selected set for testing comprises analyzing the tests included in the selected set to determine a portion of the tests that test a field that has a historically positive result; and selecting one or more of the tests included in the determined portion of the tests.

19. The method of claim 12, wherein determining a subset from the selected set for testing comprises analyzing the tests included in the selected set to determine a portion of the tests that test a field that has a historically negative result; and selecting one or more of the tests included in the determined portion of the tests.

20. A non-transitory computer-readable device comprising instructions, which when loaded and executed by a processor, cause the processor to perform operations comprising: enumerating a plurality of hypothesis tests based on one or more goals; sorting the enumerated hypothesis tests into a plurality of sets; selecting a set of the plurality of sets for testing; determining a subset from the selected set for testing; selecting a test from the subset for testing; executing the test on an application under evaluation; obtaining the test result; determining if testing is ready to be completed; following a determination that the testing is not ready to be completed, repeating the enumerating, the sorting, the selecting a set, the determining a subset, the selecting a test, the executing, the obtaining a test result, the determining if testing is ready to be completed, or a combination thereof, until testing is ready to be completed; and completing testing.

21. The non-transitory computer-readable device of claim 20, wherein at least one hypothesis test and one executed test are the same.

22. The non-transitory computer-readable device of claim 20, wherein determining a subset from the selected set for testing comprises determining a historical test value for each of the tests included in the selected set; and selecting only the tests included in the selected set that have a respective historical test value that is greater than a threshold.

* * * * *